(12) United States Patent
Lin

(10) Patent No.: US 8,599,738 B2
(45) Date of Patent: Dec. 3, 2013

(54) TRANSMISSION METHOD FOR WIRELESS RELAY SYSTEM AND RELAY STATION USING THE SAME

(75) Inventor: Tzu-Ming Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 419 days.

(21) Appl. No.: 12/909,867

(22) Filed: Oct. 22, 2010

(65) Prior Publication Data

US 2011/0096701 A1    Apr. 28, 2011

Related U.S. Application Data

(60) Provisional application No. 61/254,442, filed on Oct. 23, 2009.

(51) Int. Cl.
*H04B 7/14* (2006.01)
*G08C 25/02* (2006.01)

(52) U.S. Cl.
USPC .......................... 370/315; 714/748

(58) Field of Classification Search
None
See application file for complete search history.

(56) References Cited

U.S. PATENT DOCUMENTS

| | | |
|---|---|---|
| 2009/0197603 A1 | 8/2009 | Ji et al. |
| 2009/0241004 A1 | 9/2009 | Ahn et al. |
| 2009/0254790 A1 * | 10/2009 | Pi et al. .................. 714/749 |
| 2010/0034135 A1 | 2/2010 | Kim et al. |
| 2010/0080139 A1 | 4/2010 | Palanki et al. |
| 2010/0080166 A1 | 4/2010 | Palanki et al. |
| 2010/0097978 A1 | 4/2010 | Palanki et al. |
| 2010/0103860 A1 | 4/2010 | Kim et al. |
| 2010/0110964 A1 | 5/2010 | Love et al. |
| 2010/0110967 A1 | 5/2010 | Sartori et al. |
| 2010/0201900 A1 | 8/2010 | Lee et al. |
| 2010/0262678 A1 | 10/2010 | Morgan et al. |

OTHER PUBLICATIONS

"Office Action of China Counterpart Application", issued on Nov. 8, 2012, p. 1-p. 8.
"Office Action of Taiwan Counterpart Application", issued on Sep. 18, 2013, p1-p11, in which the listed reference was cited.

* cited by examiner

*Primary Examiner* — Clemence Han
(74) *Attorney, Agent, or Firm* — Jianq Chyun IP Office

(57) ABSTRACT

A transmission method for a wireless relay system and a relay station using the same are provided. The wireless relay system includes at least a base station (eNB), at least a relay node (RN) and at least a user equipment (UE). The eNB is facilitated by the RN to provide a data transmission service to the UE. Besides, there are pre-configured timing relationships between at least a grant signalling transmission process, at least a data transmission process and at least a feedback signal transmission process of HARQ processes between the eNB, the RN and the UE.

78 Claims, 59 Drawing Sheets

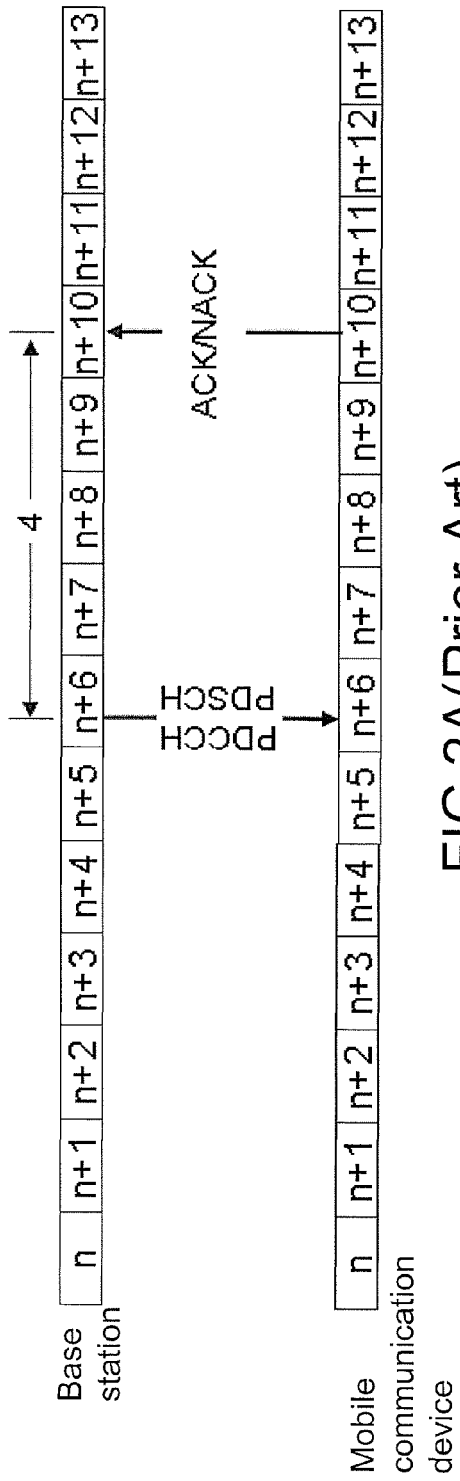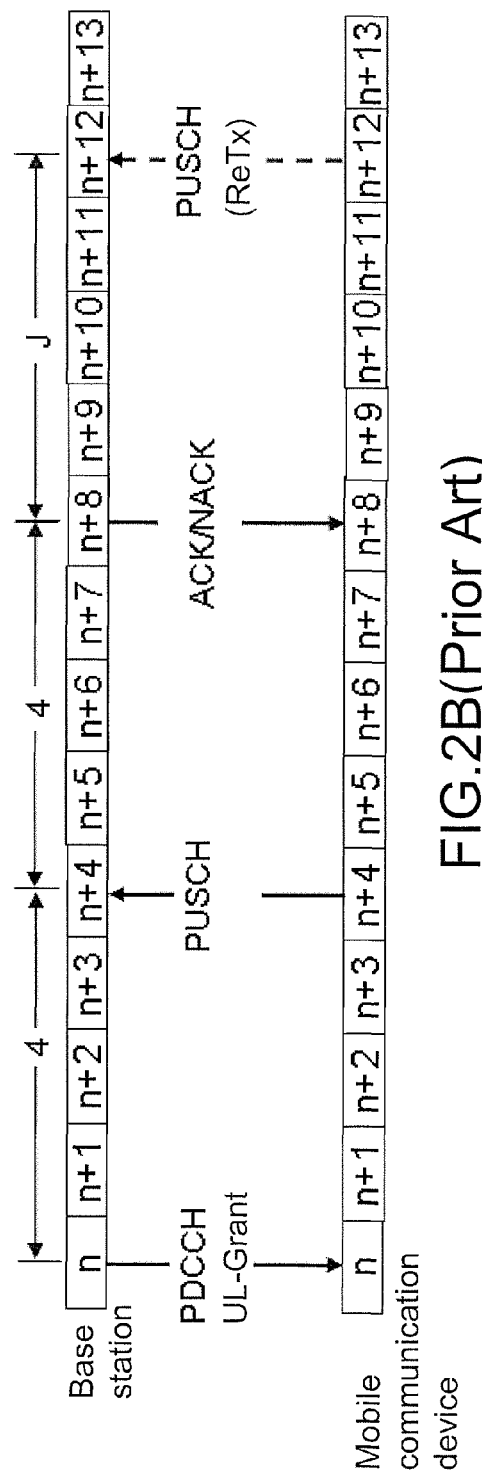
FIG.2A(Prior Art)
FIG.2B(Prior Art)

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG.3A(Prior Art)

| Uplink-downlink configuration | Subframe number n | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

FIG.3B(Prior Art)

| | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Configuration0, n=2 | | | | | | | D | D | D | D | D | D | A | | A | | | A | A | |
| Configuration1, n=2 | | D | | | | D | D | D | D | D | D | D | A | A | A | | | A | A | |
| Configuration2, n=7 | | D | | | | | D | D | D | D | D | D | A | A | D | | | A | | |
| Configuration3, n=2 | | | | | D | D | D | D | D | D | D | | A | A | A | | | | | |
| Configuration4, n=2 | | | | | D | D | D | D | | | | | A | A | A | | | | | |
| Configuration5, n=2 | | | | | | | D | D | | | | | A | A | | | | | | |
| Configuration6, n=4 | | | | | | | D | D | D | D | D | D | A | A | A | | | A | A | |

FIG. 3C (Prior Art)

| TDD UL/DL Configuration | Downlink subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | 4 |
| 1 | | 6 | | | 4 | | 6 | | 4 | |
| 2 | | | | 4 | | | | | 4 | 4 |
| 3 | 4 | | | | | | | | 4 | 4 |
| 4 | | | | | | | | | 4 | 4 |
| 5 | 7 | | | | | | | | 4 | |
| 6 | 7 | 7 | | | | 7 | 7 | | | 5 |

FIG. 4A (Prior Art)

| TDD UL/DL Configuration | \ | Uplink subframe number *n* | | | | | | | | | |
|---|---|---|---|---|---|---|---|---|---|---|---|
| | | 0 | 1 | 2 | 3 | 4 | 5 | 6 | 7 | 8 | 9 |
| 0 | | | | 4 | 7 | 6 | | | 4 | 7 | 6 |
| 1 | | | | 4 | 6 | | | | 4 | 6 | |
| 2 | | | | 6 | | 6 | | | 6 | | |
| 3 | | | | 6 | 6 | 6 | | | | | |
| 4 | | | | 6 | 6 | | | | | | |
| 5 | | | | 6 | | | | | | | |
| 6 | | | | 4 | 6 | 6 | | | 4 | 7 | |

| | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Configuration0, n=1 | | G | | | | | | D | | | | A | | | | | | | | |
| Configuration1, n=4 | | | | G | | | | | D | | | | | | A | | | | | |
| Configuration2, n=3 | | | | G | D | | | | | | | | | A | | | | | | |
| Configuration3, n=0 | G | | | | | | | D | | | A | | | | | | | | | |
| Configuration4, n=9 | | | | | | | | | D | G | | | | A | | | | | | |
| Configuration5, n=8 | | | | | | | | | G | D | | | | | | A | | | | |
| Configuration6, n=1 | | G | | | | | | | D | | | | D | | | | | | A | |

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 8, 7, 6, 1 (, 3, 2) | 2, 7, 8, 9 (, 3, 4) | - | - | - | 1, 8, 7 (, 2, 3, 6) | 2, 9, 8, 7 (, 3, 4) | - | - | - |

FIG.7C

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4, 5 (, 10) | 1, 5, 6 (, 10) | - | - | - | 4, 5 (, 10) | 1, 5, 6 (, 10) | - | - | - |

FIG.7D

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 0, 4, 5 | 0, 1, 5, 6 | - | - | - | 0, 4, 5 | 0, 1, 5, 6 | - | - | - |
| 1 | 0, 1, 4, 5, 6, 9 | 0, 1, 2, 5, 6, 7 | - | - | 0, 3, 4, 5, 8, 9 | 0, 1, 4, 5, 6, 9, 10 | 0, 1, 2, 5, 6, 7 | - | - | - |
| 2 | 0, 1, 2, 4, 5, 6, 7, 9 | 0, 1, 2, 3, 5, 6, 7, 8, | - | 0, 2, 3, 4, 5, 7, 8, 9 | 0, 1, 3, 4, 5, 6, 8, 9 | 0, 1, 2, 4, 5, 6, 7, 9 | 0, 1, 2, 3, 5, 6, 7, 8 | - | 0, 2, 3, 4, 5, 7, 8, 9 | 0, 1, 3, 4, 5, 6, 8, 9 |
| 3 | 0, 1, 2, 3, 4, 5, 9 | 0, 1, 2, 3, 4, 5, 6, 7 | - | - | - | 0, 4, 5, 6, 7, 8, 9 | 0, 1, 5, 6, 7, 8, 9 | 0, 1, 2, 6, 7, 8, 9 | 0, 1, 2, 3, 7, 8, 9 | 0, 1, 2, 3, 4, 8, 9 |
| 4 | 0, 1, 2, 3, 4, 5, 6, 7 | 0, 1, 2, 3, 4, 5, 6, 7 | - | - | 0, 5, 6, 7, 8, 9 | 0, 1, 6, 7, 8, 9 | 0, 1, 2, 5, 6, 7, 8, 9 | 0, 1, 2, 3, 6, 7, 8, 9 | 0, 1, 2, 3, 4, 7, 8, 9 | 0, 1, 2, 3, 4, 5, 8, 9 |
| 5 | 0, 1, 2, 3, 4, 5, 6, 7, 9 | 0, 1, 2, 3, 4, 5, 6, 7, 8 | - | 0, 2, 3, 4, 5, 6, 7, 8, 9 | 0, 1, 3, 4, 5, 6, 7, 8, 9 | 0, 1, 2, 4, 5, 6, 7, 8, 9, | 0, 1, 2, 3, 5, 6, 7, 8, 9 | 0, 1, 2, 3, 4, 6, 7, 8, 9 | 0, 1, 2, 3, 4, 5, 7, 8, 9 | 0, 1, 2, 3, 4, 5, 6, 8, 9 |
| 6 | 0, 4, 5, 9 | 0, 5, 6 | - | - | - | 0, 4, 5, 6, 9 | 0, 1, 5, 6, 7 | - | - | 0, 3, 4, 8, 9 |

FIG. 7E

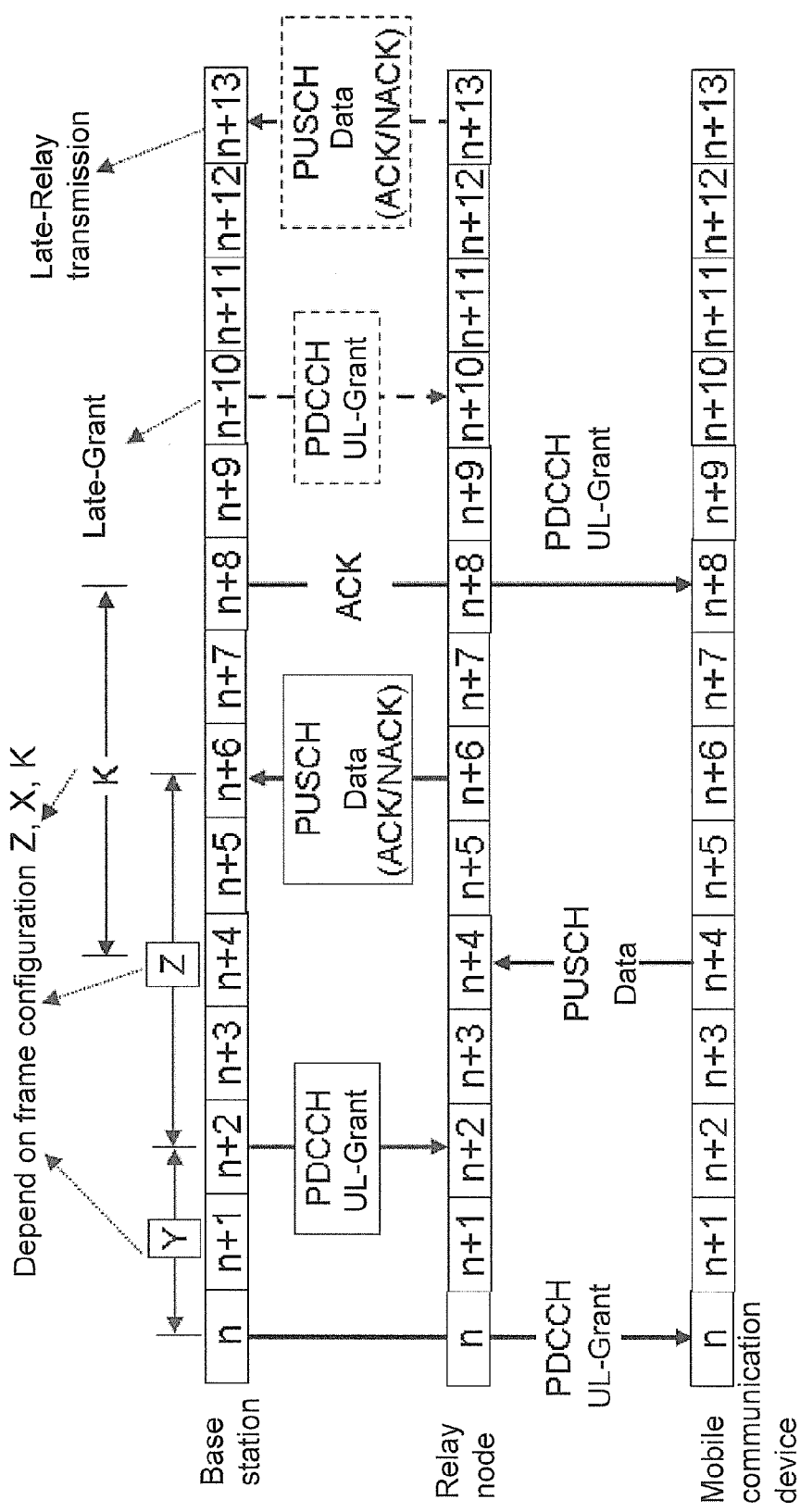

FIG.8C

| Uplink-downlink configuration | Subframe n | | | | | | | | | | | |
|---|---|---|---|---|---|---|---|---|---|---|---|---|
| | 0 | 1 | 1' | 2 | 3 | 4 | 5 | 6 | 6' | 7 | 8 | 9 |
| 0 | 1, 5, 6 (, 0) | -1, 4, 5, 9 (, 0) | -1, 4, 5, 9, 10 (, 0) | - | - | - | 1, 5, 6 (, 0) | -1, 4, 5, 9 (, 0) | -1, 4, 5, 9, 10 (, 0) | - | - | - |

FIG.8D

| Uplink-downlink configuration | Subframe n | | | | | | | | | | | |
|---|---|---|---|---|---|---|---|---|---|---|---|---|
| | 0 | 1 | 1' | 2 | 3 | 4 | 5 | 6 | 6' | 7 | 8 | 9 |
| 0 | 7, 8, 9, 12, 13 (, 14) | 7, 8, 11, 12, 13 (, 16) | 8, 11, 12, 13, 16 (, 17) | - | - | - | 7, 8, 9, 12, 13, (, 14) | 7, 8, 11, 12, 13 (, 16) | 8, 11, 12, 13, 16 (, 17) | - | - | - |

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 0, 1, 5, 6 | 0, 4, 5, 9 | - | - | - | 0, 1, 5, 6 0 | 0, 4, 5, 9 | - | - | - |
| 1 | - | 0, 8, 9 | - | - | 0, 1, 2, 5 | - | 0, 3, 4, 5, 8, 9 | - | - | 0, 1, 2 |
| 2 | - | - | - | 0, 1, 2, 3, 5 | - | - | - | - | 0, 1, 2, 3, 5 | - |
| 3 | 0, 1, 5, 6, 7, 8 | - | - | - | - | - | - | - | 0, 1, 2, 3, 7, 8, 9 | 0, 1, 2, 6, 7, 8, 9 |
| 4 | - | - | - | - | - | - | - | - | 0, 1, 6, 7, 8, 9 | 0, 5, 6, 7, 8, 9 |
| 5 | - | - | - | - | - | - | - | - | 0, 2, 3, 5, 6, 7, 8, 9 | - |
| 6 | 0, 1, 5, 6, 9 | 0, 4, 5, 8, 9 | - | - | - | 0, 1, 4, 5, 6 | 0, 3, 4, 5, 6, 9 | - | - | 0, 1, 2, 6, 7 |

FIG.8E

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 2, 3, 4, 7, 8, 9 | 1, 2, 3, 6, 7, 8 | - | - | - | 2, 3, 4, 7, 8, 9 | 1, 2, 3, 4, 6, 7, 8 | - | - | 9 |
| 1 | - | 1, 2, 6, 7, | - | - | 3, 4, 8, 9 | - | 1, 2, 6, 7 | - | - | 3, 4, 8, 9 |
| 2 | - | - | - | 4, 9 | - | - | - | - | 4, 9 | - |
| 3 | 2, 3, 4 | - | - | - | - | - | - | - | 4, 5, 6 | 3, 4, 5 |
| 4 | - | - | - | - | - | - | - | - | 4, 5 | 3, 4 |
| 5 | - | - | - | - | - | - | - | - | 4 | - |
| 6 | 2, 3, 4, 7, 8 | 1, 2, 3, 6, 7 | - | - | - | 2, 3, 7, 8, 9 | 1, 2, 6, 7, 8 | - | - | 3, 4, 5, 8, 9 |

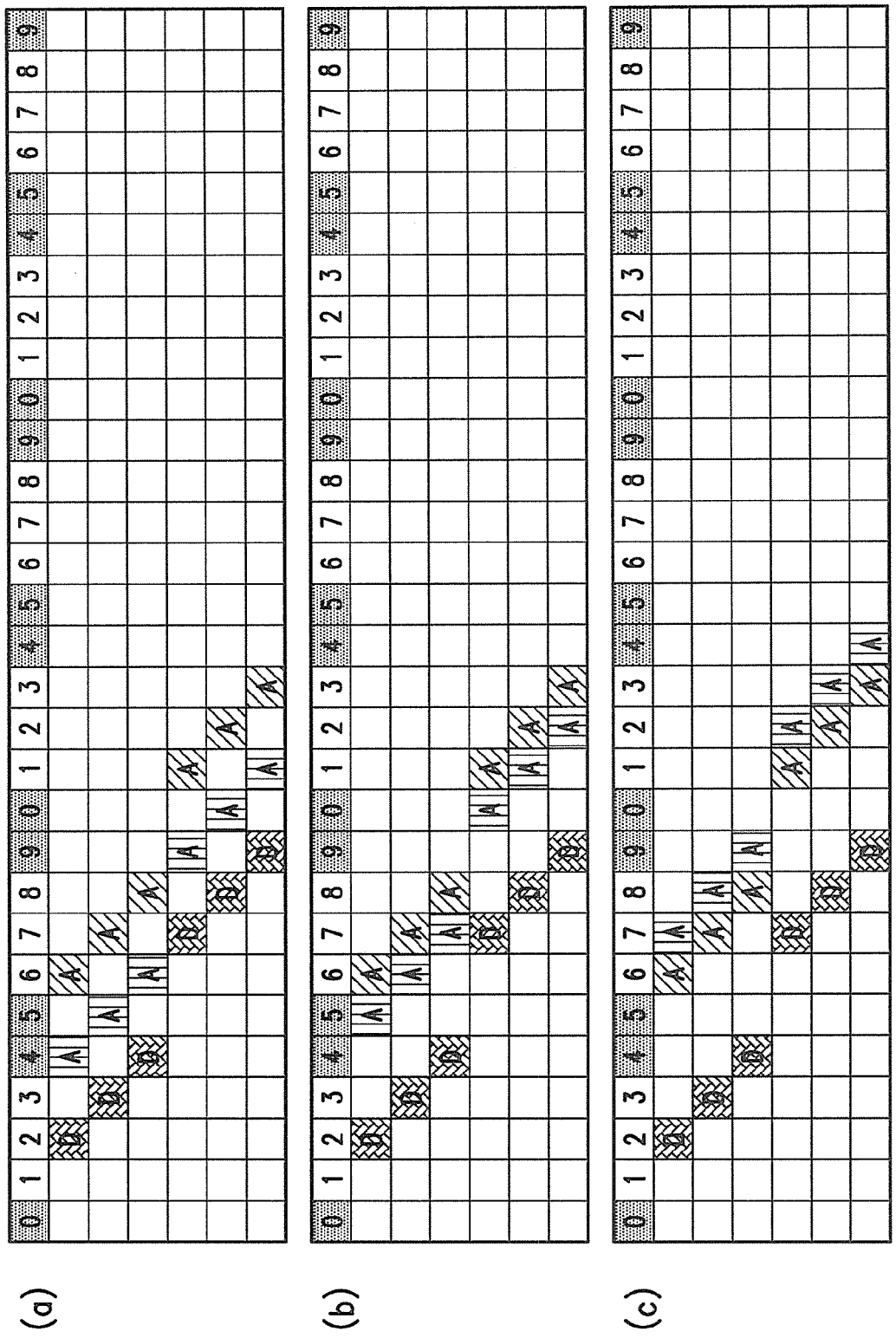

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 4 | 7 (, 8) | 8 (, 9) | - | - | 1 (, 2) | 2 (, 3) | 4 (, 3) | 5 (, 4) | 6 (, 5) | 7 (, 8) |

(c)

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 4 | 1, 2, 3, 4, 5, 6, 9, 10 | 2, 3, 4, 5, 6, 7, 10, 11 | - | - | 5, 6, 7, 8, 9, 10 | 6, 7, 8, 9, 10, 11 | 1, 2, 5, 6, 7, 8, 9, 10 | 2, 3, 6, 7, 8, 9, 10, 11 | 3, 4, 7, 8, 9, 10, 11, 12 | 4, 5, 8, 9, 10, 11, 12, 13 |

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 5 | (8) | (9) | - | (1) | (2) | (3) | (4) | (5) | (6) | (7) |

(c)

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 5 | 2, 3, 4, 5, 6, 7, 9, 10, 11 | 3, 4, 5, 6, 7, 8, 10, 11, 12 | - | 5, 6, 7, 8, 9, 10, 12, 13, 14 | 6, 7, 8, 9, 10, 11, 13, 14, 15 | 7, 8, 9, 10, 11, 12, 14, 15, 16 | 8, 9, 10, 11, 12, 13, 15, 16, 17 | 9, 10, 11, 12, 13, 14, 16, 17, 18 | 10, 11, 12, 13, 14, 15, 17, 18, 19 | 1, 2, 3, 4, 5, 6, 8, 9, 10 |

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 8, 7, 6, 1 (, 3, 2) | 2, 7, 8, 9 (, 3, 4) | - | - | - | 1, 8, 7 (, 2, 3, 6) | 2, 9, 8, 7 (3, 4) | - | - | - |
| 1 | 2, 7, 8 (, 3) | 3, 8, 9 (, 4) | - | - | 1, 2, 7 (, 6) | 2, 7, 8 (, 3) | 3, 8, 9 (, 4) | - | - | - |
| 2 | 8 (, 3) | 9 (, 4) | - | 1 (, 6) | 7 (, 2) | 8 (, 3) | 9 (, 4) | - | 1 (, 6) | 7 (, 2) |
| 3 | 7, 8, (, 6) | 7, 8 (, 9) | - | - | - | 1, 2, ,(3) | 2, 3, (4) | 3, 5 (, 4) | 4, 6, (5) | 6, 7 (, 5) |
| 4 | 7 (, 8) | 8 (, 9) | - | - | 1 (, 2) | 2 (, 3) | 4 (, 3) | 5 (, 4) | 6 (, 5) | 7 (, 8) |
| 5 | (8) | (9) | - | (1) | (2) | (3) | (4) | (5) | (6) | (7) |
| 6 | 2, 7, 8 (, 3, 6) | 7, 8, 9 (, 3, 4) | - | - | - | 1, 2, 7, 8 (, 3) | 2, 4, 8, 9 (, 3) | - | - | 1, 2, 5, 6) |

FIG.12G

| Uplink-downlink configuration | Subframe $n$ | | | | | | | | | |
|---|---|---|---|---|---|---|---|---|---|---|
| | 0 | 1 | 2 | 3 | 4 | 5 | 6 | 7 | 8 | 9 |
| 0 | 4, 5 (, 10) | 1, 5, 6 (, 10) | - | - | - | 4, 5 (, 10) | 1, 5, 6 (, 10) | - | - | - |
| 1 | 1, 4, 5, 6 (9, 10) | 2, 5, 6, 7 (, 10, 11) | - | - | 3, 4, 5, 8, 9 (, 10) | 1, 4, 5, 6 (, 9, 10) | 2, 5, 6, 7 (, 10, 11) | - | - | - |
| 2 | 2, 4, 5, 6 (, 7, 9, 10, 11) | 3, 5, 6, 7 (, 8, 10, 11) | - | 5, 7, 8, 9 (, 10, 12, 13, 14) | 1, 3, 4, 5 (, 6, 8, 9, 10) | 2, 4, 5, 6 (, 7, 9, 10, 11) | 3, 5, 6, 7 (, 8, 10, 11, 12) | 1, 2, 6, 7, 8 (, 9, 10) | 5, 7, 8, 9 (, 10, 12, 13, 14) | 1, 3, 4, 5 (, 6, 8, 9, 10) |
| 3 | 2, 3, 4, 5, 9 (, 10, 11) | 1, 2, 3, 4 (, 5, 6, 10) | - | - | - | 5, 6, 7, 8 (, 9, 10, 14) | 6, 7, 8, 9 (, 10, 11, 15) | 1, 2, 6, 7, 8 (, 9, 10) | 2, 3, 7, 8, 9 (, 10, 11) | 1, 2, 3, 4, 8 (, 9, 10) |
| 4 | 1, 2, 3, 4, 5, 6, 9, 10 | 2, 3, 4, 5, 6, 7, 10, 11 | - | 5, 6, 7, 8, 9, 10, 12, 13, 14 | 5, 6, 7, 8, 9, 10 | 6, 7, 8, 9, 10, 11 | 1, 2, 5, 6, 7, 8, 9, 10 | 2, 3, 6, 7, 8, 9, 10, 11 | 3, 4, 7, 8, 9, 10, 11, 12 | 4, 5, 8, 9, 10, 11, 12, 13 |
| 5 | 2, 3, 4, 5, 6, 7, 9, 10, 11 | 3, 4, 5, 6, 7, 8, 10, 11, 12 | - | 5, 6, 7, 8, 9, 10, 12, 13, 14 | 6, 7, 8, 9, 10, 11, 13, 14, 15 | 7, 8, 9, 10, 11, 12, 14, 15, 16 | 8, 9, 10, 11, 12, 13, 15, 16, 17 | 9, 10, 11, 12, 13, 14, 16, 17, 18 | 10, 11, 12, 13, 14, 15, 17, 18, 19 | 1, 2, 3, 4, 5, 6, 8, 9, 10 |
| 6 | 4, 5, 9 (10) | 5, 6, (10) | - | - | - | 4, 5, 6, 9 (10) | 1, 5, 6, 7 (10) | - | - | 3, 4, 8, 9, (10) |

| | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|---|---|---|---|---|---|
| n=8 | | | | | | | | G | G | G | G | G | G | G | G | G | G | A | A | A | | | | | | | | | | |
| n=9 | | | | | | G | G | G | G | G | G | D | D | D | D | G | G | G | G | G | D | D | D | | | | | | | |
| n=0 | | | | | | G | G | G | G | G | G | G | G | G | G | G | G | G | G | G | A | D | D | D | | | | | | |

(b)

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | 1, 5, 6, 7, 8, (, 0) | - | - | - | - | - | - | - | -3, -2, -1, 1, 2, 3, 7, 8, 9 (, 0) | -4, -3, -2, -1, 1, 2, 6, 7, 8, 9, (0) |

(c)

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 3 | 12, 13 (, 14) | - | - | - | - | - | - | - | 5, 6 (, 14) | 5, 13 (, 14) |

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 6 | -1, 1, 5, 6, 9, 10 (, 0) | 4, 5, 8, 9, 10 (, 0) | - | - | - | 1, 4, 5, 6, 10 (, 0) | -1, 3, 4, 5, 6, 9, 10, (, 0) | - | - | 1, 2, 6, 7, 10 (, 0) |

(c)

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 6 | 8, 12, 13, 14 (, 17) | 11, 12, 13, 16 (, 17) | - | - | - | 8, 9, 12, 13 (, 17) | 8, 11, 12, 16 (, 17) | - | - | 8, 9, 13, 14 (, 15) |

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 1, 5, 6 (, 0) | -1, 4, 5, 9, 10 (, 0) | - | - | - | 1, 5, 6 (, 0) | -1, 4, 5, 9, 10 (, 0) | - | - | - |
| 1 | - | -1, -2 (, 0) | - | - | 1, 2, 5 (, 0) | - | -1, -2, 3, 4, 5 (, 0) | - | - | 1, 2 (, 0) |
| 2 | 1, 5, 6, 7, 8 (, 0) | - | - | 1, 2, 3, 5 (, 0) | - | - | - | - | 1, 2, 3, 5 (, 0) | - |
| 3 | - | - | - | - | - | - | - | - | -3, -2, -1, 1, 2, 3, 7, 8, 9 (, 0) | -4, -3, -2, -1, 1, 2, 6, 7, 8, 9, (0) |
| 4 | - | - | - | - | - | - | - | - | -4, -3, -2, -1, 1, 6, 7, 8, 9, 10 (, 0) | 5, 6, 7, 8, 9, 10 (, 0) |
| 5 | - | - | - | - | - | 1, 4, 5, 6, 10 (, 0) | - | - | 2, 3, 5, 6, 7, 8, 9 (, 0) | - |
| 6 | -1, 1, 5, 6, 9, 10 (, 0) | 4, 5, 8, 9, 10 (, 0) | - | - | - | 1, 4, 5, 6, 10 (, 0) | -1, 3, 4, 5, 6, 9, 10 (, 0) | - | - | 1, 2, 6, 7, 10 (, 0) |

FIG. 13G

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 7, 8, 9, 12, 13 (, 14) | 7, 8, 11, 12, 13, 16 (, 17) | - | - | - | 7, 8, 9, 12, 13 (, 14) | 7, 8, 11, 12, 13 (, 16, 17) | - | - | - |
| 1 | - | 7, 11, 12 (, 16) | - | - | 8, 9, 13 (, 14) | - | 7, 11, 12 (, 16) | - | - | 8, 9, 13 (, 14) |
| 2 | - | - | - | 9 (, 14) | - | - | - | - | 9 (, 14) | - |
| 3 | 12, 13 (, 14) | - | - | - | - | - | - | - | 5, 6 (, 14) | 5, 13 (, 14) |
| 4 | - | - | - | - | - | - | - | - | 5 (, 14) | 13 (, 14) |
| 5 | - | - | - | - | - | - | - | - | (14) | - |
| 6 | 8, 12, 13, 14 (, 17) | 11, 12, 13, 16 (, 17) | - | - | - | 8, 9, 12, 13 (, 17) | 8, 11, 12, 16 (, 17) | - | - | 8, 9, 13, 14 (, 15) |

FIG.13H

TRANSMISSION METHOD FOR WIRELESS RELAY SYSTEM AND RELAY STATION USING THE SAME

CROSS-REFERENCE TO RELATED APPLICATION

This application claims the priority benefit of U.S. provisional application Ser. No. 61/254,442, filed on Oct. 23, 2009. The entirety of the above-mentioned patent application is hereby incorporated by reference herein and made a part of this specification.

TECHNICAL FIELD

The disclosure relates to a transmission method for a wireless relay system and a replay station using the same. The transmission method for a wireless relay system includes a Hybrid Automatic Repeat Request (HARQ) method in the wireless relay system.

BACKGROUND

Currently, relay techniques are gradually adopted in wireless communication technology to improve wireless communication coverage area, group mobility, cell-edge throughput of base stations and provision of temporary network deployment. For example, IEEE 802.16m standard and Third Generation Partnership Project Long Term Evolution Advanced (3GPP LTE-Advanced) standard both adopt replay node (also called a relay station) for achieving the relay forwarding communication.

FIG. 1 is a schematic diagram of a wireless communication system 19 with a relay node. As shown in FIG. 1, the wireless communication system 10 supports 3GPP LTE standard, and includes a mobility management entity (MME) 112, an MME 114, an Evolved Universal Terrestrial Radio Access Network (E-UTRAN) 120 and user equipments (UE) 132, 134, 136. The MME 112 can also be integrated with a serving gateway (S-GW).

The E-UTRAN 120 can include an enhanced Node B (eNodeB or abbreviated as eNB) 122, an eNB 124 and a relay node 126. The E-UTRAN 120 is connected with MME/S-GW 112 via an S1 connection (interface). In the E-UTRAN 120, the eNB 122 and the eNB 124 are connected with each other via an X2 interface (which can be a wired communication). In the wireless communication system 10, the relay node 126 can be connected with the eNB 124 via the X2 interface. However, the relay node 126 can also be connected with a base station or an advanced base station (abbreviated as ABS), in order to establish an S1 interface with the MME/S-GW 112. The relay node 126 provides a Uu interface (not shown) for the UE 134, 136, so as to provide wireless communication service of the eNB 124 to the UE 134, 136. The UE 132 is directly connected with the eNB 122 without via the relay node 126.

In the wireless relay communication system supporting 3GPP LTE standard, such as in the wireless communication system 10, the relay node 126 may not have a base station ID (cell ID), such that the relay node 126 does not create a new cell, but it can still relay or forward data to the UE 134, or forward data to the UE 134 from the eNB 124. The UE 134 may just receive control signals from the eNB 124, such as Physical Downlink Control Channel (PDCCH) or cell reference signal. The UE 134 can receive data signals from the relay node 126, such as Physical Downlink Shared Channel (PDSCH). Moreover, in the wireless communication system 10, the relay node can transmit or receive wireless signals in an uplink band or a downlink band of the eNB 124 in a time division multiplexing (TDM) mode, so as to extend wireless service coverage area of the eNB 124. In some situations, the relay node 126 just supports relaying data, and the eNB 124 and the UE 134 exchange physical (PHY) data.

FIG. 2A is a schematic diagram illustrating a conventional HARQ process in a downlink transmission of a frequency division duplex (FDD) mode of LTE system. Each block in FIG. 2A denotes a plurality of subframes. In 3GPP LTE standard, each frame includes 10 subframes. The figure shown in each block denotes a timing sequence of every subframe. For example, a subframe "n+3" represents the $3^{rd}$ subframe appeared after the $n^{th}$ subframe, and such notation principle can be applied to following schematic diagrams of every HARQ process. Referring to FIG. 2A, the HARQ process is operated between a base station (e.g., the eNB 122) and a mobile communication device (e.g., the UE 132). The blocks shown in the top row represent the subframe timing sequence of the base station, and the blocks shown in the bottom row represent the subframe timing sequence of the mobile communication device.

As illustrated in FIG. 2A, wireless resource is allocated for the eNB 122 in the subframe "n+6" and the eNB 122 transmits PDCCH and PDSCH to the UE 132. After 4 subframes, the subframe "n+10", the IE 132 replies a positive acknowledgement (abbreviated as ACK)/a negative acknowledgement (abbreviated as NACK), and feedback to the eNB 122 whether the HARQ data is successfully received in the subframe "n+6". The aforementioned 4 subframe interval is a configured and fixed time interval defined in 3GPP LTE standard. If the eNB 122 receives the ACK, then the eNB 122 can prepare another HARQ process. On the contrary, if the eNB 122 receives the NACK, then the eNB 122 can arrange retransmission explicitly or implicitly in subsequent subframes. For example, the eNB 122 can arrange the UE 132 report the reception result after 4 subframes, and the eNB 122 can arrange downlink resource for retransmitting the HARQ data in an explicit arrangement example. In an implicit arrangement example, fixed timing is reused for retransmitting the HARQ data to the UE 132 until the eNB 122 receives an ACK feedback from the UE 132. Alternatively, a preset timeout can be used to terminate the retransmission of the HARQ data.

FIG. 2B is a schematic diagram illustrating a conventional HARQ process in an uplink transmission of an FDD mode of LTE system. Referring to FIG. 2B, before an uplink transmission process of the UE 132, the eNB 122 grants uplink resource to the UE 132 in subframe "n", which is allocated through control signaling such as PDCCH. After 4 subframes, the UE 132 transmits uplink data to the eNB 122 in the granted subframe "n+4" through, for example, a Physical Uplink Shared Channel (PUSCH). Once the eNB 122 receives the uplink data, after 4 subframes, the eNB 122 replies an ACK signal to feedback whether the uplink data is successfully received in subframe "n+8". If the uplink data transmission is failed, the eNB 122 can reply an NACK signal or a fake-ACK signal in the subframe "n+8", which is 4 subframes after the uplink data transmission. Alternatively, the retransmission is triggered in a fixed subframe (e.g., J subframes), and the J value can be assigned explicitly or implicitly.

FIG. 3A is a schematic diagram illustrating a category of frame structures of a time division duplex (TDD) in LTE system. FIG. 3A illustrates a look-up table, which further indicates 7 uplink/downlink (UL/DL) configurations of the TDD mode in 3GPP LTE system, such as a configuration 0 to a configuration 6. Different configurations may have an uplink-to-downlink (UL-to-DL) switchpoint periodicity of 5 microseconds (ms) or of 10 ms. The UL-to-DL switchpoint periodicity represents a repeating time interval of the configured frame structure. Moreover, the loop-up table further shows corresponding uplink transmission meaning or corresponding downlink transmission meaning of 10 subframes in each UL/DL configuration. Each subframe occupies 1 microseconds of wireless resource in time domain. Furthermore, the subframe labeled as "D" or "S" represents a downlink transmission, and the subframe labeled as "U" represents an uplink transmission. For example, as shown in FIG. 3A, in a configuration 0, the subframes 0, 1, 5, 6 are allocated for the downlink transmission while the subframes 2, 3, 4, 7, 8, 9 are allocated for the uplink transmission.

FIG. 3B is a schematic diagram illustrating a mapping of downlink data subframe allocated in a TDD mode of LTE system and corresponding ACK/NACK. The example shown in FIG. 3B corresponds to an uplink transmission example similar to that shown in FIG. 2A, but the differences between them lies in that FIG. 3B provides a configuration table converted from the look-up table of FIG. 3A. Moreover, the configuration table shows the timing association of subframes transmitting ACK/NACK and subframes transmitting data created due to the TDD frame structure. The configuration tale also provides the associations of the subframes transmitting ACK/NACK and subframes transmitting data in the HARQ transmission process, where the figures shown in the block is the value of k.

In examples of FIG. 3B, if the eNB 122 transmits downlink data in the subframe "n−k", then the mapping table shows that the subframe "n" is granted by the eNB 122 for transmitting data or ACK/NACK. For example, in configuration 1 (also in a situation of UL-DL switchpoint periodicity of 5 ms), if the UE 132 replies ACK/NACK in the subframe 2, then it can be known by looking up in the configuration table of FIG. 3B, the UE 132 received the downlink data in the subframe 5 (i.e., n−k=(2−7)+10=5) or in the subframe 6 (i.e., n−k=(2−6)+10=6). For another example, in configuration 4, if the UE 132 replies ACK/NACK in the subframe 2, then it can be known by looking up in the configuration table of FIG. 3B, the UE 132 received the downlink data in the subframe 0 (i.e., n−k=(2−12)+10=0), the subframe 4 (i.e., n−k=(2−8)+10=4), the subframe 5 (i.e., n−k=(2−7)+10=5) or in the subframe 1 (i.e., n−k=(2−11)+10=1).

FIG. 3C is a schematic diagram illustrating associations of subframes in every configuration of FIG. 3B. In the mapping table shown in FIG. 3C, the subframe labelled as "D" may be associated with the subframe labelled as "A". For example, in configuration 1, when the subframe "n" is 2, the subframe 2 labelled as "A" is then associated with the subframes 5, 6, which are labelled as "D". For another example, in configuration 4, when the subframe "n" is 2, the subframe 2 labelled as "A" is then associated with the subframes 0, 1, 4, 5, which are labelled as "D". In other words, when the eNB 122 transmits downlink data in the subframes 0, 1, 4 or 5 in the configuration 4, the UE 132 can reply ACK/NACK signal in the subframe 2 of the next frame period.

The uplink HARQ process in the TDD mode of 3GPP LTE system is similar to the process shown in FIG. 2B, but the difference between then lies in that a timing associations between grant subframes, uplink data subframes and ACK/NACK subframes are required due to the TDD frame structure. FIG. 4A is a schematic diagram illustrating a mapping of grant subframe allocated in a TDD mode of LTE system and corresponding uplink data subframe. FIG. 4A corresponds to an uplink HARQ data transmission example similar to that shown in FIG. 2B. As shown in FIG. 4A, if grant signal is transmitted in the subframe "n", then the UE can transmits the uplink data in the subframe "n+k". For example, in the configuration 1, if the eNB 122 transmits the grant signal in the subframe 1, then the UE can transmits the uplink data in the subframe 7 (i.e., n+k=1+6=7).

FIG. 4B is a schematic diagram illustrating a mapping of uplink data subframe allocated in a TDD mode of LTE system and corresponding ACK/NACK. FIG. 4B corresponds to an uplink HARQ transmission example similar to that shown in FIG. 2B, and shows timing associations of uplink subframes and the corresponding ACK/NACK subframes as following FIG. 4A. As shown in FIG. 4B, if uplink data is transmitted in the subframe "n", then the eNB 122 can transmit ACK/NACK signal in the subframe "n+k". For example, in configuration 1, if the UE 132 transmits the uplink data in the subframe 7, then the eNB 122 can transmit ACK/NACK in the subframe 1 (i.e., n+k=7+4−10=1) in the next frame period.

FIG. 4C is a schematic diagram illustrating associations of subframes in every configuration of FIG. 4B. FIG. 4c corresponds to an uplink HARQ data transmission example similar to that shown in FIG. 2B, and provides a configuration table converted from FIG. 4A and FIG. 4B. In the configuration table of FIG. 4C, the subframe labelled as "G" is represents a time point of transmitting the grant signal for the subframe labelled as "D", and the subframe "A" is represents a time point of transmitting ACK/NACK signal for the subframe labelled as "D". For example, if configuration is 0, and in the situation where subframe n=1, the eNB 122 transmits grant signal in the subframe 1, and the UE 132 can transmit uplink data in the subframe 7, and the eNB 122 can transmit the ACK/NACK signal in the subframe 1 of the next frame period. For another example, if configuration is 5, and in the situation where subframe n=8, the eNB 122 transmits grant signal in the subframe 8, and the UE 132 can transmit uplink data in the subframe 2, and the eNB 122 can transmit the ACK/NACK signal in the subframe 8 of the next frame period.

However, the aforementioned conventional HARQ method, as illustrated in FIG. 2A and FIG. 4B, can merely be applied to the situation without a relay node. Moreover, the conventional wireless relay communication system mostly uses dynamic allocation indication signals, which results in control signalling overhead in the wireless relay communication system. The dynamic allocation indication signalling is also more complicated, and can easily lower operation efficiency of the entire wireless relay communication system. Therefore, how to efficiently transmit data and corresponding control signals in a wireless relay communication system is currently an important issue.

SUMMARY

A transmission method for a wireless relay system is introduced herein. According to an exemplary embodiment of the disclosure, the method is adapted for providing relaying in the wireless relay system, and includes following steps. The wireless relay system includes at least a base station, at least a relay node and at least a mobile communication device. The base station provides a data transmission service to the mobile communication device with facilitation of the relay node. Moreover, there is configured timing association between at least a grant signal transmission process, at least a data transmission process and at least a feedback signal transmission process of the base station, the relay node and the mobile communication device.

A transmission method for a wireless relay system is introduced herein. According to an exemplary embodiment of the disclosure, the method is adapted for providing relaying of at least a base station and at least a mobile communication device, and includes following steps. The base station provides a data transmission service to the mobile communication device with facilitation of the replay node. Moreover, a frequency division duplex (FDD) mode or a time division duplex (TDD) mode is operated between the base station, the relay node and the mobile communication device. If the FDD mode is operated, then there is a configured timing association between at least a grant signal transmission process, at least a data transmission process and at least a feedback signal transmission process of the base station, the relay node and the mobile communication device. In addition, if the TDD mode is operated, then at least a grant signal, at least data and at least a feedback signal are transmitted between the base station, the relay node and the mobile communication device according to a configuration table.

A transmission method for a wireless relay system is introduced herein. According to an exemplary embodiment of the disclosure, the method is adapted for providing relaying of at least a base station and at least a mobile communication device, and includes following steps. The base station performs an uplink transmission process and a downlink transmission process with the mobile communication device with facilitation of a relay node. Where, there is a configured timing association, including a first time interval and a second time interval, between at least a grant signal transmission process, at least a data transmission process and at least a feedback signal transmission process of the base station, the relay node and the mobile communication device.

A relay station is provided herein. According to an exemplary embodiment of the disclosure, the relay station is adapted for relaying at least data between a base station and a mobile communication device. Where, the relay station transmits and receives data with a configured timing association.

A relay station is provided herein. According to an exemplary embodiment of the disclosure, the relay station is adapted for relaying at least data between a base as station and a mobile communication device. Where, the relay station transmits and receives data with a configured timing association.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 2A is a schematic diagram illustrating a conventional HARQ process in a downlink transmission of a frequency division duplex mode of LTE system.

FIG. 2B is a schematic diagram illustrating a conventional HARQ process in an uplink transmission of a frequency division duplex mode of LTE system.

FIG. 3A is a schematic diagram illustrating a category of frame structures of a time division duplex in LTE system.

FIG. 3B is a schematic diagram illustrating a mapping of downlink data subframe allocated in a time division duplex mode of LTE system and corresponding ACK/NACK.

FIG. 3C is a schematic diagram illustrating associations of subframes in every configuration of FIG. 3B.

FIG. 4A is a schematic diagram illustrating a mapping of grant subframe allocated in a time division duplex mode of LTE system and corresponding uplink data subframe.

FIG. 4B is a schematic diagram illustrating a mapping of uplink data subframe allocated in a time division duplex mode of LTE system and corresponding ACK/NACK.

FIG. 4C is a schematic diagram illustrating associations of subframes in every configuration of FIG. 4B.

FIG. 7C summarizes a portion of a downlink transmission process in a TDD mode according to FIG. 7B.

FIG. 7D summarizes another portion of a downlink transmission process in a TDD mode according to FIG. 7B.

FIG. 7E summarizes downlink transmission processes of all configurations in a TDD mode according to FIG. 7A.

FIG. 8A is schematic diagram illustrating a HARQ process in an uplink transmission of a time division duplex mode of LTE system according a fifth exemplary embodiment.

FIG. 8C summarizes a portion of an uplink transmission process in a TDD mode according to FIG. 8B.

FIG. 8D summarizes another portion of an uplink transmission process in a TDD mode according to FIG. 8B.

FIG. 8E summarizes subframe numbers at which a relay node receives a grant signal of uplink wireless resource in uplink transmission processes of all configurations in a TDD mode according to FIG. 8A.

FIG. 8F summarizes subframe numbers at which a relay node forwards uplink data in uplink transmission processes of all configurations in a TDD mode according to FIG. 8A.

FIG. 10A-FIG. 10I are schematic diagrams respectively illustrating associations of subframes in every configuration of different embodiments according to FIG. 5A.

FIG. 11A-FIG. 11I are schematic diagrams respectively illustrating associations of subframes in every configuration of different embodiments according to FIG. 6A.

FIG. 12A-FIG. 12F are schematic diagrams respectively illustrating associations of subframes in configuration 1 to configuration 6 according to FIG. 7A, and summarizing the downlink transmission process of the TDD mode.

FIG. 12G illustrates the subframe number where the relay node replies acknowledgement signal of every configuration in the downlink transmission process of the TDD mode according to FIG. 7A.

FIG. 12H illustrates the subframe number where the relay node forwards the downlink data of every configuration in the downlink transmission process of the TDD mode according to FIG. 7A.

FIG. 13A-FIG. 13F are schematic diagrams respectively illustrating associations of subframes in configuration 1 to configuration 6 according to FIG. 8A, and summarizing the uplink transmission process of the TDD mode.

FIG. 13G illustrates the subframe number where the relay node is granted uplink wireless resource corresponding to every configuration of the TDD mode of the uplink transmission process according to FIG. 8A.

FIG. 13H illustrates the subframe number where the relay node forwards the uplink data corresponding to every configuration of the TDD mode of the uplink transmission process according to FIG. 8A.

DETAILED DESCRIPTION OF DISCLOSED EMBODIMENTS

The basic principles of exemplary embodiments of the present disclosure mainly provide a transmission method for a wireless relay communication system. The transmission method includes a HARQ process of a wireless relay system which is capable of being operated in n TDD mode or in a FDD mode. By adopting a configured timing association or a fixed timing association between grant signal transmission process, data transmission process and feedback signal transmission process between a base station, a relay node and a mobile communication device, control signaling overhead can be effectively reduced, thereby lowering transmission delay.

The following exemplary embodiments will be introduced based upon 3GPP LTE system, but technical content of the disclosure is not limited to 3GPP LTE system and can be adapted for any wireless communication system, which adopts relay communication techniques, and can operate in a TDD mode or in a FDD mode. Moreover, the following exemplary embodiments will be described with a type II relay node, but the technical content of the disclosure is not limited to the type II relay node.

Figure 1:
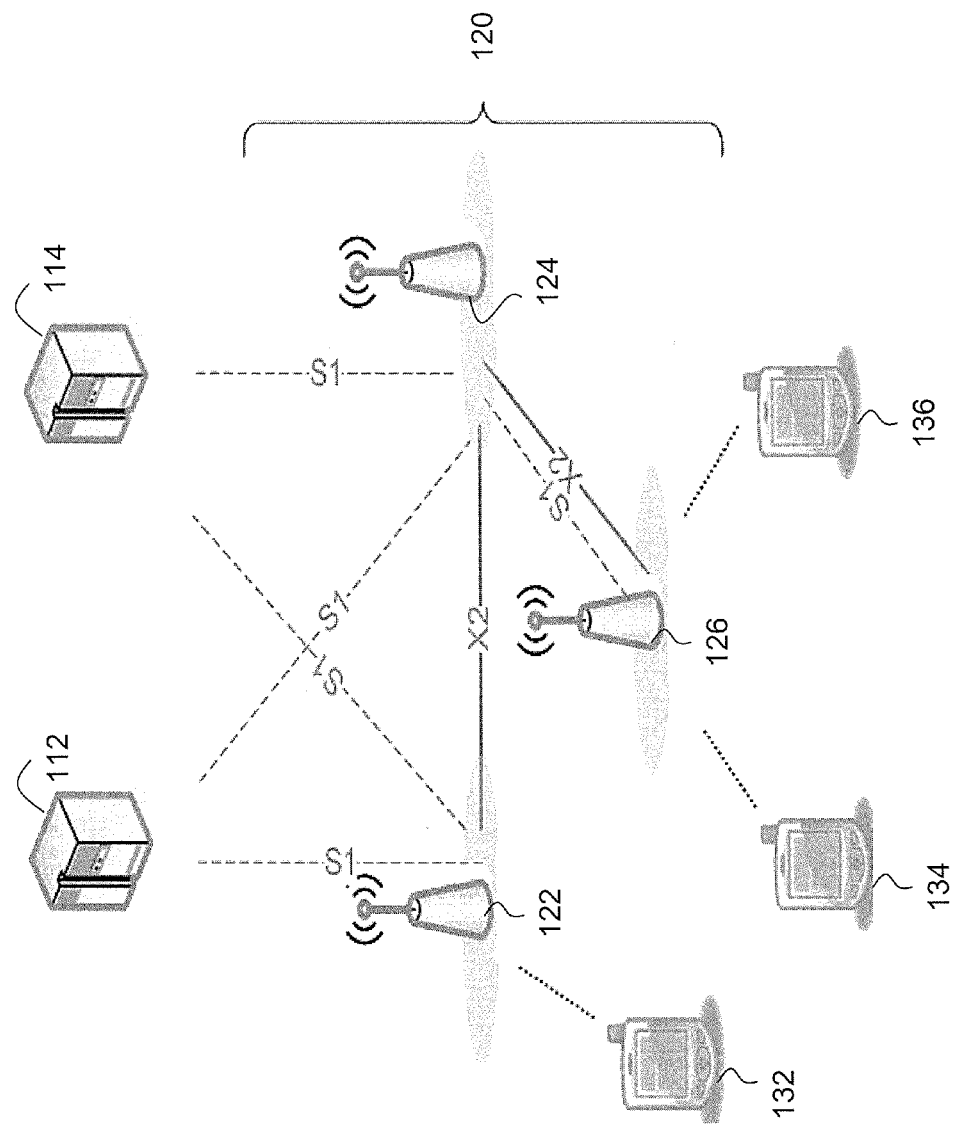
FIG. 1 is schematic diagram of a wireless communication system with a relay node.

The type II relay node operates a transparent and inband relay techniques, and it does not possess a unique cell ID but can still have a relay ID. Referring to FIG. 1, from the perspective of the UE 136, the eNB 124 is a doner cell in the wireless communication system 10, and has at least a portion of radio resource management (RRM) and can directly control the UE 136. However, there is still a portion of RRM operated in the type II relay node (relay communication device). For example, smart repeater communication devices, decode-and-forward communication devices and layer 3 relay communication devices are the type II relay node. In addition, mobile communication devices in exemplary embodiments are, for example, a digital television, a digital set-top-box, a notebooks computer, a tablet computer, a mobile phone and a smartphone.

The notation principle of a timing sequence "n" described in accordance with FIG. 2A can also be applied to following exemplary embodiments. For example, the figure in each block represents a timing sequence of each subframe, and subframe "n+3" represents the $3^{rd}$ subframe appeared after the $n^{th}$ subframe. The TDD mode of 3GPP LTE system has 7 UL/DL configurations, such as configuration 0 to configuration 6. Different configurations may have UL-to-DL switch-point periodicity of 5 ms or 10 ms. Moreover, the subframe labelled as "D" or "S" represents a downlink transmission, and the subframe labelled as "U" represents an uplink transmission. Furthermore, each subframe occupies 1 ms of wireless resource. In an uplink operation mode, the subframe labelled as "G" represents a timing point when grant signal is transmitted for the subframe labelled as "D", while the subframe labelled as "A" represents a timing point when ACK/NACK signal is transmitted for the subframe labelled as "D". The aforementioned basic principles of 3GPP LTE system can be applied to exemplary embodiments of the disclosure.

The following exemplary embodiments of the disclosure are all associated with base stations (such as the eNB 24 in FIG. 1), relay nodes (such as the relay node 126 in FIG. 1) and mobile communication device (such as the UE 136 in FIG. 1). Though fixed timing associations are disclosed in some exemplary embodiments, such as the mobile communication device replies ACK/NACK signal to the base station after X=4 subframes, the present disclosure is not limited to such timing association (X=4), and principles of the technical contents of the present disclosure can be applied to situations where there is fixed timing association between data subframe for uplink transmission and ACK/NACK subframe. Meanwhile, principles of the technical contents of the present disclosure can also be applied to situations where there is fixed timing association between grant subframe, data subframe and ACK/NACK subframe for downlink transmission.

Figure 5A:
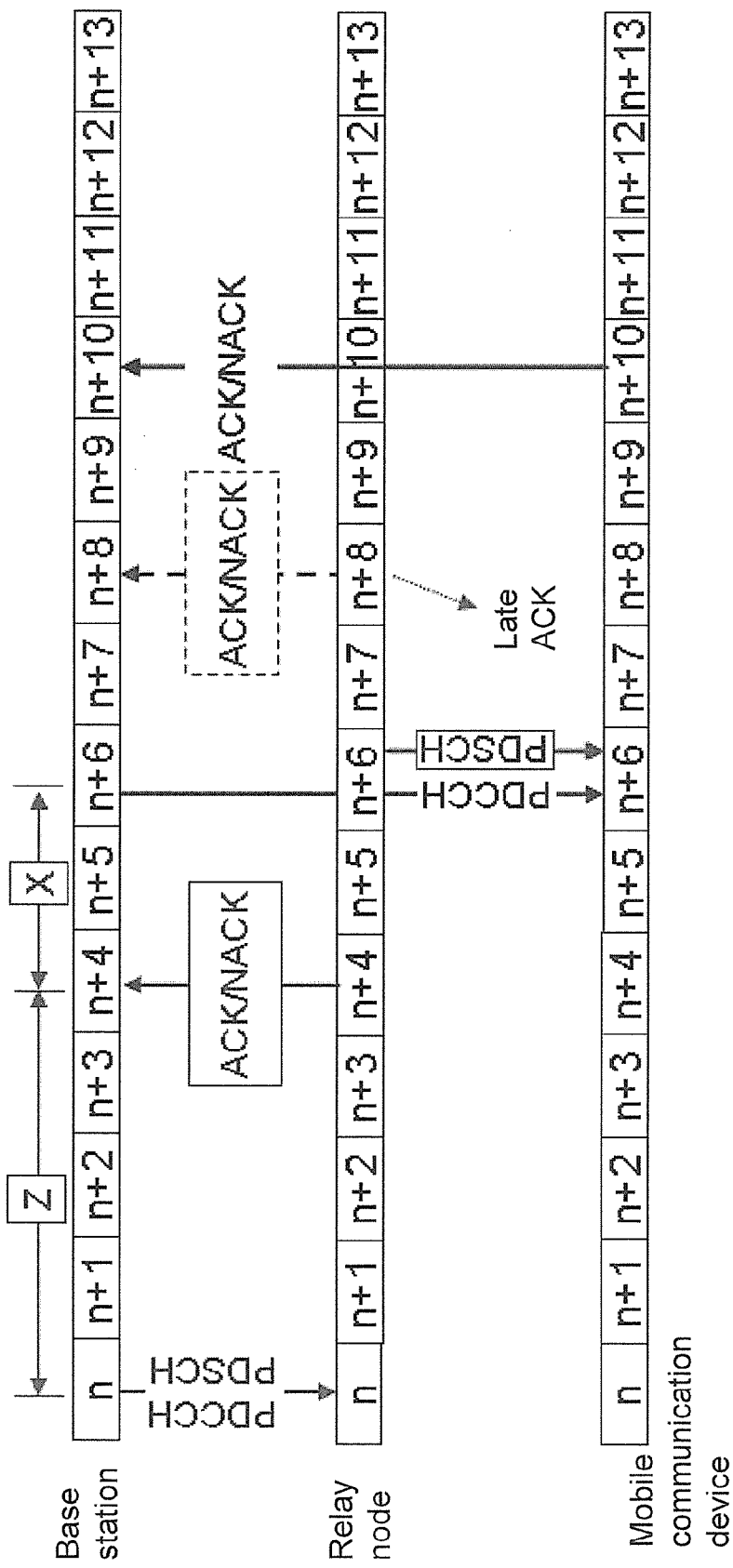
FIG. 5A is schematic diagram illustrating a HARQ process in a downlink transmission of a frequency division duplex mode of LTE system according a first exemplary embodiment

FIG. 5A is schematic diagram illustrating a HARQ process in a downlink transmission of a FDD mode of LTE system according a first exemplary embodiment. In FIG. 5A, the subframes 0, 4, 5 or 9 of 3GPP LTE system are used for transmitting control signaling, and this principle can be also applied to FIG. 5B, FIG. 5C and FIG. 6C to FIG. 6E. The base station firstly transmits downlink data to the relay node, and the relay node then can independently forward data to the mobile communication device, or cooperate with the base station to transmit the downlink data to the mobile communication device. Moreover, the relay node can use modulation and coding scheme (MCS) and cooperative relay technique to achieve the objectives of relaying. In a pre-transmission step of the base station transmitting data to the relay node, the base station can also transmit control signaling such as PDCCH.

Control signaling can be transmitted to the relay node along with data (such as PDSCH). For example, in the subframe "n", PDCCH/PDSCH is transmitted by the base station to the relay node. Then, the base station receives acknowledgement signal, such as ACK/NACK signal, before the relay node transmits data to the mobile communication device. The acknowledgement signal can be, for example, Physical hybrid-ARQ indicator channel (PHICH). As shown in FIG. 5A, after an interval of Z subframes, the base station receives ACK/NACK signal replied by the relay node in the frame "n+4", for example.

After the base station receives ACK/NACK signal (replied by the relay node), the base station allocates wireless resource granted to the mobile communication device through control signaling (e.g., PDCCH), and the relay node can at the same time transmit the downlink data from the base station to the mobile communication device. As shown in FIG. 5A, after an interval of X subframes, the base station, for example in the subframe "n+6", the base station transmits PDCCH to the mobile communication device, and meanwhile the relay node also transmits PDSCH to the mobile communication device.

Within a configured duration (e.g., 4 subframes) after the downlink data is received by the mobile communication device, the mobile communication device replies ACK/NACK signal to the base station. In the present exemplary embodiment, the mobile communication device can directly reply ACK/NACK signal to the base station without the relay node forwarding the ACK/NACK signal.

However, the relay node can also reply ACK/NACK signal to the base station after transmitting the downlink data to the mobile communication device, and such situation is called a late ACK. For example, in FIG. 5A, the relay node transmits the ACK/NACK signal to the base station in the subframe "n+8", which is later than the mobile communication device receiving the downlink data in the subframe "n+6". Since the base station is not known the transmission procedures in advance in such situation, the base station can merely determine whether the overall data transmission process is successful by the ACK/NACK signal directly replied by the mobile communication device. It is usually that the value of Z is greater than or equal to 0, such that sufficient time is allocated for the relay node to process data (such as PDCCH or PDSCH). The value of Z in FIG. 5A represents a time delay from the timing point where the relay node has received the PDCCH/PDSCH to the timing point where the relay node replies the ACK/NACK signal. The value of X in FIG. 5A represents a time delay (or also called time interval) between the timing point where the base station transmits the PDCCH/PDSCH to the relay node and the timing point where the relay node replies the ACK/NACK signal. From another perspectives, the value of Z in FIG. 5A also represents a time interval from the timing point where the relay node receives grant signal of the base station to the timing point where the relay node replies the ACK/NACK signal to the base station. The value of X in FIG. 5A also represents a time interval from the timing point where the relay node replies the ACK/NACK signal to the timing point where the mobile communication device is granted downlink wireless resource.

If data is of higher priority, being more instant or of more emergency, then the value of X can be lowered. When the value of X is negative, it represents a situation of late ACK. The value of Z is usually 4 subframes, and if the value of Z is less than 4, then it means that the data processing speed is faster (or the data processing capability is more powerful). The sum of the value of X and value of Z is usually greater than 0, and if the sum of the value of X and value of Z is equal to 0, then it represents a situation of simultaneous transmission. That is, X+Z=0, and the base station and the relay node simultaneously transmit downlink data to the mobile communication device. The principle regarding the value of X and value of Z can be applied to the following exemplary embodiments. In FIG. 5A, if X+Z>0, then it means that the base station and the relay node do not simultaneously transmit downlink data to the mobile communication device. If X<0, then it represents a late ACK situation, where the relay node replies the ACK/NACK signal to the base station after the relay node transmits downlink data to the mobile communication device.

Figure 5B:
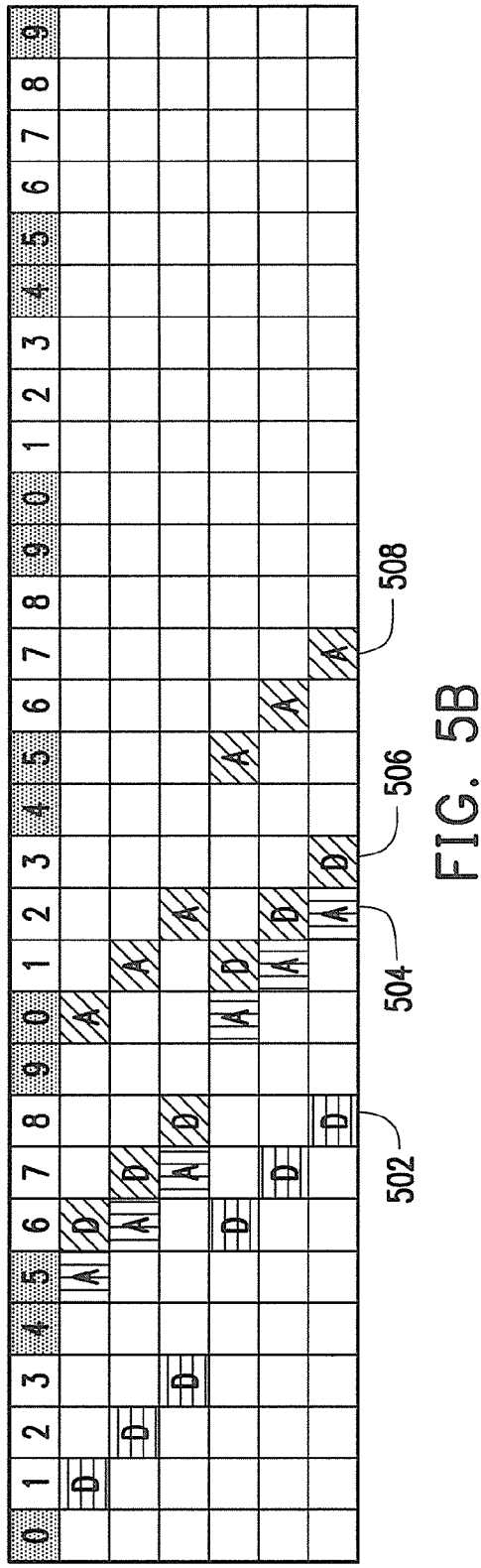
FIG. 5B, FIG. 5C and FIG. 5D are schematic diagrams illustrating associations of subframes in every configuration according to FIG. 5A
Figure 5C:
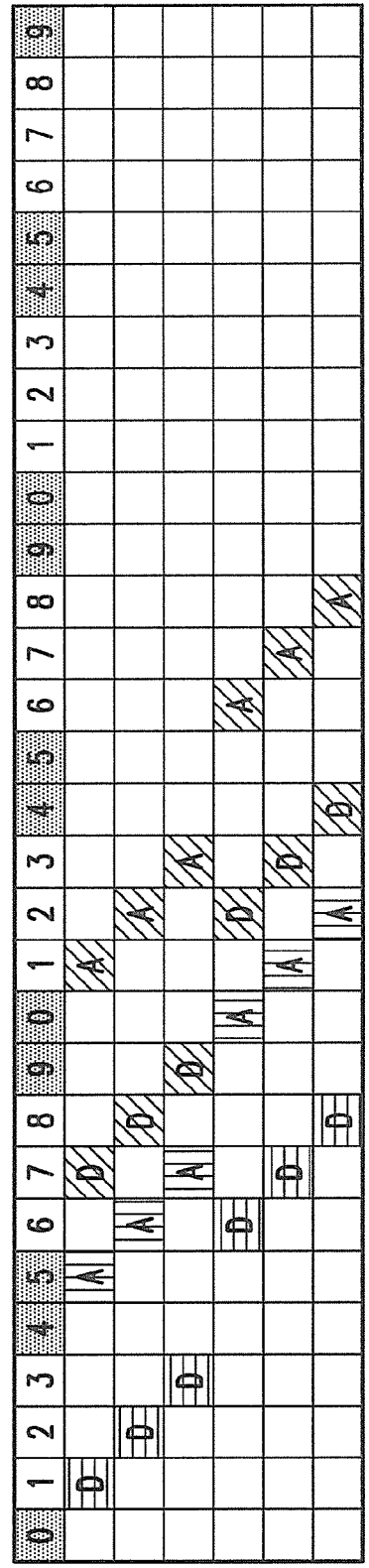
Figure 5D:
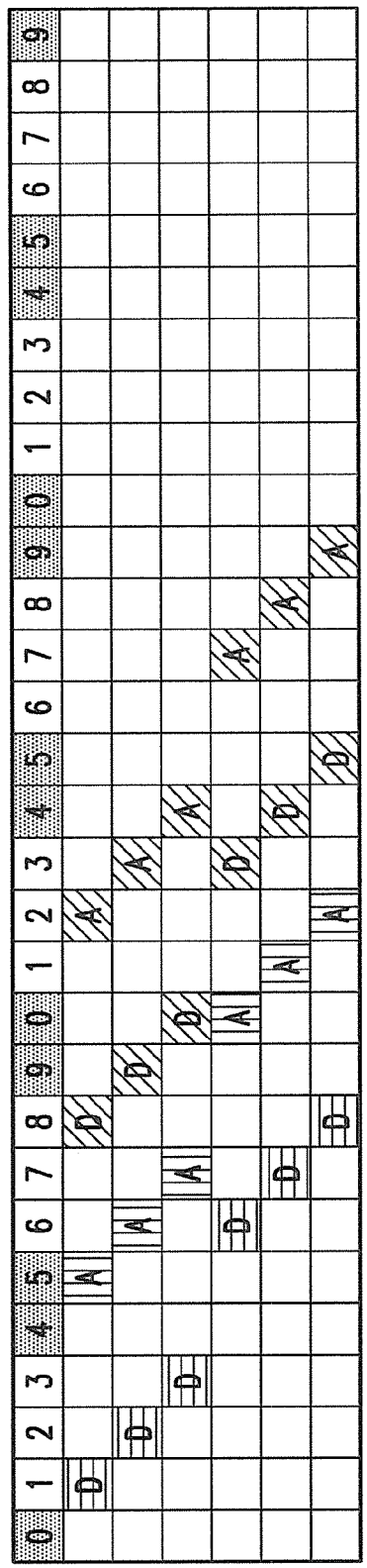

FIG. 5B, FIG. 5C and FIG. 5D are schematic diagrams illustrating associations of subframes in every configuration according to FIG. 5A. FIG. 5B, FIG. 5C and FIG. 5D all correspond to the HARQ process in a downlink transmission of the FDD mode with Z=4, and respectively provide three configuration tables converted from FIG. 5A. In the configuration tables of FIG. 5B, FIG. 5C and FIG. 5D, the subframes with diagonal stripes on background (but labeled as "A" or "D") represent the subframes associated with the mobile communication device; the subframes with vertical stripes or horizontal stripes on background (but labeled as "A" or "D") represent the subframes associated with the relay node. For example, the subframes 502, 504 are the ones associated with the relay node; the subframes 506, 508 are the ones associated with the mobile communication device. However, FIG. 5B, FIG. 5C and FIG. 5D respectively correspond to the conditions of X=1, X=2 and X=3.

Moreover, in FIG. 5B, since X=1, then the relay node replies the ACK/NACK signal to the base station in the subframe 5 (the subframe labeled as "A"), the relay node forwards the downlink data from the base station to the mobile communication device in the subframe 6 (the subframe labeled as "D"), and there is just 1 subframe interval between the two processes.

For example, from an overall perspectives of FIG. 5B-FIG. 5D, the base station transmits the downlink data in subframe 1, 2, 3, 5, 6, 7 or 8, the relay node correspondingly reply ACK/NACK signal to the base station in subframe 5, 6, 7, 0, 1 or 2. If X=1, then the relay node forwards the downlink data in subframe 6, 7, 8, 1, 2 or 3; if X=2, then the relay node forwards the downlink data in subframe 7, 8, 9, 2, 3 or 4; X=3, then the relay node forwards the downlink data in subframe 8, 9, 0, 3, 4 or 5. The disclosure is not limited to the case where Z=4, and in other exemplary embodiments, the value of Z can other integers based upon practical design parameters of the wireless relay system; the corresponding value of X can be −5, −6, −7, 1, 2, 3 or other integers.

Figure 6A:
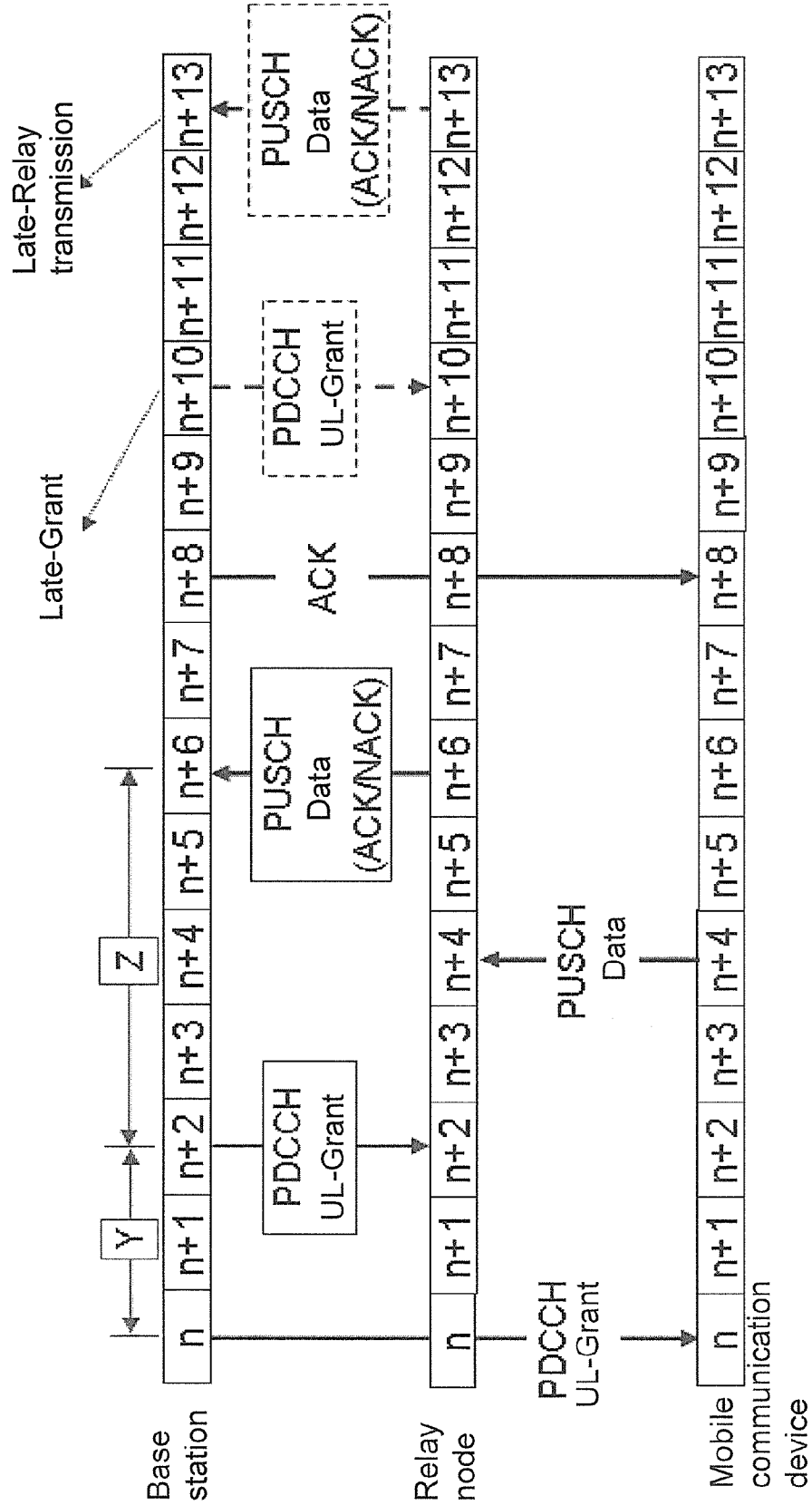
FIG. 6A is schematic diagram illustrating a HARQ process in an uplink transmission of a frequency division duplex mode of LTE system according a second exemplary embodiment.
Figure 6B:
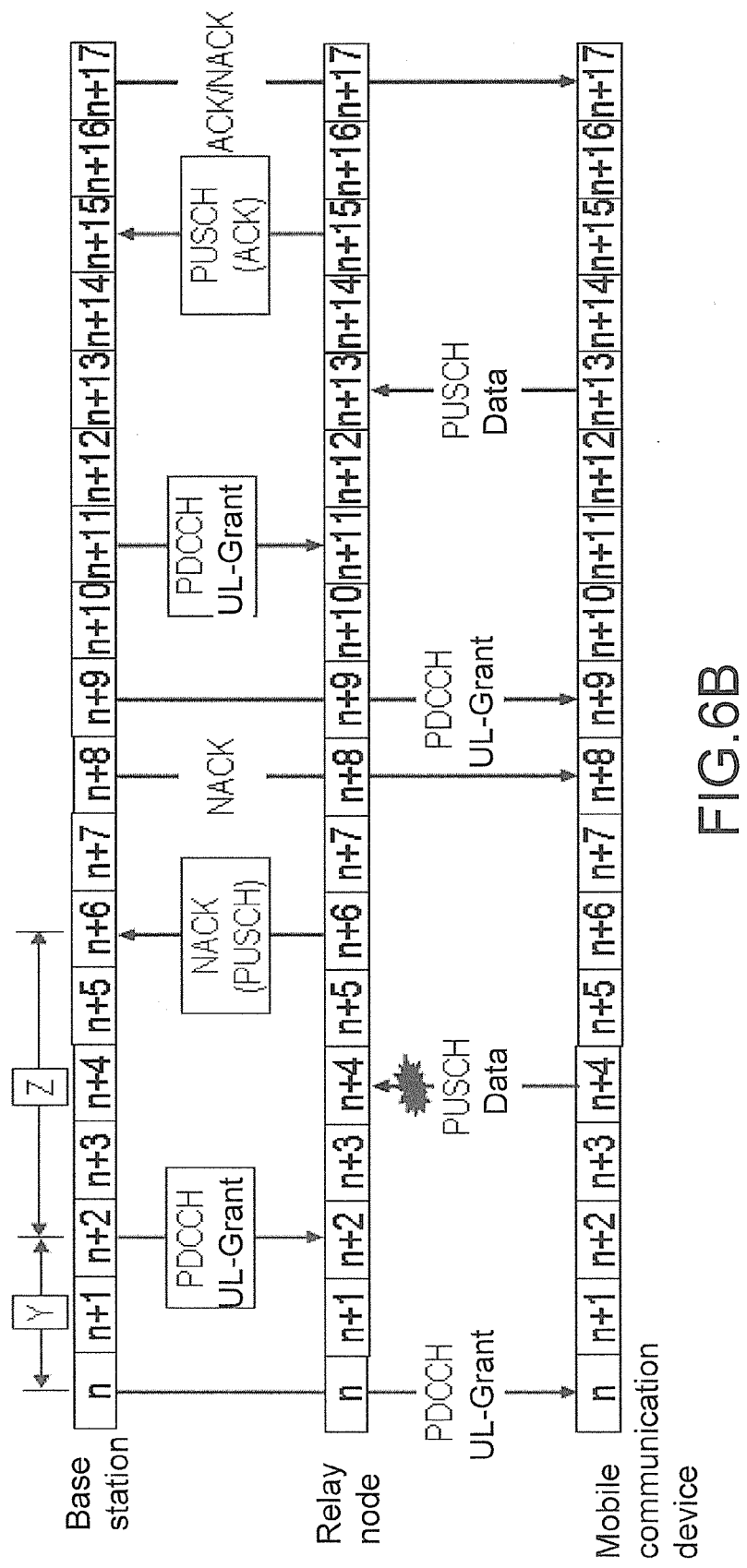
FIG. 6B is schematic diagram illustrating a HARQ process in an uplink transmission of a frequency division duplex mode of LTE system according a third exemplary embodiment.

FIG. 6A is schematic diagram illustrating a HARQ process in an uplink transmission of a FDD mode of LTE system according a second exemplary embodiment. FIG. 6B is schematic diagram illustrating a HARQ process in an uplink transmission of a FDD mode of LTE system according a third exemplary embodiment. FIG. 6A illustrates a normal data transmission situation, and FIG. B illustrates a situation of re-transmission. Since FIG. 6A and FIG. 6B both are of uplink transmission processes, the base station can respectively transmit grant signals to the relay node and the mobile communication device in advance.

In FIG. 6A and FIG. 6B, the value of Y represents a time interval from the timing point where the mobile communication device is granted uplink wireless resource to the timing point where the relay node is granted uplink wireless resource. For example, in the subframe "n" in FIG. 6A, the base station transmits PDCCH (UL-Grant) signal to the mobile communication device; in the subframe "n+2", the base station transmits PDCCH (UL-Grant) signal to the relay node. If the value of Y is negative, it represents that the wireless resource granted to the relay node arranged by the base station is earlier than the arrangement for granting wireless resource to the mobile communication device.

In FIG. 6A and FIG. 6B, the value of Z represents a time interval (time delay) between the timing point where the relay node is granted uplink wireless resource and the timing point where the relay node replies ACK/NACK signal or forwards uplink data to the base station. For example, in the subframe "n+2" in FIG. 6A, the base station transmits PDCCH (UL-Grant) signal to the relay node; in the subframe "n+4", the mobile communication device transmits PUSCH (the uplink data) to the relay node. When the relay node receives the PUSCH data, it then transmits the PUSCH data to the base station or replies ACK/NACK signal to the mobile communication device in the subframe "n+6". The base station then replies the ACK/NACK signal to the replay node, for notifying whether the PUSCH data is transmitted successfully. If 8≥Y+Z≥4 (i.e., 2×Z≥Y+Z≥Z), then it represents a non-late relay situation. On the contrary, if Y+Z≥8, it represents a late relay situation where the wireless resource is granted by the base station to the relay node for transmitting the uplink data after the relay node replies the ACK/NACK signal to the mobile communication device.

In FIG. 6A, if the wireless resource is granted by the base station to the relay node for transmitting the uplink data after the relay node replies the ACK/NACK signal to the mobile communication device, it represents a late relay situation. For example, in FIG. 6A, in the subframe "n+6", the relay node has received the uplink data from the mobile communication device, but the relay node is granted uplink wireless resource by the base station in the subframe "n+10", and thus the relay node transmits the PUSCH data to the base station or replies the ACK/NACK signal to the mobile communication device. If Y≥8, it represents a late grant situation. If Y+Z≥8, it represents a late relay situation. FIG. 6A illustrates normal transmission situations and an uplink data transmission failure is illustrated in FIG. 6B, where the base station may initiate a retransmission process of the mobile communication device or the relay node.

In FIG. 6B, the processes from the subframe "n" to the subframe "n+6" is similar to that shown in FIG. 6A, except that an error appears when the mobile communication device transmits the PUSCH data in the subframe "n+4", such that the relay node receives the corrupted uplink data. Then, the relay node may select to replay NACK to the mobile communication device with or without data. After the base station transmits the NACK signal to the mobile communication device in the subframe "n+8", the base station may initiate a retransmission process of the mobile communication device, where the base station may retransmit a new uplink grant signal to the mobile communication device or the relay node, or retransmit new uplink grant signals to both the mobile communication device and the relay node. For example, the base station transmits an uplink resource grant signal to the mobile communication device in the subframe "n+9", the base station transmits an uplink resource grant signal to the relay node in the subframe "n+11", the base station receives PUSCH data forwarded by the relay node or the relay node replies ACK signal to the mobile communication device in the subframe "n+15", and the base station replies ACK/NACK signal to the mobile communication device.

Figure 6C:
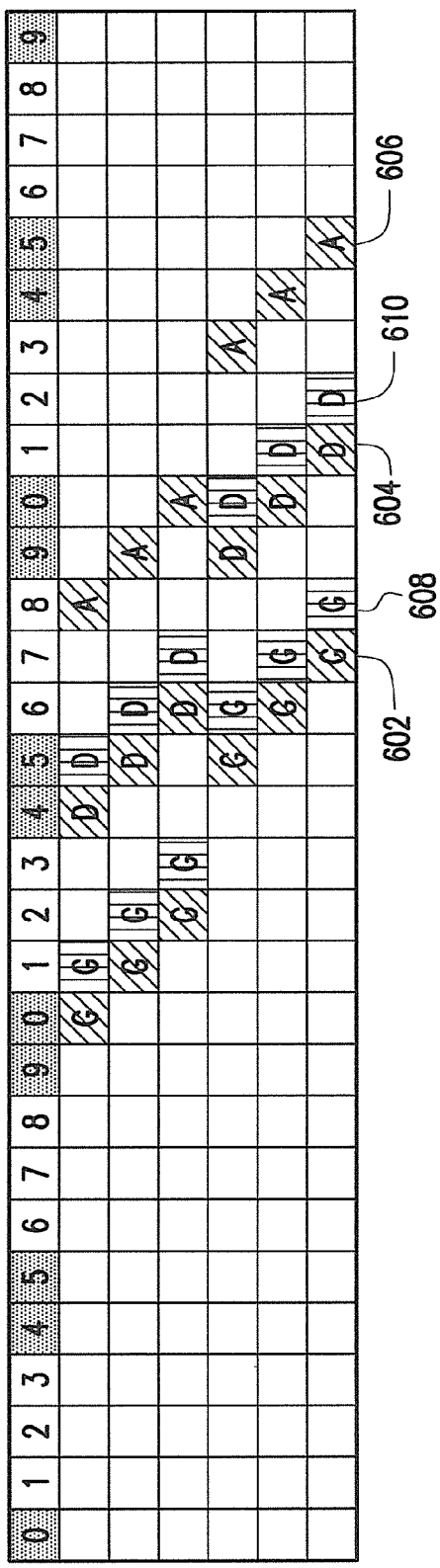
FIG. 6C, FIG. 6D and FIG. 6E are schematic diagrams illustrating associations of subframes in every configuration according to FIG. 6A.
Figure 6D:
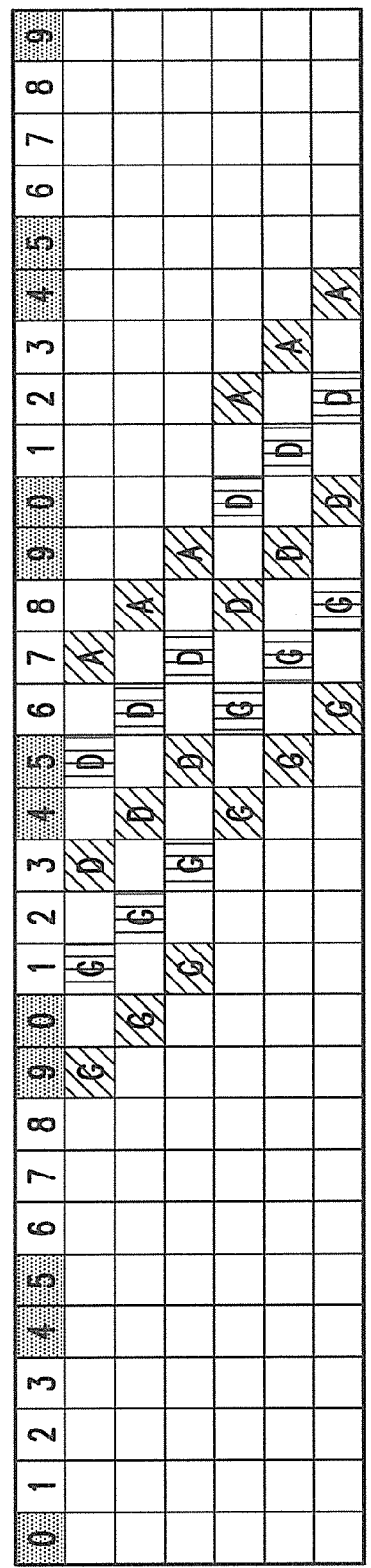
Figure 6E:
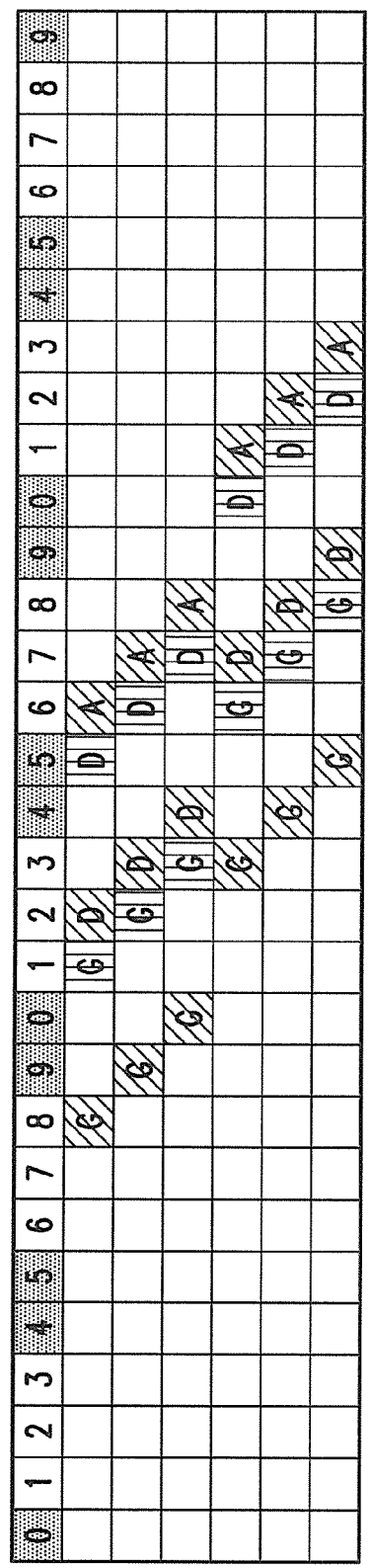

FIG. 6C, FIG. 6D and FIG. 6E are schematic diagrams illustrating associations of subframes in every configuration according to FIG. 6A. FIG. 6C, FIG. 6D and FIG. 6E all correspond to the HARQ process in an uplink transmission of the FDD mode with Z=4, and respectively provide three exemplary configuration tables converted from FIG. 6A or FIG. 6B. However, FIG. 6C, FIG. 6D and FIG. 6E respectively correspond to the conditions of Y=1, Y=2 and Y=3. In the configuration tables of FIG. 6C, FIG. 6D and FIG. 6E, the subframes with diagonal stripes on background (but labeled as "A" or "D" or "G") represent the subframes associated with the mobile communication device; the subframes without diagonal stripes on background (but labeled as "A" or "D" or "G") represent the subframes associated with the relay node. For example, the subframes 602, 604, 606 are the ones associated with the relay node; the subframes 608, 610 are the ones associated with the mobile communication device.

Moreover, from the top to the bottom, each row in FIG. 6C, FIG. 6D and FIG. 6E correspond to different configurations. For example, in FIG. 6C, since Y=1, the base station respectively grants the mobile communication device uplink wireless resource in the subframe 0, 1, 2, 5, 6, 7 or 8 (the subframe labeled as "G"), and respectively grants the relay node uplink wireless resource in the subframe 1, 2, 3, 6, 7, or 8 (the subframe labeled as "G") and there is 1 subframe interval between the two processes. The relay node then forwards data to the base station in the subframe 5, 6, 7, 0, 1 or 2 (the subframe labeled as "D").

For example, referring to FIG. 6B, if Y=1, the base station grants uplink wireless resource to the mobile communication device in subframe 0, 1, 2, 5, 6 or 7, then the relay node is correspondingly granted the uplink wireless resource in subframe 1, 2, 3, 6, 7 or 8, and the relay node forwards the uplink data in subframe 5, 6, 7, 0, 1 or 2; if Y=2, the base station grants uplink wireless resource to the mobile communication device in subframe 9, 0, 1, 4, 5 or 6, then the relay node is correspondingly granted the uplink wireless resource in subframe 1, 2, 3, 6, 7 or 8, and the relay node forwards the uplink data in subframe 5, 6, 7, 0, 1 or 2; if Y=3, the base station grants uplink wireless resource to the mobile communication device in subframe 8, 9, 0, 3, 4 or 5, then the relay node is correspondingly granted the uplink wireless resource in subframe 1, 2, 3, 6, 7 or 8, and the relay node forwards the uplink data in subframe 5, 6, 7, 0, 1 or 2. The disclosure is not limited to the case where Z=4, and in other embodiments, the value of Z can be other integers based upon practical design parameters of the wireless relay system; the corresponding value of Y can be 1, 2, 3 or other integers.

Figure 7A:
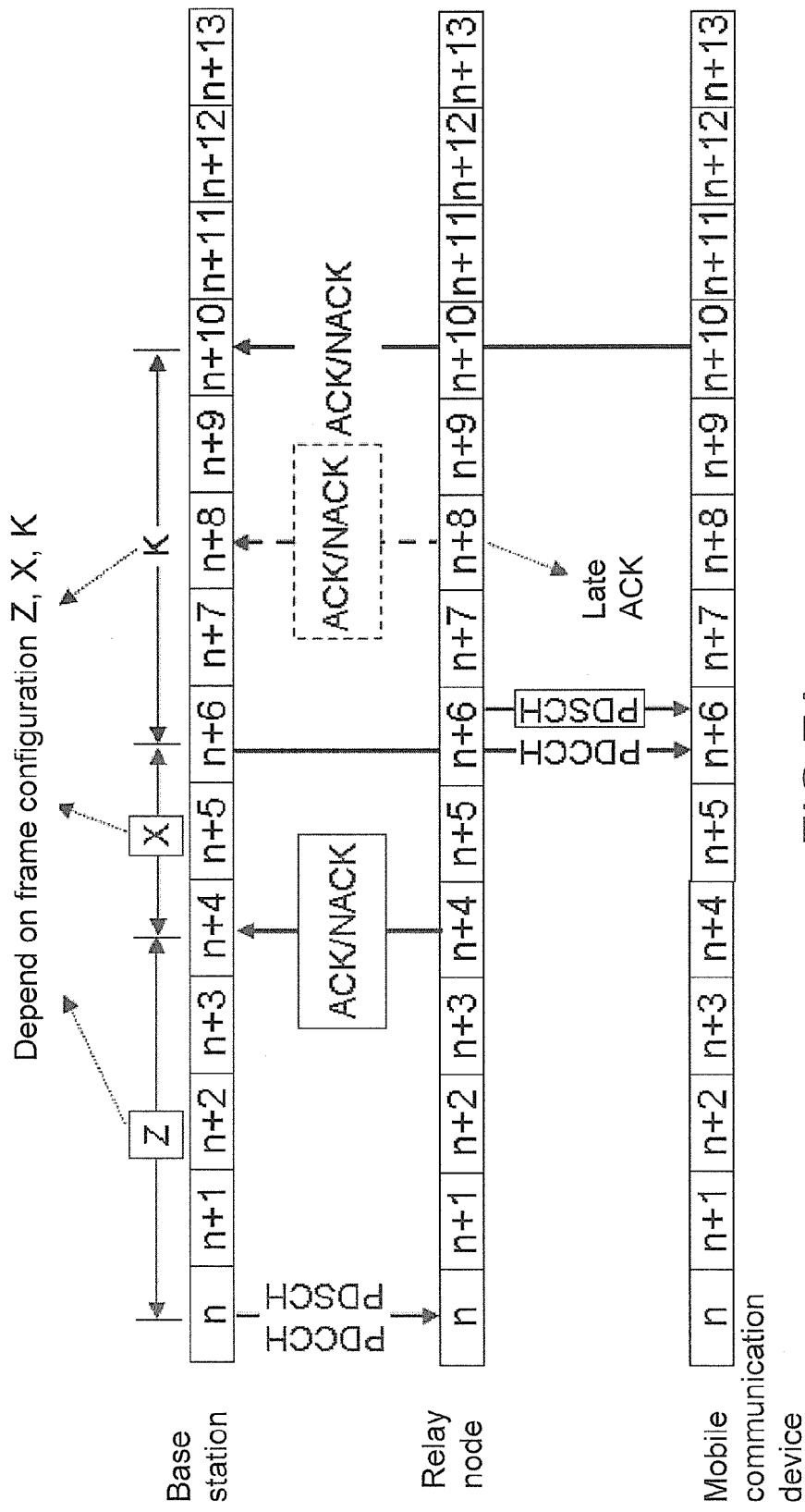
FIG. 7A is schematic diagram illustrating a HARQ process in a downlink transmission of a time division duplex mode of LTE system according a fourth exemplary embodiment.

FIG. 7A is schematic diagram illustrating a HARQ process in a downlink transmission of a TDD mode of LTE system according a fourth exemplary embodiment. FIG. 7A is mostly similar to FIG. 5A, except that there is an extra K value in FIG. 7A, and the values of K, X, Z are selected according to TDD mode configurations. In FIG. 7A, similar to FIG. 5A, the value of Z represents the timing delay (the number of subframes) between the relay node receives downlink PDCCH/PDCCH to the relay node replies the ACK/NACK signal. Moreover, since the transmission result of the downlink data to the relay node, the base station may also delay transmitting PDCCH data to the mobile communication device, in X subframes. If the value of X is negative, it implicitly represents a late ACK. That is, the relay node transmits the ACK/NACK signal to the base station after the base station downlink transmits PDCCH data to the mobile communication device. In addition, in the downlink transmission process of the TDD mode, the base station and the relay node can simultaneously or cooperatively transmits control signal and/or data to the mobile communication device.

Figure 7B:
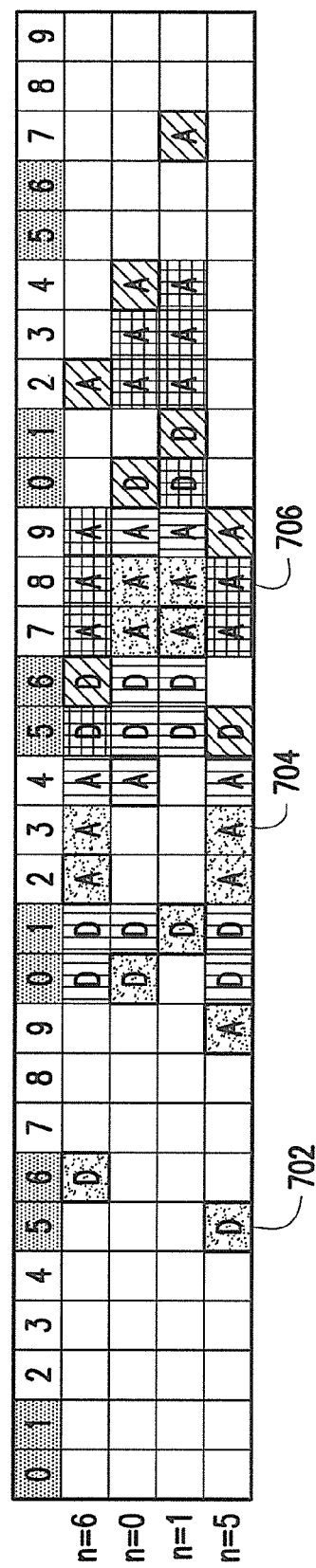
FIG. 7B is a schematic diagram illustrating associations of subframes in every configuration according to FIG. 7A.

The values of K in FIG. 7A represents a time interval from the timing point where the mobile communication device receives the downlink data to the timing point where the mobile communication device replies ACK/NACK signal to the base station. FIG. 7B is a schematic diagram illustrating associations of subframes in every configuration according to FIG. 7A, and provides a configuration table converted from FIG. 7A. In the configuration tables of FIG. 7B, the subframe with diagonal stripes on background (but labeled as "A" or "D") represents the subframe associated with the mobile communication device; the subframes without diagonal stripes on background (but labeled as "A" or "D") represent the subframes associated with the relay node. Moreover, the subframe with thick frame lines (e.g., the subframe 702) represents a conflict situation, and it means that the relay node and the mobile communication device may transmit the ACK signal or the data to the base station in the same subframe. The subframe with less number of dots on background (e.g., the subframe 704) represents the subframe of a normal situation. The subframe with small squares on background (e.g., the subframe 706) represents a late ACK. In addition, the value of n shown in FIG. 7B are the subframe numbers, from the top to the bottom, n=6, 0, 1 or 5, and Z≥4.

For example, referring to FIG. 7B, if downlink wireless resource is granted in the subframe 6 (i.e., n=6) for transmitting the downlink data to the mobile communication device, then in a normal situation, the relay node can be granted wireless resource to transmit the downlink data in the subframe 0 or 1; in a (data) conflict situation, the relay node can be granted wireless resource to transmit the downlink data in the subframe 6; in a late ACK situation, the relay node can be granted wireless resource to transmit the downlink data in the subframe 5. Moreover, in a normal situation, the relay node can be granted wireless resource to reply ACK/NACK signal to the base station in the subframe 4. In a (ACK/NACK) conflict situation, the relay node can be granted wireless resource to reply ACK/NACK signal to the base station in the subframe 2; in a (data) conflict situation, the relay node can be granted wireless resource to reply ACK/NACK signal to the base station in the subframe 3; in a late ACK situation, the relay node can be granted wireless resource to reply ACK/NACK signal to the base station in the subframe 7, 8 or 9.

For another example, referring to FIG. 7B, when the subframe number n=0, in a normal situation, the relay node can be granted wireless resource to transmit the downlink data in the subframe 5 or 6; in a (data) conflict situation, the relay node can be granted wireless resource to transmit the downlink data in the subframe 0 or 1. Moreover, in a normal situation, the relay node can be granted wireless resource to reply ACK/NACK signal to the base station in the subframe 9. In a (ACK/NACK) conflict situation, the relay node can be granted wireless resource to reply ACK/NACK signal to the base station in the subframe 4; in a (data) conflict situation, the relay node can be granted wireless resource to reply ACK/NACK signal to the base station in the subframe 7 or 8; in a late ACK situation, the relay node can be granted wireless resource to reply ACK/NACK signal to the base station in the subframe 2 or 3.

In FIG. 7A, the aforementioned normal situation is that the relay node successfully receives the downlink data of the base station, and replies ACK/NACK signal to the base station before transmitting the downlink data to the mobile communication device; the aforementioned conflict situation is that, under the operation principle of the TDD UL-to-DL switch-point periodicity shown in FIG. 3A, the base station can allocate the same subframe number for transmitting grant signal or transmitting data to the relay node and the mobile communication device; the aforementioned late ACK situation is that the relay node replies ACK/NACK signal to the base station after the base station transmits the downlink data to the mobile communication device. The subframe used for ACK/NACK signal may also be associated with the subframe used for transmitting the downlink data, and the association can be selected depending upon the value of Z and frame configurations of the TDD mode.

FIG. 7C summarizes a portion of a downlink transmission process in a TDD mode according to FIG. 7B. FIG. 7C illustrates that when the subframe "n" is granted for transmitting the downlink data, the subframe "n-X" can be granted for the relay node replying ACK/NACK signal to the base station, or due to the UL-to-DL switch-point periodicity, the subframe "n-X+10" can be granted for the relay node replying the ACK/NACK signal to the base station. In each table of FIG. 7C, the figure underscored (e.g., the FIG. 8 in the table of the subframe n=0 corresponding to the configuration 0) is a late ACK situation; the figure in a bracket (e.g., the (3, 2) in the table of the subframe n=0 corresponding to the configuration 0) is a conflict situation, and these principles can be applied to FIG. 7D. The figure in each table in FIG. 7C represents the value of X. For example, in a normal situation of the subframe n=0, the relay node can reply ACK/NACK signal to the base station in the subframe 4 or 9 (corresponding to X=6 or X=1); in a conflict situation of the subframe n=0, the relay node can reply ACK/NACK signal to the base station in the subframe 7 or 8 (corresponding to X=3 or X=2); in a late ACK situation of the subframe n=0, the relay node can reply ACK/NACK signal to the base station in the subframe 2 or 3 (corresponding to X=8 or X=7).

FIG. 7D summarizes another portion of a downlink transmission process in a TDD mode according to FIG. 7B. FIG. 7D illustrates that when the subframe "n" is granted for transmitting the downlink data, the subframe "n-(X+Z)" can be granted for the relay node forwarding the downlink data to the mobile communication device, or due to the UL-to-DL switch-point periodicity, the subframe "n-(X+Z)+10" can be granted for the relay node forwarding the downlink data to the mobile communication device. For example, in a normal situation of the subframe n=0, the relay node can forward the downlink data to the mobile communication device in the subframe 5 or 6 (corresponding to X=5 or X=4); in a conflict situation of the subframe n=0, the relay node can forward the downlink data to the mobile communication device in the subframe 0 (corresponding to X=10). The disclosure is not limited to FIG. 7A to FIG. 7D, and in other embodiments, the downlink transmission methods of the TDD mode can also be operated in configuration 1, 2, 3, 4, 5 or 6.

FIG. 7E summarizes downlink transmission processes of all configurations in a TDD mode according to FIG. 7A. In FIG. 7E, it is illustrated that, in configuration 0 to configuration 6, if the subframe "n" can be granted for transmitting the downlink data, the subframe "n-(X+Z)" or subframe "n-(X+Z)+10" can be granted to the relay node for forwarding the downlink data to the mobile communication device. The figures in the table of FIG. 7E are values of "X+Z", and Z≥4. In other words, the table in FIG. 7E records, in every configuration, the value of X corresponding to the specific subframe number n and the corresponding subframe number at which the relay node forwards the downlink data to the mobile communication device. For example, in configuration 0, when the eNB 124 transmits the downlink data to the relay node 126 in subframe 0, the relay node 126 can determine to forward the downlink data to the UE 136 in subframe 10, 6 or 6 (respectively corresponding to X+Z=0, X+Z=4, X+Z=5) according to the table in FIG. 7E.

FIG. 8A is schematic diagram illustrating a HARQ process in an uplink transmission of a TDD mode of LTE system according a fifth exemplary embodiment. FIG. 8A is mostly similar to FIG. 6A, except that there is an extra K value in FIG. 8A, and the values of K, Y, Z are selected according to TDD mode configurations. In FIG. 8A, similar to FIG. 6A, the value of Y represents the time interval (the number of subframes) from the timing point where the mobile communication device is granted uplink wireless resource to the timing point where the relay node is granted uplink wireless resource. If the value of Y is negative, it represents that the base station arranges granting uplink wireless resource to the relay node earlier than the arrangements of granting uplink wireless resource to the mobile communication device. In FIG. 8A, the value of Z represents the number of subframes (or the time interval) between the timing point where the relay node is granted uplink wireless resource and the timing point where the relay node replies ACK/NACK signal to the mobile communication device or forwards the uplink data to the base station.

For example, in this uplink transmission of the TDD mode, the situation of late ACK represents that the base station grants the uplink wireless resource to the relay node for forwarding the uplink data from the mobile communication device after the relay node transmits the ACK/NACK signal to the mobile communication device; the situation of late relay after represents that the relay node forwards the uplink data from the mobile communication device to the base station after the relay node replies ACK/NACK signal to the mobile communication device; the situation of conflict represents that the mobile communication device and the relay node transmits the uplink data or replies ACK/NACK in the same subframe.

Figure 8B:
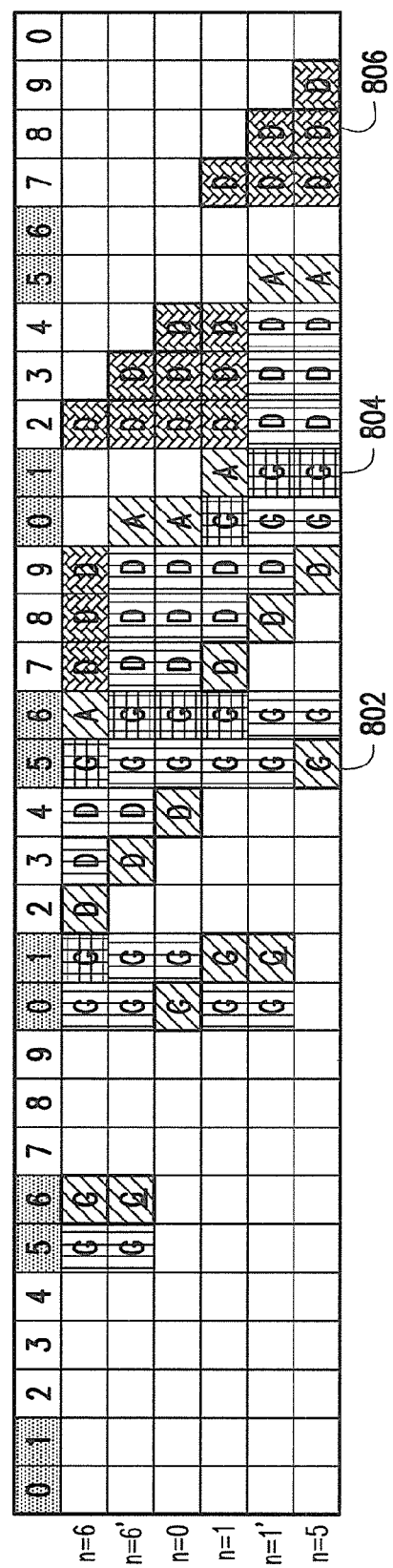
FIG. 8B is a schematic diagram illustrating associations of subframes in every configuration according to FIG. 8A, and provides a configuration table converted from FIG. 8A.

The values of K in FIG. 8A represents a time interval from the timing point where the relay node receives the uplink data to the timing point where the relay node replies ACK/NACK signal to the mobile communication device. FIG. 8B is a schematic diagram illustrating associations of subframes in every configuration according to FIG. 8A, and provides a configuration table converted from FIG. 8A. In the configuration table of FIG. 8B, the subframe with diagonal stripes on background (but labeled as "A" or "D" or "G") represents the subframe associated with the mobile communication device; the subframes without diagonal stripes on background (but labeled as "A" or "D" or "G") represent the subframes associated with the relay node. The subframes without diagonal stripes on background refer to the subframes with, for example, vertical stripes, horizontal stripes, squares or weaved patterns on background. Moreover, the subframe with thick frame lines (e.g., the subframe 802) represents a conflict situation; the subframe with small squares on background (e.g., the subframe 804) represents a late grant situation; the subframe with weaved patterns on background (e.g., the subframe 806) represents a late relay situation. In addition, the value of n shown in FIG. 8B are the subframe numbers, from the top to the bottom, n=6, 6', 0, 1, 1' or 5, and Z≥4.

For example, referring to FIG. 8B, if uplink wireless resource is granted to the mobile communication device in the subframe 6 (i.e., n=6), then in a normal situation, the relay node can be granted to transmit the uplink data in subframe 3 or 4; in a (data) conflict situation, the relay node can be granted to transmit the uplink data in the subframe 2; in a late relay situation, the relay node can be granted to transmit the uplink data in the subframe 7, 8 or 9. Moreover, in a normal situation, the relay node can receive a grant signal of the uplink wireless resource by the base station in subframe 5 or 0; in a (grant) conflict situation, the relay node can receive the grant signal of the uplink wireless resource by the base station in subframe 6; in a late relay situation, the relay node can receive the grant signal of the uplink wireless resource by the base station in subframe 1 or 5.

For another example, referring to FIG. 8B, if the uplink wireless resource is granted in subframe 0, which means that when the subframe number n=0, in a normal situation, the relay node can be granted to transmit the uplink data in subframe 7, 8 or 9; in a (data) conflict situation, the relay node can be granted to transmit the uplink data in subframe 4; in a late relay situation, the relay node can be granted to transmit the uplink data in subframe 2, 3 or 4. Moreover, in a normal situation, the relay node can receive the grant signal of the uplink wireless resource from the base station in subframe 5. In a (Grant) conflict situation, the relay node can receive the grant signal of the uplink wireless resource from the base station in the subframe 0; in a late relay situation, the relay node can receive the grant signal of the uplink wireless resource from the base station in the subframe 6.

In FIG. 8A and FIG. 8B, the aforementioned normal situation is that the relay node successfully receives the uplink data of the mobile communication device, and replies ACK/NACK signal to the mobile communication device before transmitting the uplink data to the base station; the aforementioned conflict situation is that, under the operation principle of the TDD UL-to-DL switch-point periodicity shown in FIG. 3A, the base station can allocate the same subframe number for transmitting a grant signal or transmitting data to the relay node and the mobile communication device; the aforementioned late relay situation is that the relay node forwards the uplink data to the base station after the relay node replies ACK/NACK signal to the mobile communication device. The subframe used for ACK/NACK signal may also be associated with the subframe used for transmitting the uplink data, and the association can be selected depending upon the value of Z and frame configurations of the TDD mode.

FIG. 8C summarizes a portion of an uplink transmission process in a TDD mode according to FIG. 8B. FIG. 8C illustrates that when the mobile communication device is granted uplink wireless resource in the subframe "n" for transmitting the uplink data, the relay node can receive a grant signal from the base station in the subframe "n+Y", or due to the UL-to-DL switch-point periodicity, the relay node can receive the grant signal from the base station in the subframe "n+Y−10". In each table of FIG. 8C, the figure underscored (e.g., the FIG. 6 in the table of the subframe n=0 corresponding to the configuration 0) is a late grant situation or a late relay situation; the figure in a bracket (e.g., the (0) in the table of the subframe n=0 corresponding to the configuration 0) is a conflict situation, and these principles can be applied to FIG. 7D. The figures in each table in FIG. 7C represent the value of Y. For example, under the condition of 4≤Z<10, in a normal situation of the subframe n=0, the relay node can receive a grant signal from the base station in subframe 1 or 5 (corresponding to Y=1 or Y=5); in a conflict situation of the subframe n=0, the relay node can receive a grant signal from the base station in the subframe 0 (corresponding to Y=0); in a late relay situation of the subframe n=0, the relay node can receive a grant signal from the base station in the subframe 6 (corresponding to Y=6).

FIG. 8D summarizes another portion of an uplink transmission process in a TDD mode according to FIG. 8B. FIG. 8D illustrates that when the subframe "n" is granted for the mobile communication device transmitting the uplink data, the subframe "n+(Y+Z)" can be granted for the relay node forwarding the uplink data to the base station, or due to the UL-to-DL switch-point periodicity, the subframe "n+(Y+Z)+10" can be granted for the relay node forwarding the uplink data to the base station. For example, in a normal situation of the subframe n=0, the relay node can forward the uplink data to the base station in the subframe 7, 8 or 9 (corresponding to Y=7 or Y=8 or Y=9); in a conflict situation of the subframe n=0, the relay node can forward the uplink data to the base station in the subframe 14 (corresponding to Y=14); in a late relay situation of the subframe n=0, the relay node can forward the uplink data to the base station in the subframe 12 or 13 (corresponding to Y=12 or Y=13). The disclosure is not limited to FIG. 8A to FIG. 8D, and in other embodiments, the uplink transmission methods of the TDD mode can also be operated in configuration 1, 2, 3, 4, 5 or 6.

The subframe n=1 in FIG. 8B to FIG. 8D represents that the base station transmits a grant signal to the mobile communication device in the subframe 1, the mobile communication device transmits uplink data in subframe 7, and the base station replies ACK/NACK signal to the mobile communication device in subframe 1 of the next frame period. The subframe n=1' represents that the base station transmits a grant signal to the mobile communication device in the subframe 1, the mobile communication device transmits uplink data in subframe 8, and the base station replies ACK/NACK signal to the mobile communication device in subframe 5 of the next frame period. The subframe n=6 represents that the base station transmits a grant signal to the mobile communication device in the subframe 6, the mobile communication device transmits uplink data in subframe 2 of the next frame period, and the base station replies ACK/NACK signal to the mobile communication device in subframe 6 of the next frame period. The subframe n=6' represents that the base station transmits a grant signal to the mobile communication device in the subframe 6, the mobile communication device transmits uplink data in subframe 3 of the next frame period, and the base station replies ACK/NACK signal to the mobile communication device in subframe 0 of the further next frame period. In FIG. 8C, if Y=0, it represents that the grants signal can be simultaneously transmitted by the base station to the relay node and the mobile communication device.

FIG. 8E summarizes subframe numbers at which a relay node receives a grant signal of uplink wireless resource in uplink transmission processes of all configurations in a TDD mode according to FIG. 8A. In FIG. 8E, it is illustrated that, in configuration 0 to configuration 6, if the base station grants the mobile communication device to transmit uplink data in the subframe "n", the relay node can be granted uplink wireless resource for forwarding the uplink data to the base station in the subframe "n+(Y)" or subframe "n+(Y)−10". The figures in the table of FIG. 7E are values of "Y", and 4≤Z<10. In other words, the table in FIG. 8E records, in every configuration, the value of Y corresponding to the specific subframe number n, the corresponding subframe number at which the mobile communication device receives a grant signal of uplink wireless resource, and the corresponding subframe number at which the relay node forwards the uplink data to the base station. For example, in configuration 0, when the eNB 124 grants the uplink wireless resource to the UE 136 in subframe 0, the eNB 124 can determine to grant the uplink wireless resource to the relay node 126 in subframe 0, 1, 5 or 6 respectively corresponding to Y=0, Y=1, Y=5 or Y=6) according to the table in FIG. 8E. If Y<0, it represents that the base station arranges granting the uplink wireless resource to the relay node earlier than the arrangement of granting the uplink wireless resource to the mobile communication device.

FIG. 8F summarizes subframe numbers at which a relay node forwards uplink data in uplink transmission processes of all configurations in a TDD mode according to FIG. 8A. In FIG. 8F, it is illustrated that, in configuration 0 to configuration 6, if the base station transmits a grant signal of uplink wireless resource to the relay node in the subframe "n", the relay node can be granted uplink wireless resource for forwarding the uplink data to the base station in the subframe "n+(Y+Z)" or subframe "n+(Y+Z)−10". The figures in the table of FIG. 8F are values of "Y+Z", and 4≤Z<10. In other words, the table in FIG. 8F records, in every configuration, the value of Y corresponding to the specific subframe number n, the corresponding subframe number at which the relay node receives a grant signal of the uplink wireless resource, and the corresponding subframe number at which the relay node forwards the uplink data to the base station. For example, in configuration 0, when the eNB 124 grants the uplink wireless resource to the relay node 126 in subframe 0, the relay node 126 can determine to forward the uplink data of the UE 136 to the eNB 124 in subframe 2, 3, 4, 7, 8 or 9 (respectively corresponding to Y+Z=2, Y+Z=3, Y+Z=4, Y+Z=7, Y+Z=8 or Y+Z=9) according to the table in FIG. 8F.

Figure 9:
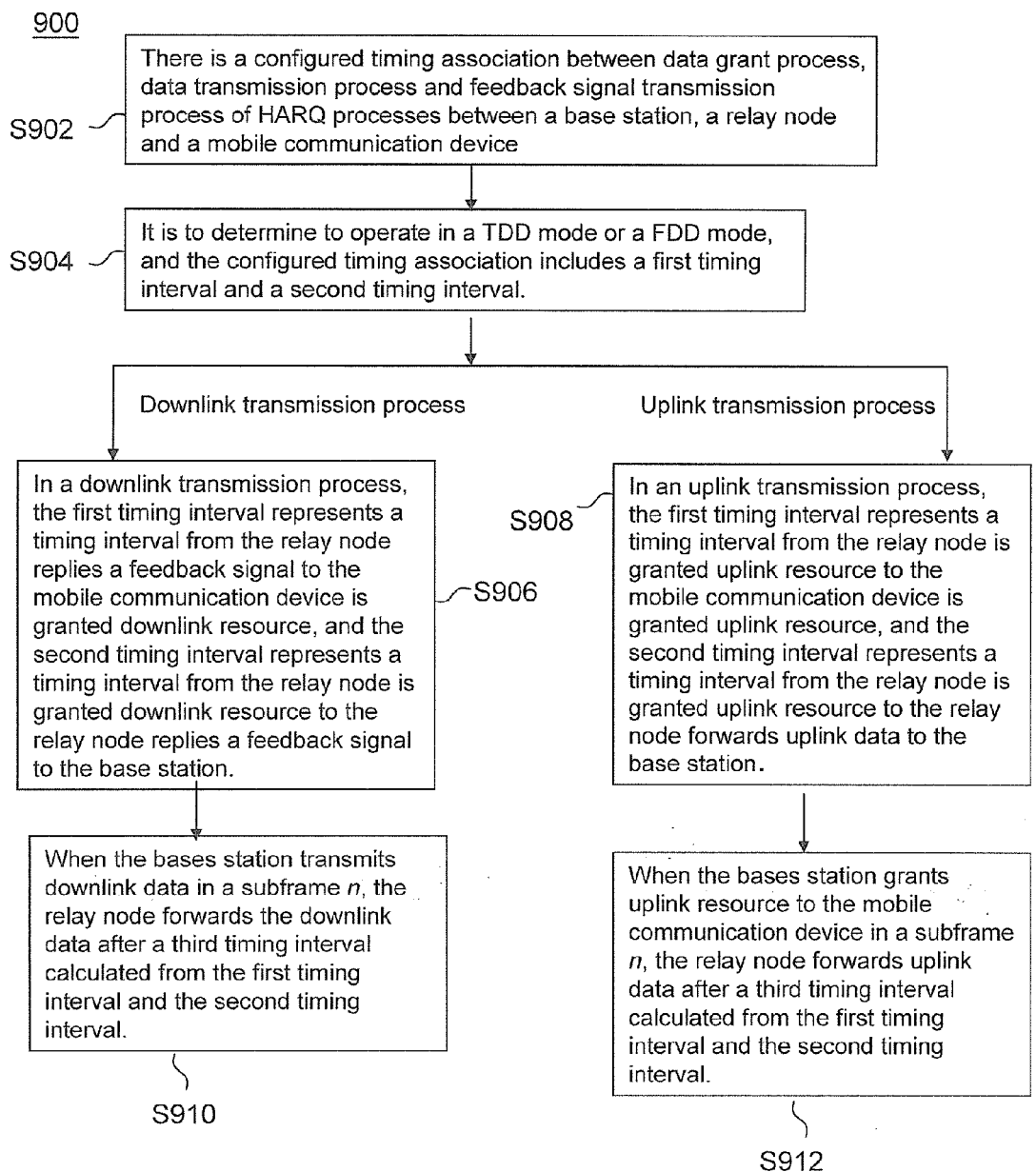
FIG. 9 is a flowchart illustrating a transmission method for a wireless relay system summarized from the first exemplary embodiment to the fifth exemplary embodiment.

After the transmission methods for a wireless relay system of the first exemplary embodiment to the fifth exemplary embodiment are introduced above in accordance with FIG. 5A to FIG. 8F, these transmission methods for a wireless relay system can be briefly summarized as a flowchart as illustrated in FIG. 9 below. FIG. 9 is a flowchart illustrating a transmission method 900 for a wireless relay system summarized from the first exemplary embodiment to the fifth exemplary embodiment. The transmission method 900 is adapted for a wireless relay communication system and enables at least a base station in the wireless relay communication system, with facilitation of at least a relay node, to provide a relay service to at least a mobile communication device.

The transmission method 900 can be implemented by storing the configuration tables shown in FIG. 5B-FIG. 5D, FIG. 6C-FIG. 6E, FIG. 7E and FIG. 8E-FIG. 8F on the base station, the relay node and the mobile communication device, so as to avoid the situations of dynamically assigning indication signals. The base station, the relay node and the mobile communication device can thus perform a grant signal transmission process, a data transmission process and a feedback signal transmission process with a configured timing association or a fixed timing association according to the configuration tables. In addition, an uplink grant signal just appears in the uplink data transmission, but there could be no grant signal for the downlink data transmission.

In step S902, there is a configured timing association or a fixed timing association between at least a grant signal transmission process, at least a data transmission process and at least a feedback signal transmission process of HARQ processes between the base station, the relay node and the mobile communication device. Referring to FIG. 9, the data transmission process can include an uplink data transmission process and a downlink data transmission process, and, at the same time, can also include a relay node forwarding the uplink data to the base station and the relay node forwarding the downlink data to the mobile communication device. Moreover, the transmission method 900 can be operated in a TDD mode or in a FDD mode, so in step S904, it is to determine (or decide) to operate in a TDD mode or a FDD mode, and the configured timing association include a first time interval and a second time interval. Furthermore, in the step S904, it is further to determine whether the transmission method 900 is operated in a downlink transmission process or an uplink transmission process. If it is to be operated in the uplink transmission process, then steps S906, S910 are executed after the step S904. If it is to be operated in the downlink transmission process, then steps S908, S912 are executed after the step S904.

In step S906, in a downlink transmission process, the first time interval represents a time interval from the timing point where the relay node replies a feedback signal to the timing point where the mobile communication device is granted downlink wireless resource, and the second time interval represents a time interval from the timing point where the relay node is granted downlink wireless resource to the timing point where the relay node replies a feedback signal to the base station.

In step S910, when the bases station transmits the downlink data in a subframe n, the relay node forwards the downlink data after a third time interval calculated from the first time interval and the second time interval.

In step S908, in an uplink transmission process, the first time interval represents a time interval from the timing point where the relay node is granted uplink wireless resource to the mobile communication device is granted uplink resource, and the second time interval represents a time interval from the timing point where the relay node is granted uplink wireless resource to the timing point where the relay node forwards uplink data to the base station.

In step S912, when the bases station grants uplink wireless resource to the mobile communication device in a subframe n, the relay node forwards the uplink data after a third time interval calculated from the first time interval and the second time interval.

To be further illustrated following the step S910, if it is operated in the downlink transmission process of the FDD mode, then meanings and timing associations of the first time interval, such as the value of X, and the second time interval, such as the value of Z can be referred to the exemplary embodiment shown in FIG. 5A. Referring to FIG. 5A and the configuration tables similar to those shown in FIG. 5B-FIG. 5C, it can respectively determine the subframe for the relay node receiving the downlink data, the subframe for the mobile communication device receiving the downlink data, the subframe for the relay node replying the feedback signal, the subframe for the relay node forwarding the downlink data and the subframe for the mobile communication device replying the feedback signal, based upon the configurations of the wireless relay communication system, the configured values of X and Z, and subframe for the base station transmitting the downlink data. The values of X and Z can be referred to associated descriptions of FIG. 5A, so they are not repeated herein.

To be further illustrated following the step S912, if it is operated in the uplink transmission process of the FDD mode, then meanings and timing associations of the first time interval, such as the value of Y, and the second time interval, such as the value of Z can be referred to the exemplary embodiment shown in FIG. 6A-FIG. 6B. Referring to FIG. 6A-FIG. 6B and the configuration tables similar to those shown in FIG. 6C-FIG. 6E, it can respectively determine the subframe for the relay node receiving the grant signal, the subframe for the mobile communication device receiving the uplink data, the subframe for the relay node replying the feedback signal, the subframe for the mobile communication device transmitting the uplink data, the subframe for the relay node forwarding the uplink data and the subframe for the base station replying the feedback signal, based upon the configurations of the wireless relay communication system, the configured values of Y and Z, and subframe for the base station transmitting the grant signal to the mobile communication device. The values of Y and Z can be referred to associated descriptions of FIG. 6A, so they are not repeated herein.

To be further illustrated following the step S910, if it is operated in the downlink transmission process of the TDD mode, then meanings and timing associations of the first time interval, such as the value of X, and the second time interval, such as the value of Z can be referred to the exemplary embodiment shown in FIG. 7A. Referring to FIG. 7A and the configuration tables similar to those shown in FIG. 7E, it can respectively determine the subframe for the relay node receiving the downlink data, the subframe for the mobile communication device receiving the downlink data, the subframe for the relay node replying the feedback signal, the subframe for the relay node forwarding the downlink data and the subframe for the mobile communication device replying the feedback signal, based upon the configurations of the wireless relay communication system, the configured values of X and Z, and subframe for the base station transmitting the downlink data. The values of X and Z can be referred to associated descriptions of FIG. 7A, so they are not repeated herein.

To be further illustrated following the step S912, if it is to be operated in the uplink transmission process of the TDD mode, then meanings and timing associations of the first time interval, such as the value of Y, and the second time interval, such as the value of Z can be referred to the exemplary embodiment shown in FIG. 8A. Referring to FIG. 8A and the configuration tables similar to those shown in FIG. 8E-FIG. 8F, it can respectively determine the subframe for the relay node receiving the grant signal, the subframe for the mobile communication device receiving the uplink data, the subframe for the relay node replying the feedback signal, the subframe for the mobile communication device transmitting the uplink data, the subframe for the relay node forwarding the uplink data and the subframe for the base station replying the feedback signal, based upon the configurations of the wireless relay communication system, the configured values of Y and Z, and subframe for the base station transmitting the grant signal to the mobile communication device. The values of Y and Z can be referred to associated descriptions of FIG. 8A, so they are not repeated herein.

Similar to FIG. 9, the situations of dynamically assigning indication signals can be avoided by storing the following configuration tables (or called mapping tables) shown in FIG. 10A-FIG. 13H on the base station, the relay node and the mobile communication device, so as to avoid the situations of. The base station, the relay node and the mobile communication device can thus perform a grant signal transmission process, a data transmission process, a feedback signal transmission process and an acknowledgement signal transmission process with a configured timing association or a fixed timing association according to the configuration tables. In addition, an uplink grant signal just appears in the uplink data transmission, but there could be no grant signal for the downlink data transmission.

FIG. 10A-FIG. 10I are schematic diagrams respectively illustrating associations of subframes in every configuration of different embodiments according to FIG. 5A.

Figure 10A:
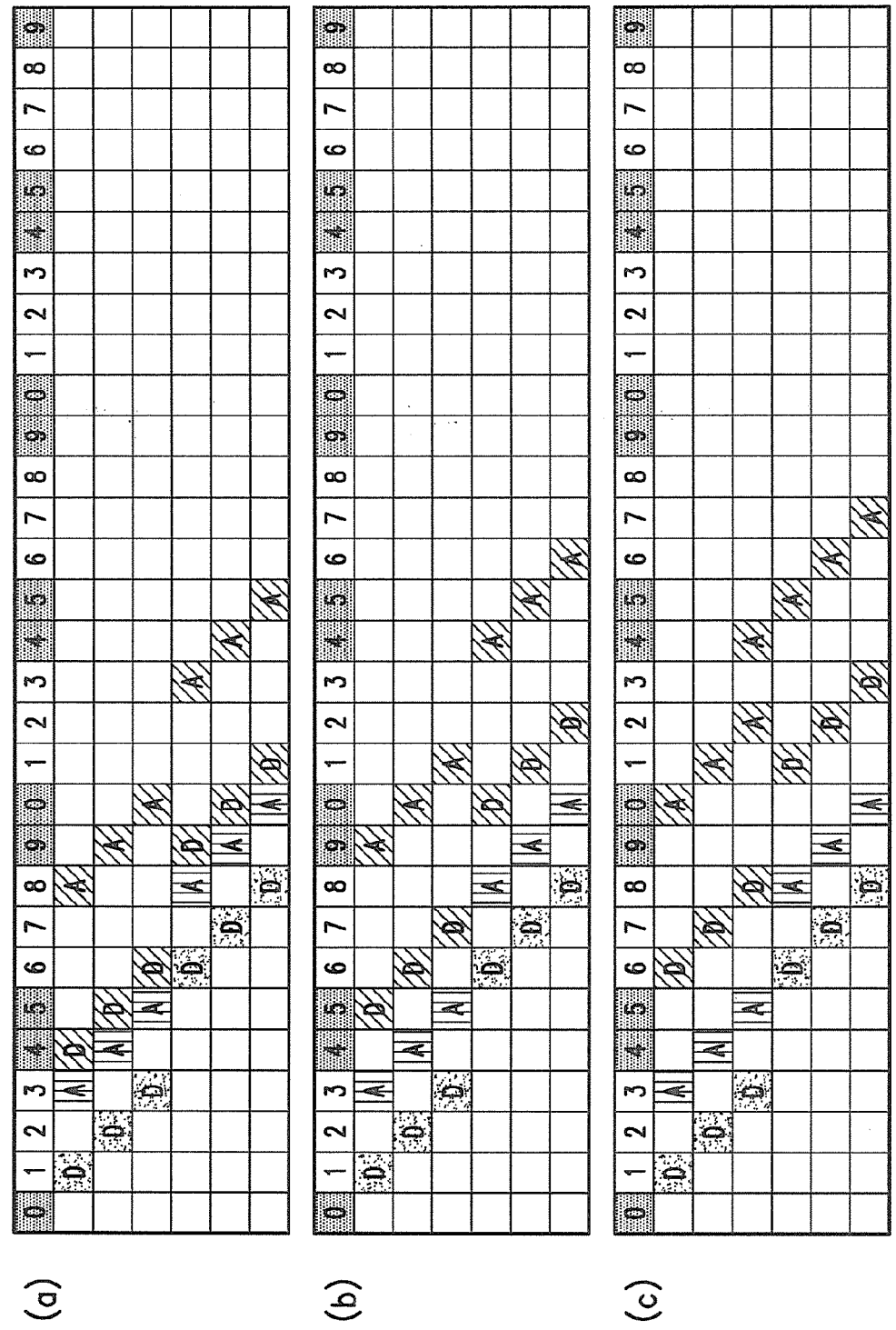

In FIG. 10A, Z=2, and the sub-diagrams (a), (b), (c) respectively correspond to X=1, X=2, X=3. Each row in the sub-diagrams (a), (b), (c) of FIG. 10A respectively correspond to different configurations.

Figure 10B:
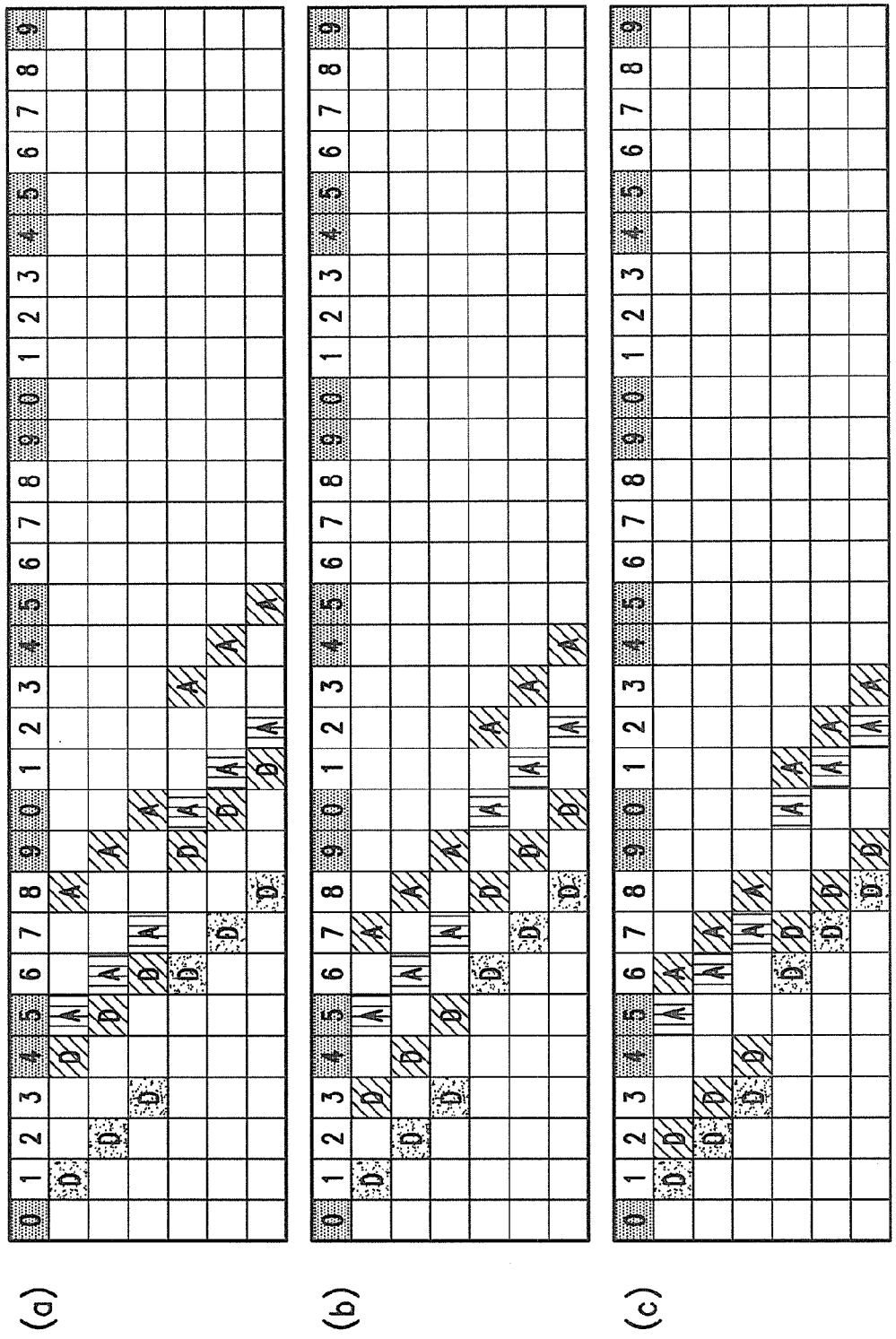

In FIG. 10B, Z=4, and the sub-diagrams (a), (b), (c) respectively correspond to X=−1, X=−2, X=−3. Each row in the sub-diagrams (a), (b), (c) of FIG. 10B respectively correspond to different configurations.

Figure 10C:
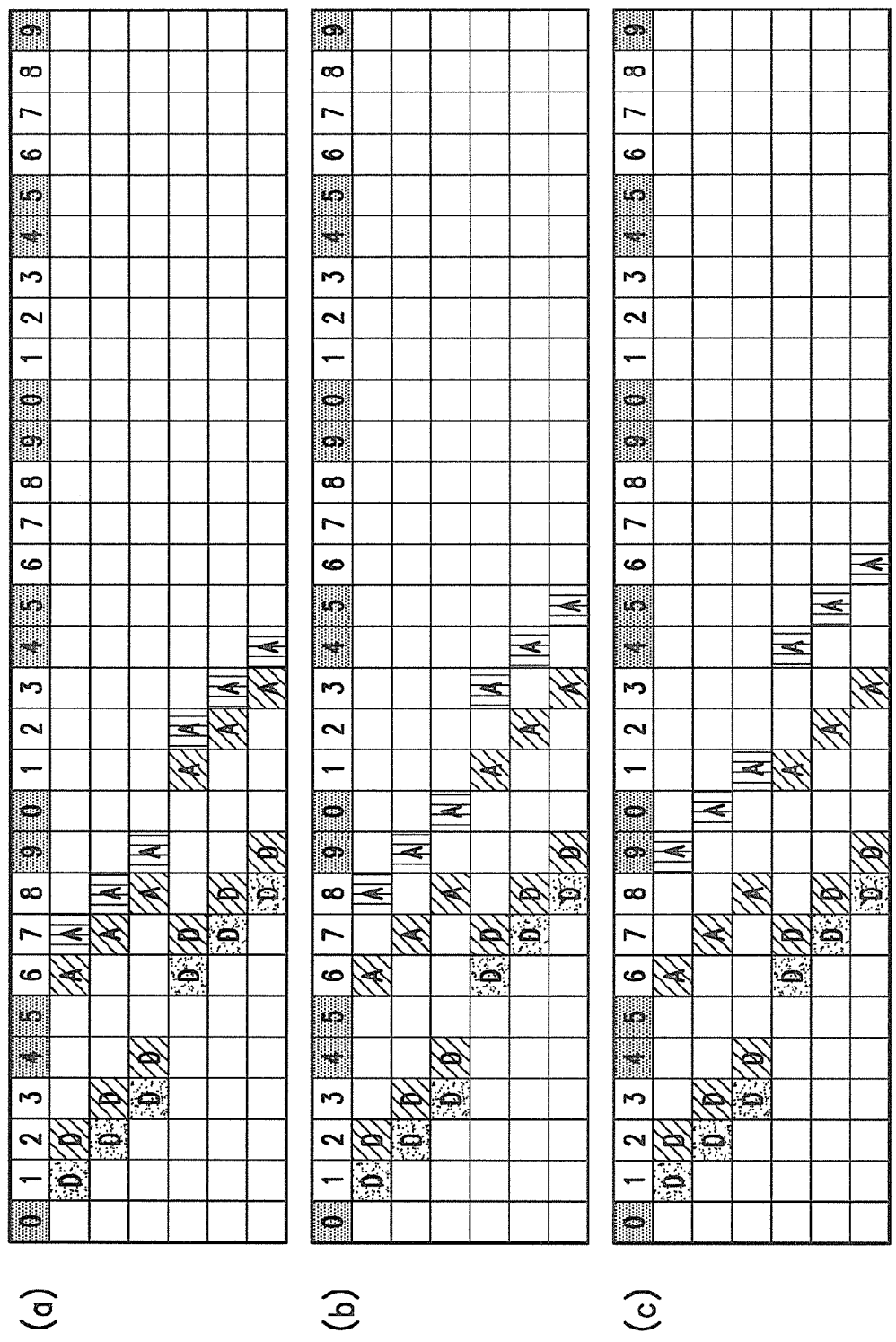

In FIG. 10C, the sub-diagrams (a), (b), (c) respectively correspond to Z=6 and X=−5, Z=7 and X=−6, and Z=8 and X=−7. Each row in the sub-diagrams (a), (b), (c) of FIG. 10C respectively correspond to different configurations.

Figure 10D:
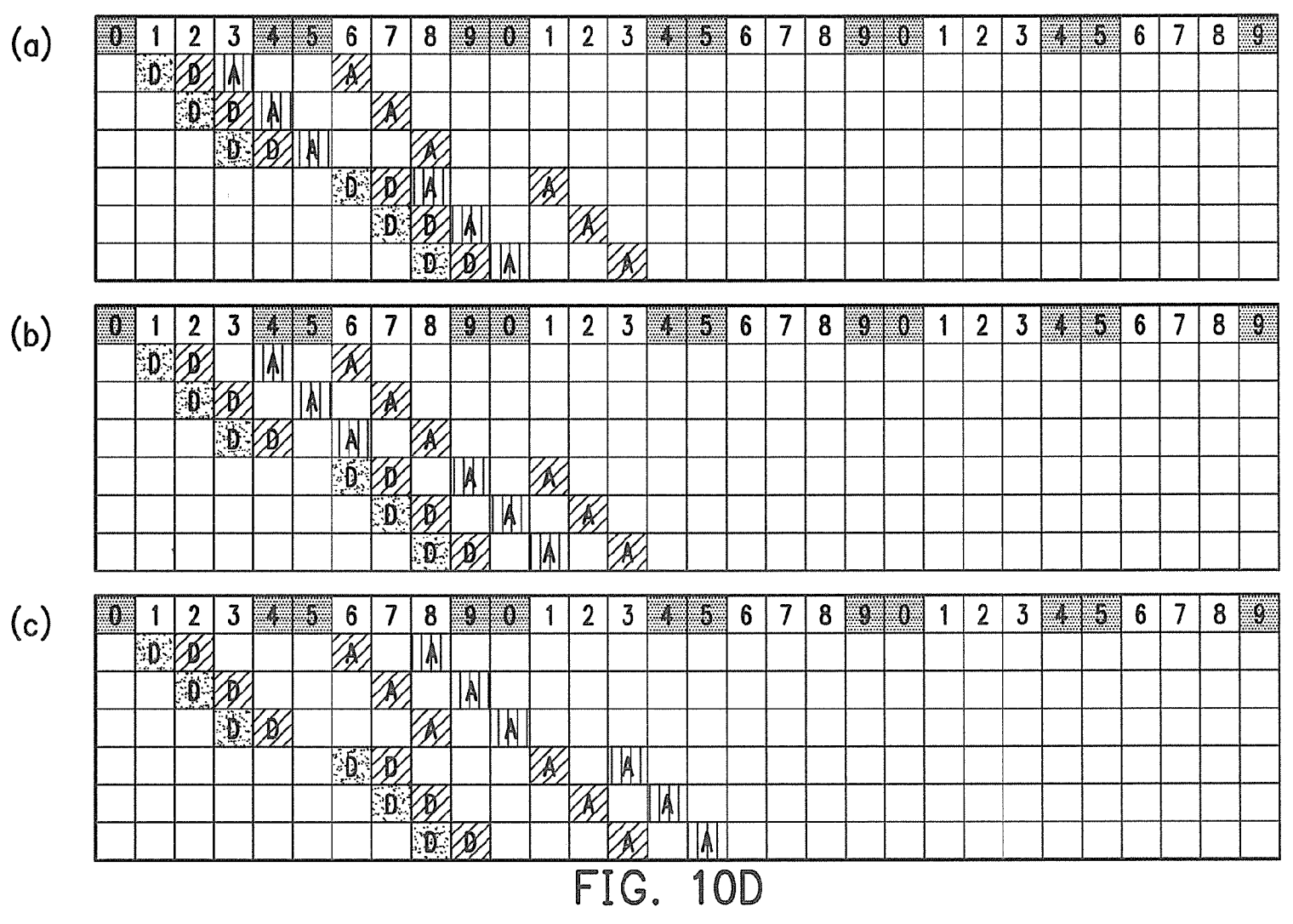

In FIG. 10D, the sub-diagrams (a), (b), (c) respectively correspond to Z=2 and X=−1, Z=3 and X=−2, and Z=7 and X=−6. Each row in the sub-diagrams (a), (b), (c) of FIG. 10D respectively correspond to different configurations.

Figure 10E:
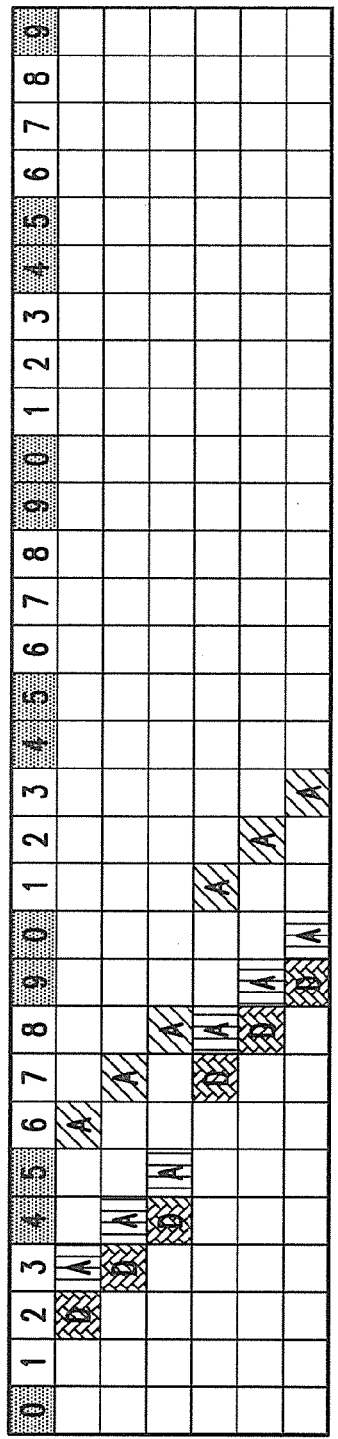
Figure 10E:
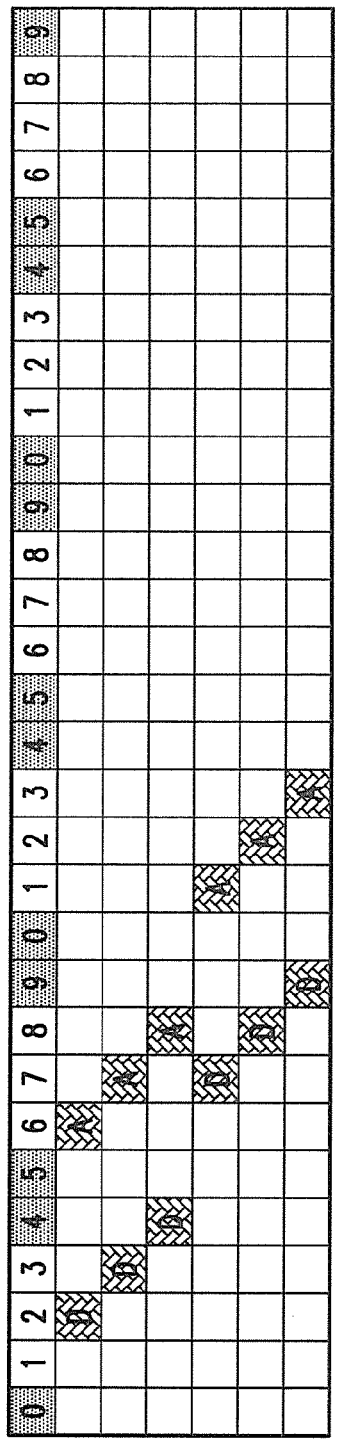
Figure 10E:
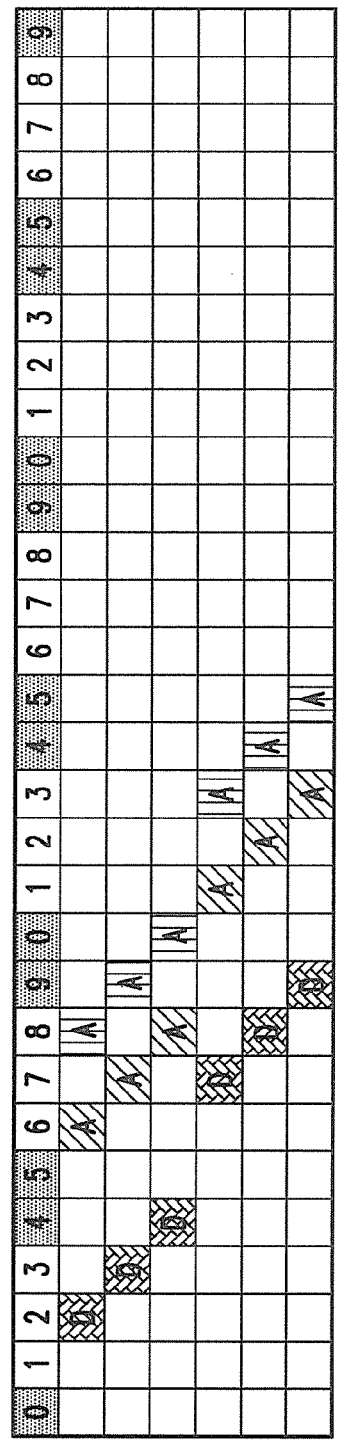

In FIG. 10E, the sub-diagrams (a), (b), (c) respectively correspond to Z=2 and X=−1, Z=3 and X=−2, and Z=7 and X=−6, and illustrate the situation of a simultaneous transmission of the base station and the relay node. Referring to the sub-diagrams (a), (b), (c) of FIG. 10E, if the relay node receives the downlink data from the base station in subframe 3, then the relay node immediately forwards the downlink data to the mobile communication device, and the relay node replies ACK/NACK signal to the base station in frame 4, 7 or 9; if the relay node receives the downlink data from the base station in subframe 4, then the relay node immediately forwards the downlink data to the mobile communication device, and the relay node replies ACK/NACK signal to the base station in frame 5, 8 or 0; if the relay node receives the downlink data from the base station in subframe 9, then the relay node immediately forwards the downlink data to the mobile communication device, and the relay node replies ACK/NACK signal to the base station in frame 0, 3 or 5. Each row in the sub-diagrams (a), (b), (c) of FIG. 10E respectively correspond to different configurations.

Figure 10F:
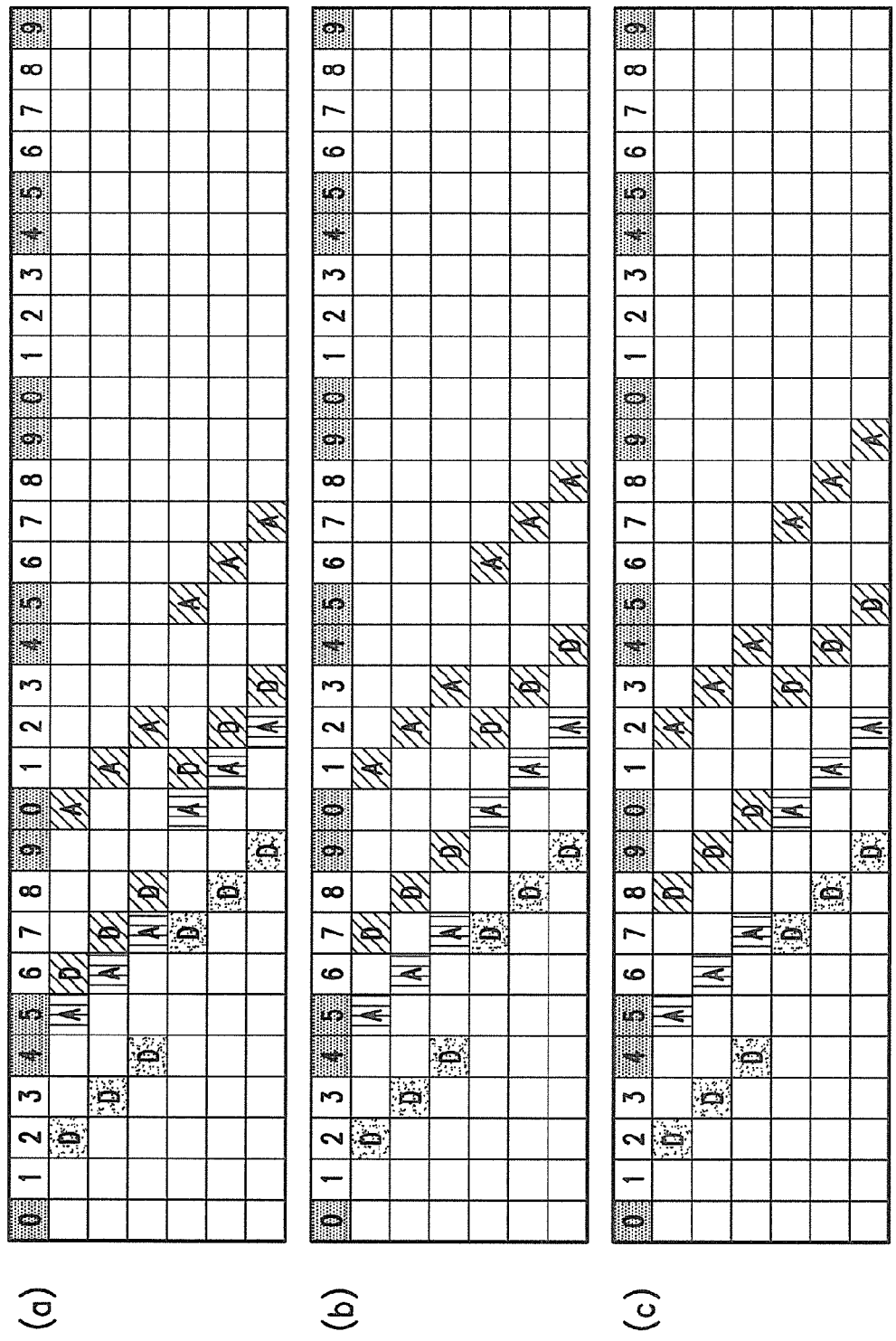

In FIG. 10F, Z=3, and the sub-diagrams (a), (b), (c) respectively correspond to X=1, X=2, X=3. Each row in the sub-diagrams (a), (b), (c) of FIG. 10F respectively correspond to different configurations.

Figure 10G:
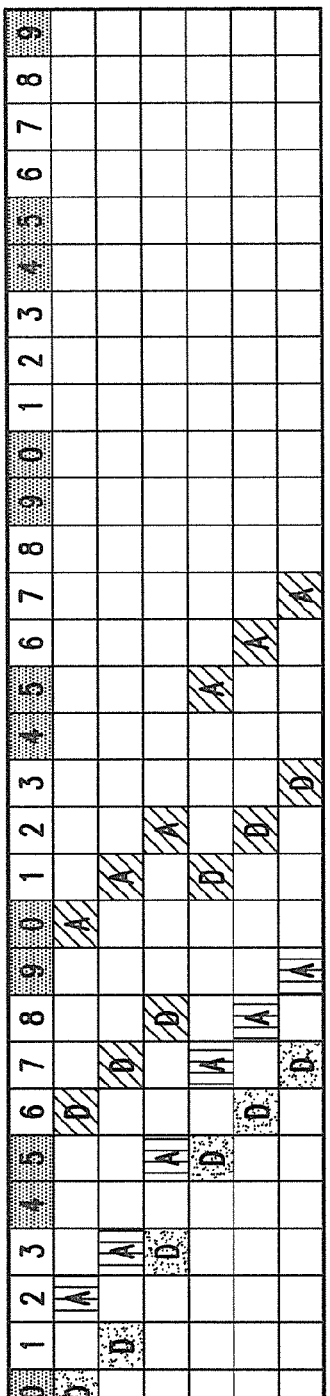
Figure 10G:
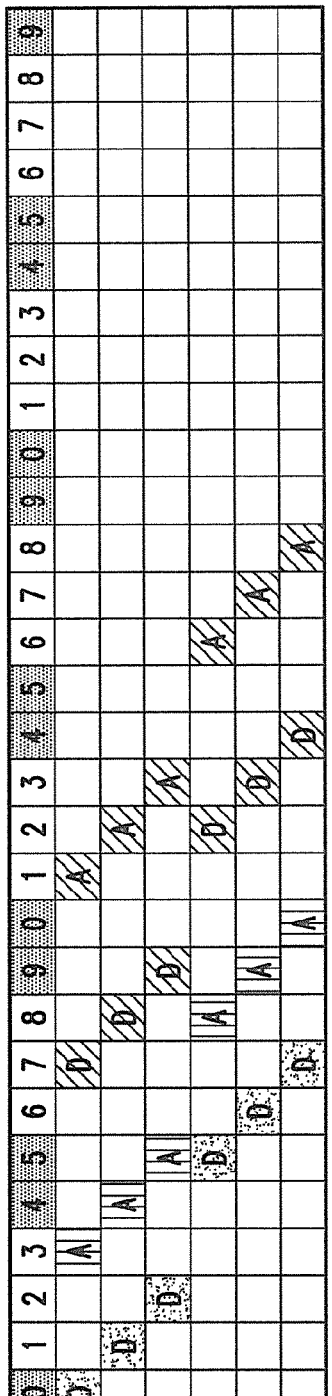
Figure 10G:
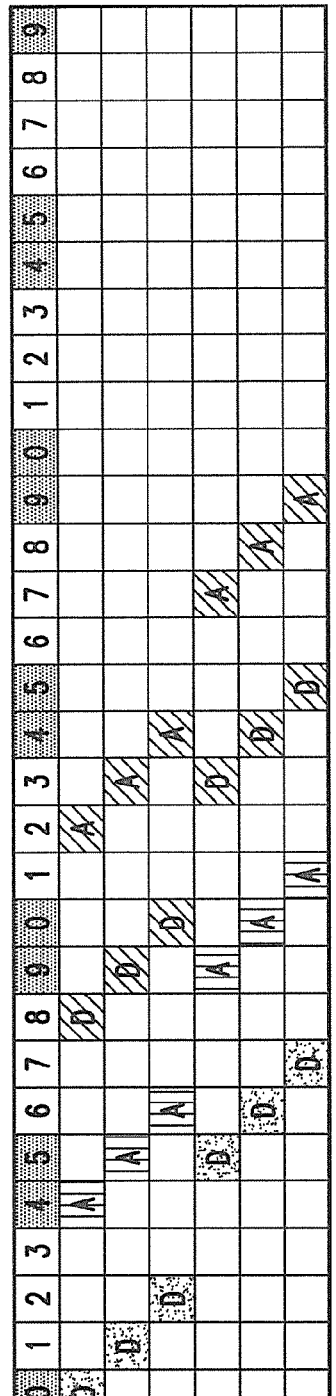

In FIG. 10G, X=4, and the sub-diagrams (a), (b), (c) respectively correspond to Z=2, Z=3, Z=4. Each row in the sub-diagrams (a), (b), (c) of FIG. 10G respectively correspond to different configurations.

Figure 10H:
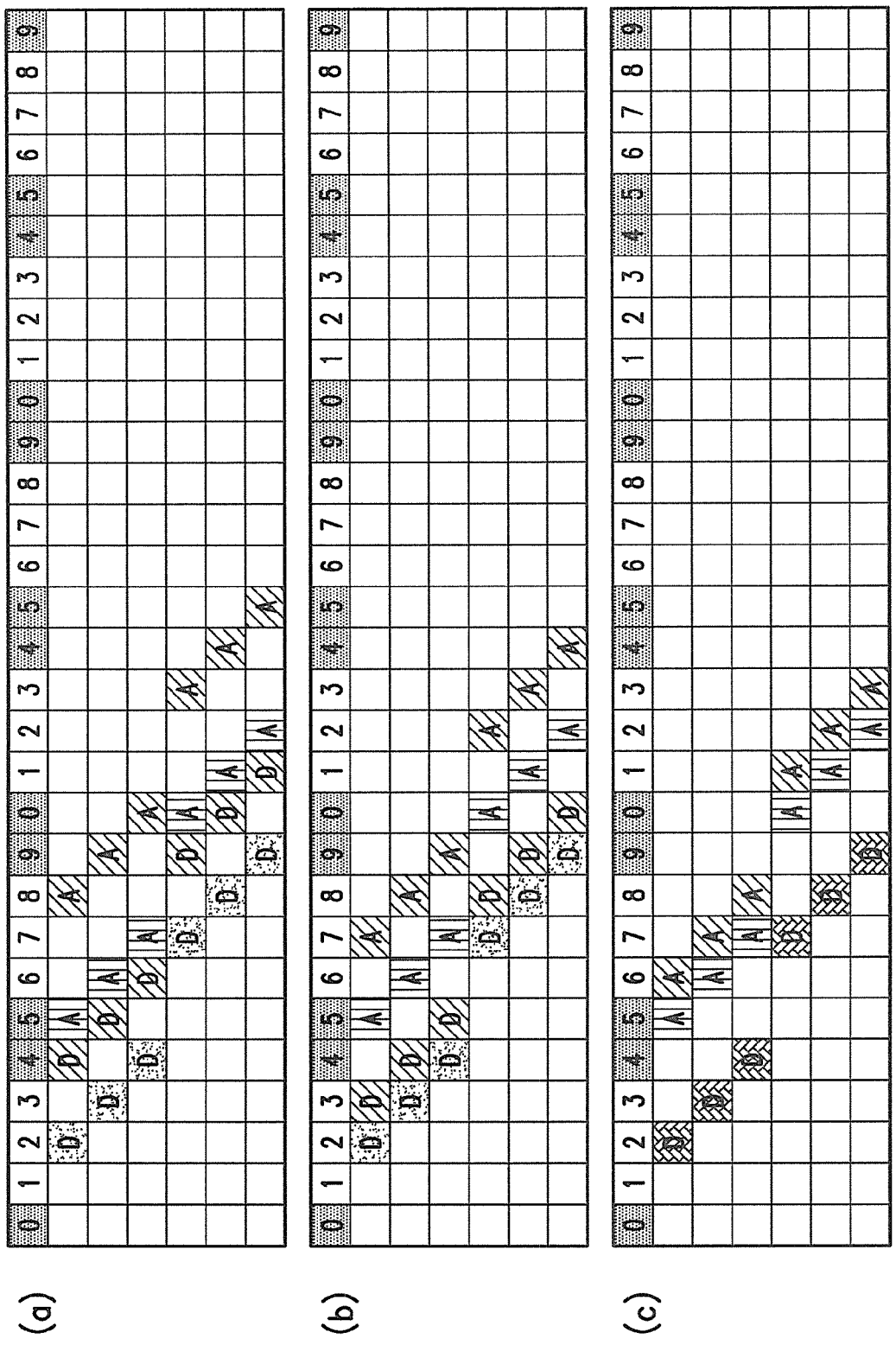

In FIG. 10H, Z=3, and the sub-diagrams (a), (b), (c) respectively correspond to X=−1, X=−2, X=−3. Each row in the sub-diagrams (a), (b), (c) of FIG. 10H respectively correspond to different configurations.

In FIG. 10I, and the sub-diagrams (a), (b), (c) respectively correspond to Z=2 and X=−2, Z=3 and X=−3, and Z=5 and X=−5. Each row in the sub-diagrams (a), (b), (c) of FIG. 10I respectively correspond to different configurations.

FIG. 11A-FIG. 11I are schematic diagrams respectively illustrating associations of subframes in every configuration of different embodiments according to FIG. 6A.

Figure 11A:
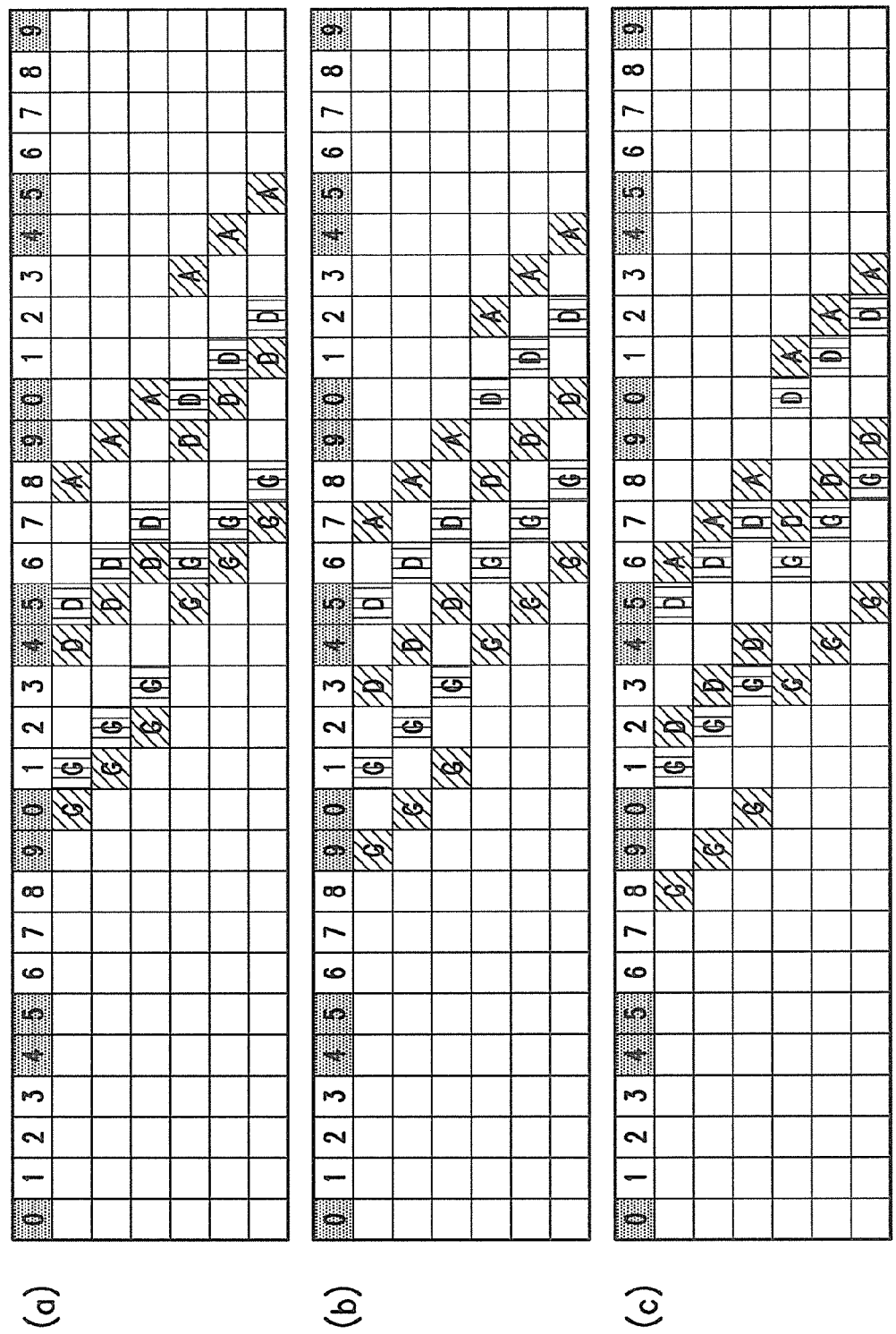

In FIG. 11A, Z=4, and the sub-diagrams (a), (b), (c) respectively correspond to Y=1, Y=2, Y=3. Each row in the sub-diagrams (a), (b), (c) of FIG. 11A respectively correspond to different configurations.

Figure 11B:
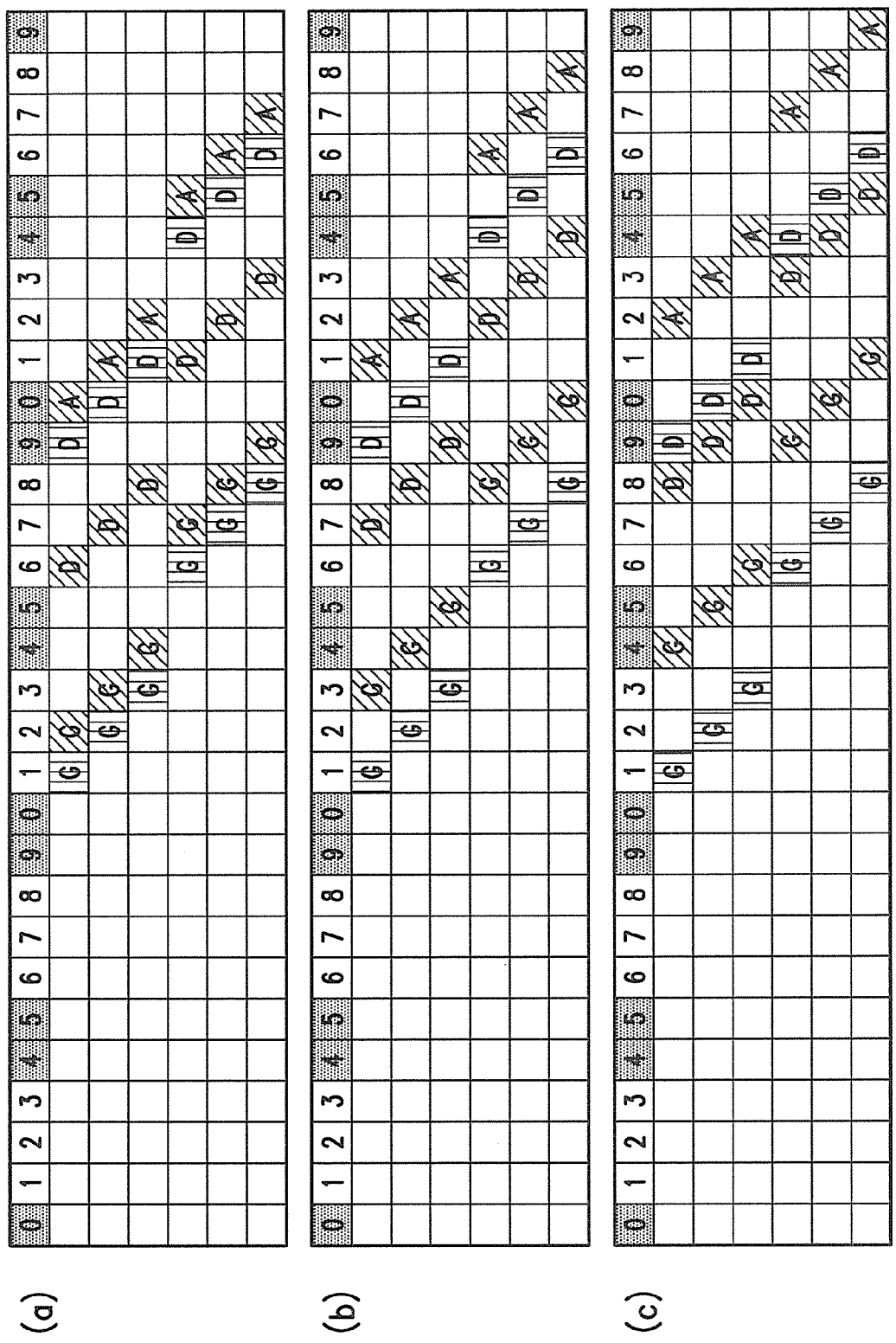

In FIG. 11B, Z=8, and the sub-diagrams (a), (b), (c) respectively correspond to Y=−1, Y=−2, Y=−3. Each row in the sub-diagrams (a), (b), (c) of FIG. 11B respectively correspond to different configurations.

Figure 11C:
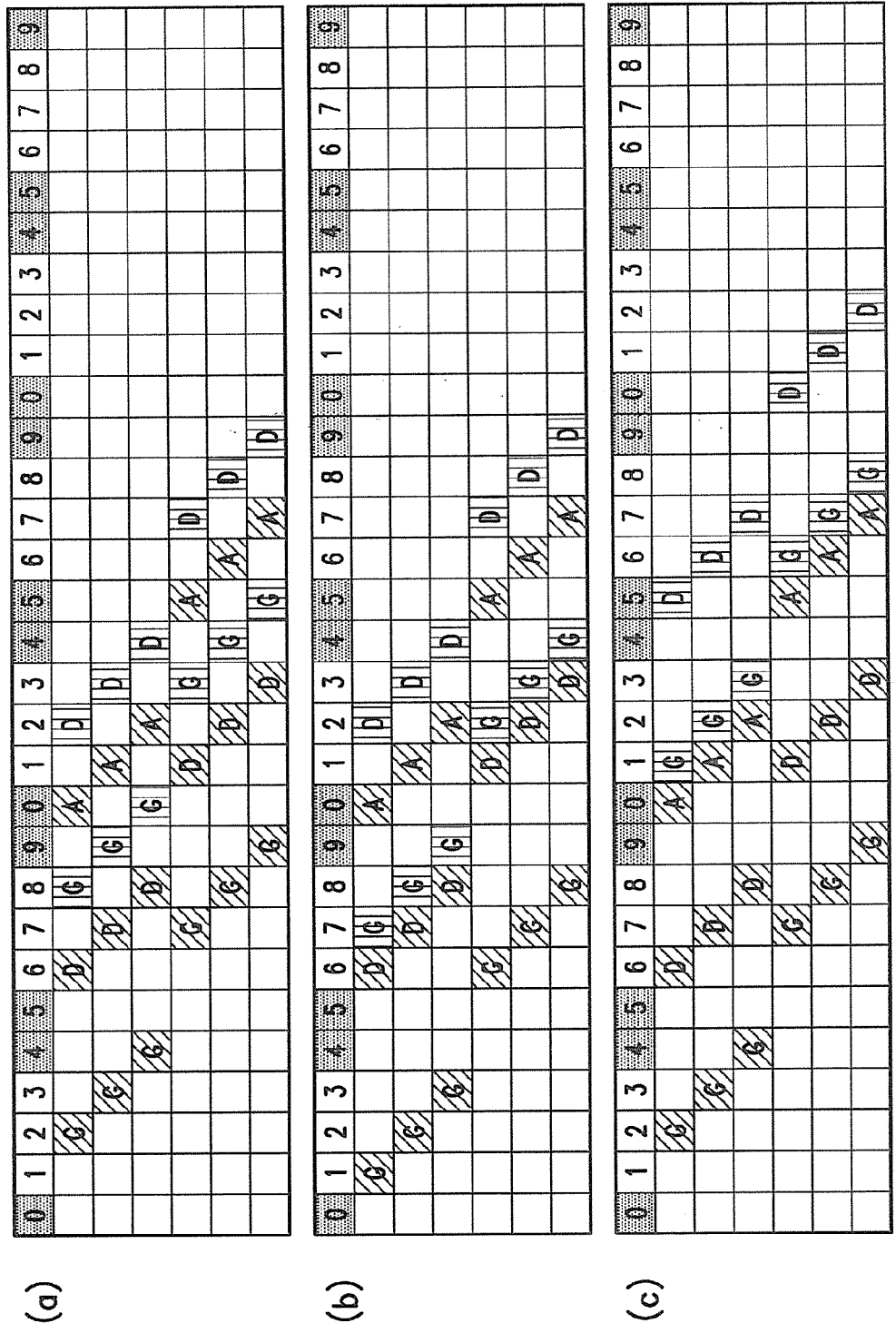

In FIG. 11C, the sub-diagrams (a), (b), (c) respectively correspond to Y=6 and Z=4, Y=5 and Z=5, Y=9 and Z=4, and illustrates the situations of delay transmission. Referring to the sub-diagrams (a), (b), (c) of FIG. 11C, if the relay node is granted uplink wireless resource (i.e., a data grant signal is received from the base station) in subframe 3, then the relay node transmits HARQ data to the base station in subframe 7 or 8; if the relay node is granted uplink wireless resource in subframe 4, then the relay node transmits HARQ data to the base station in subframe 8 or 9; if the relay node is granted uplink wireless resource in subframe 8, then the relay node transmits HARQ data to the base station in subframe 2 or 3; if the relay node is granted uplink wireless resource in subframe 9, then the relay node transmits HARQ data to the base station in subframe 3 or 4. Each row in the sub-diagrams (a), (b), (c) of FIG. 11C respectively correspond to different configurations.

Figure 11D:
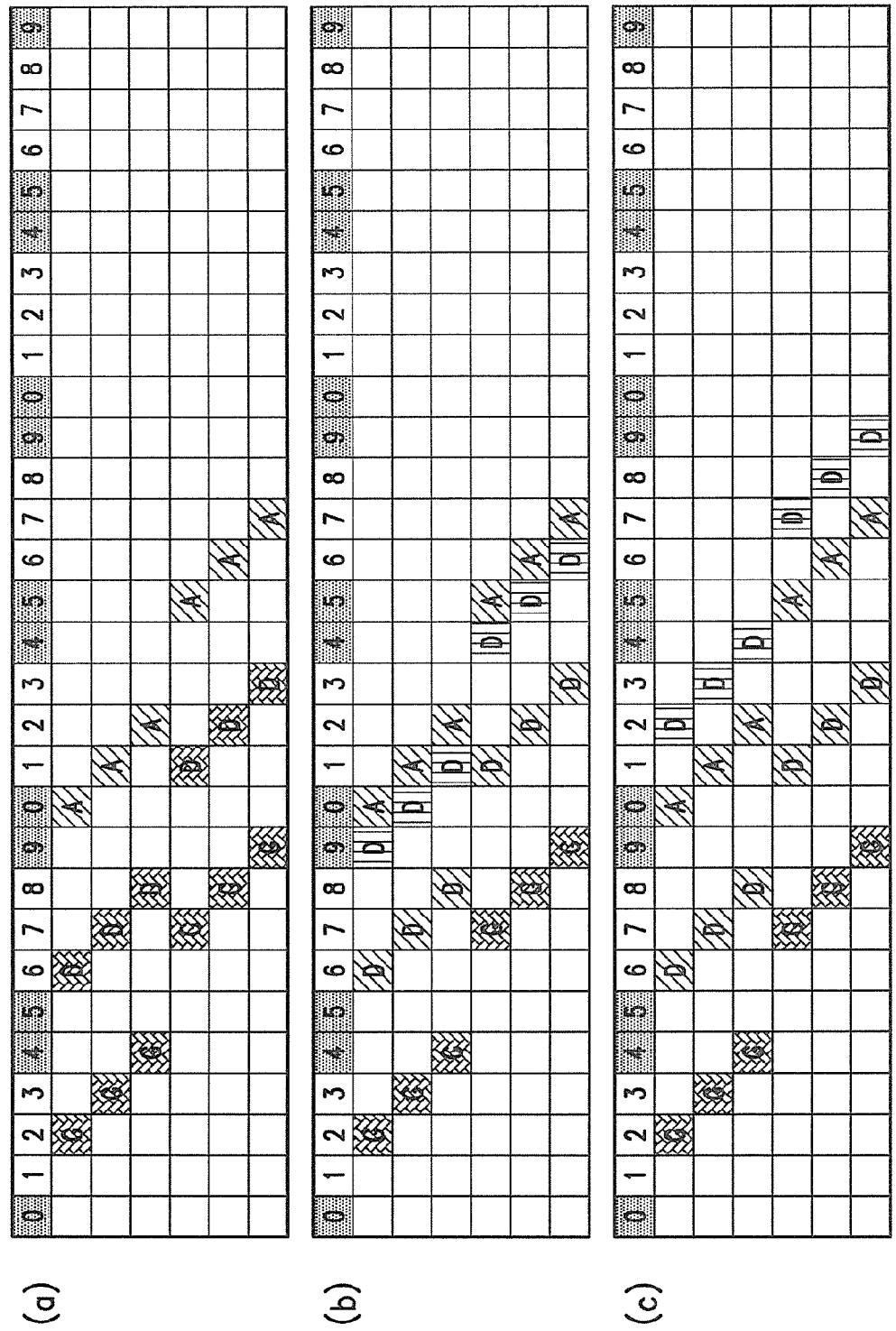

In FIG. 11D, Y=4, and the sub-diagrams (a), (b), (c) respectively correspond to Z=4, Z=7, Z=10. Each row in the sub-diagrams (a), (b), (c) of FIG. 11D respectively correspond to different configurations.

Figure 11E:
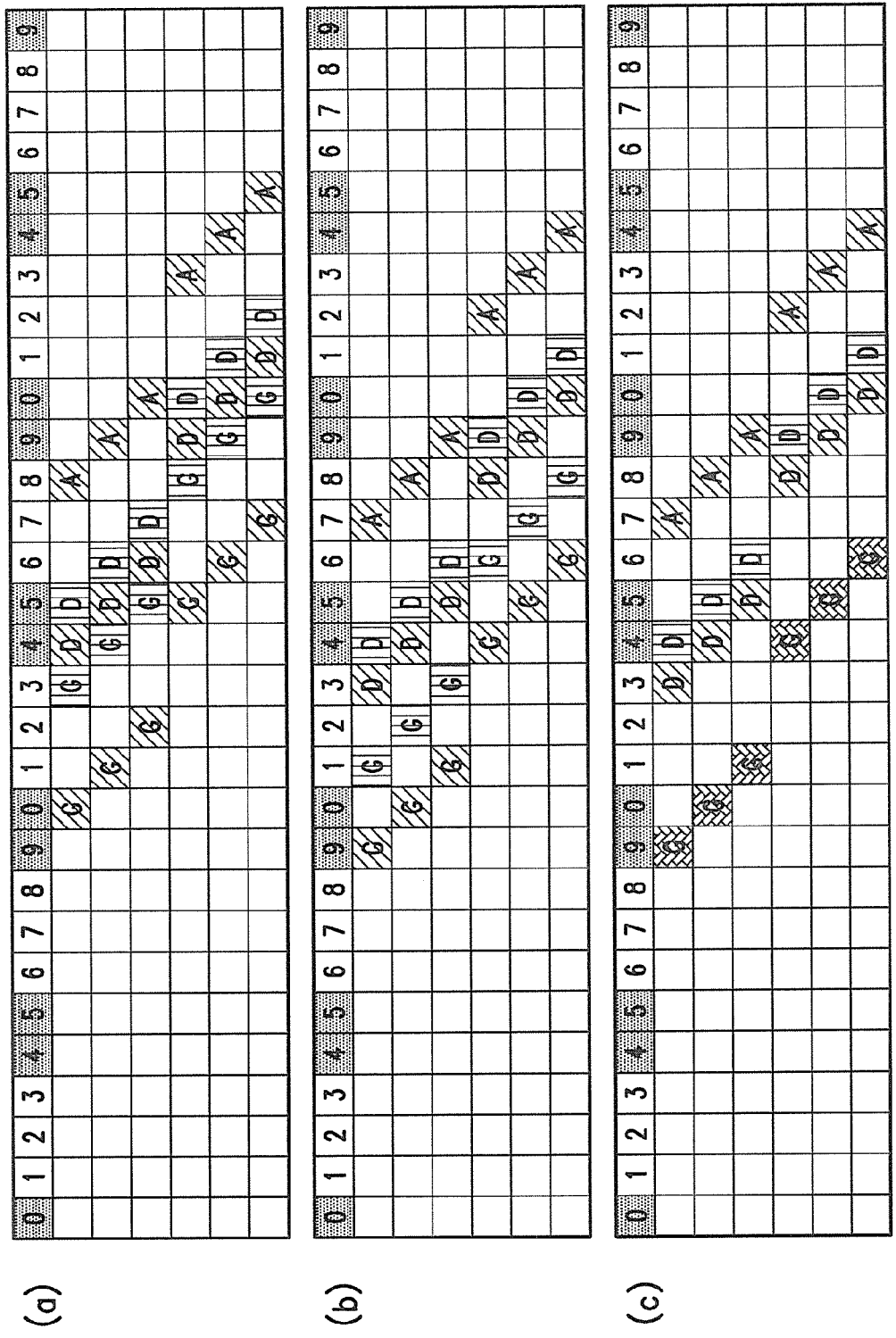

In FIG. 11E, the sub-diagrams (a), (b), (c) respectively correspond to Y=3 and Z=2, Y=2 and Z=3, Y=0 and Z=5. Each row in the sub-diagrams (a), (b), (c) of FIG. 11E respectively correspond to different configurations.

Figure 11F:
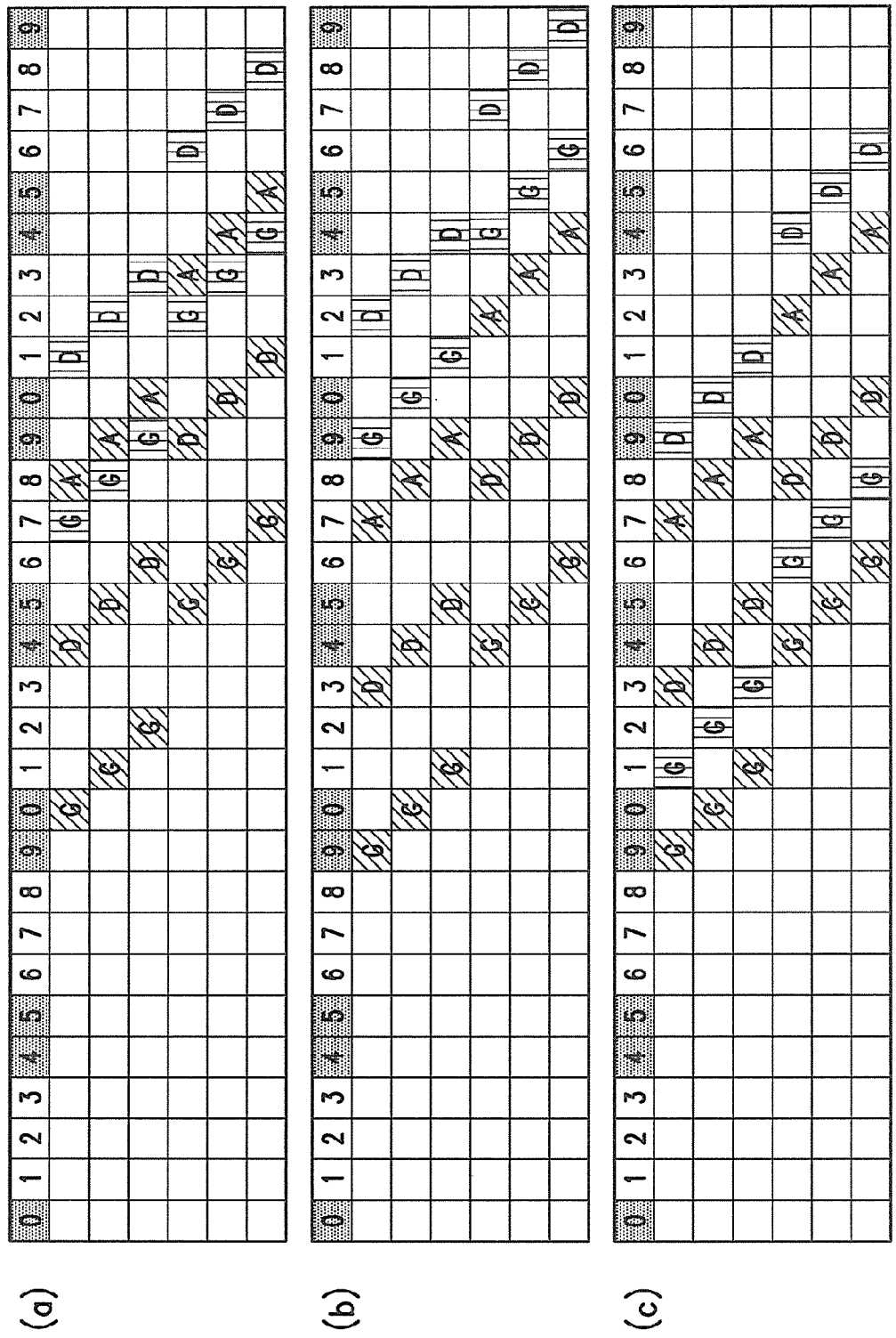

In FIG. 11F, the sub-diagrams (a), (b), (c) respectively correspond to Y=7 and Z=4, Y=10 and Z=3, Y=2 and Z=8. Each row in the sub-diagrams (a), (b), (c) of FIG. 11F respectively correspond to different configurations.

Figure 11G:
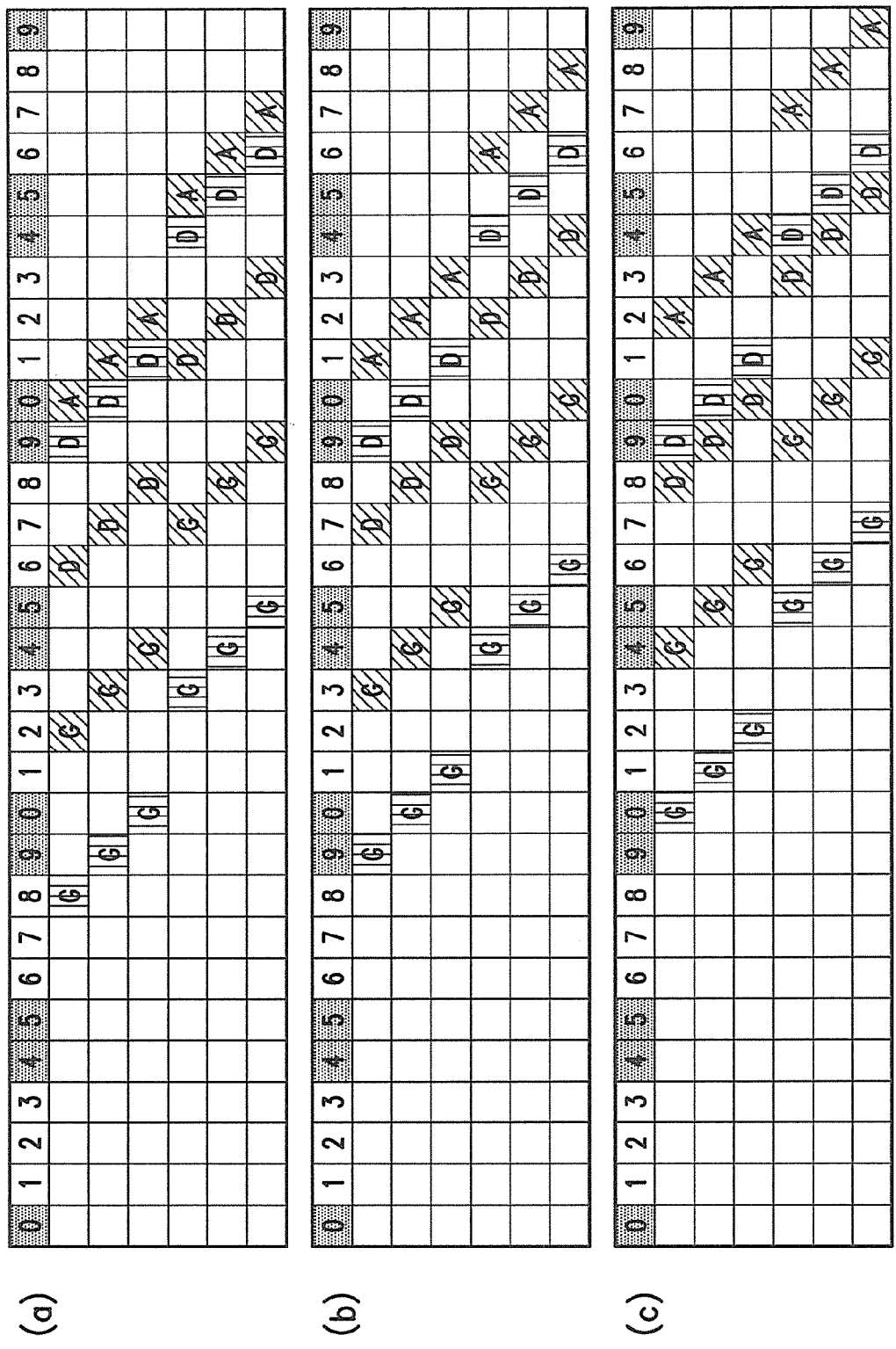

In FIG. 11G, Y=−4, and the sub-diagrams (a), (b), (c) respectively correspond to Z=11, Z=10, Z=9. Each row in the sub-diagrams (a), (b), (c) of FIG. 11G respectively correspond to different configurations.

Figure 11H:
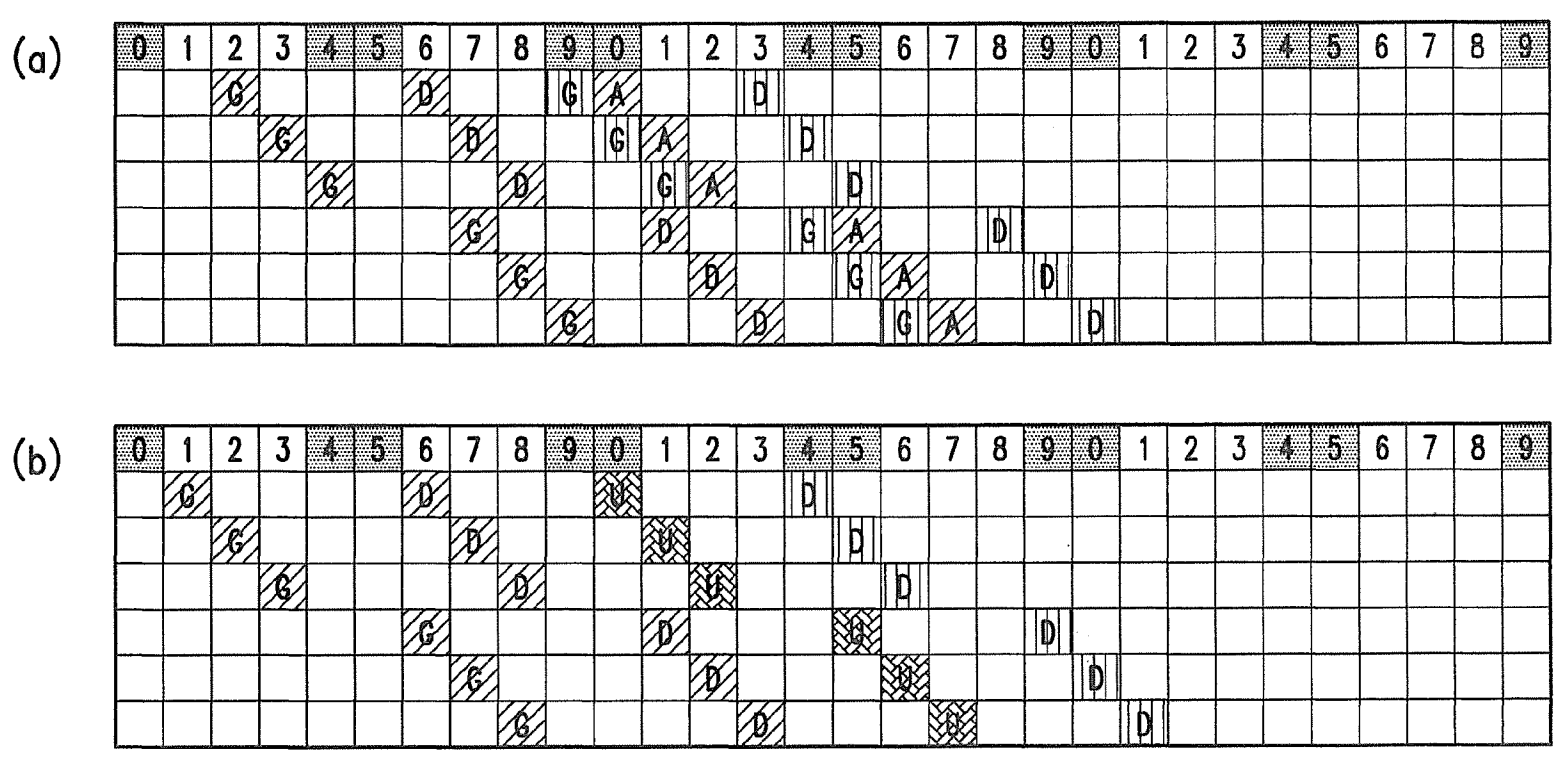

In FIG. 11H, Z=4, and the sub-diagrams (a), (b), (c) respectively correspond to Y=7, Y=8. Each row in the sub-diagrams (a), (b), (c) of FIG. 11H respectively correspond to different configurations. The subframe labeled "U" in the sub-diagram (b) represents the subframe where the base station replies ACK/NACK signal to the mobile communication device, and the base station can also grant the uplink wireless resource to the relay node in the same subframe. Each row in the sub-diagrams (a), (b), (c) of FIG. 11H respectively correspond to different configurations.

Figure 11I:
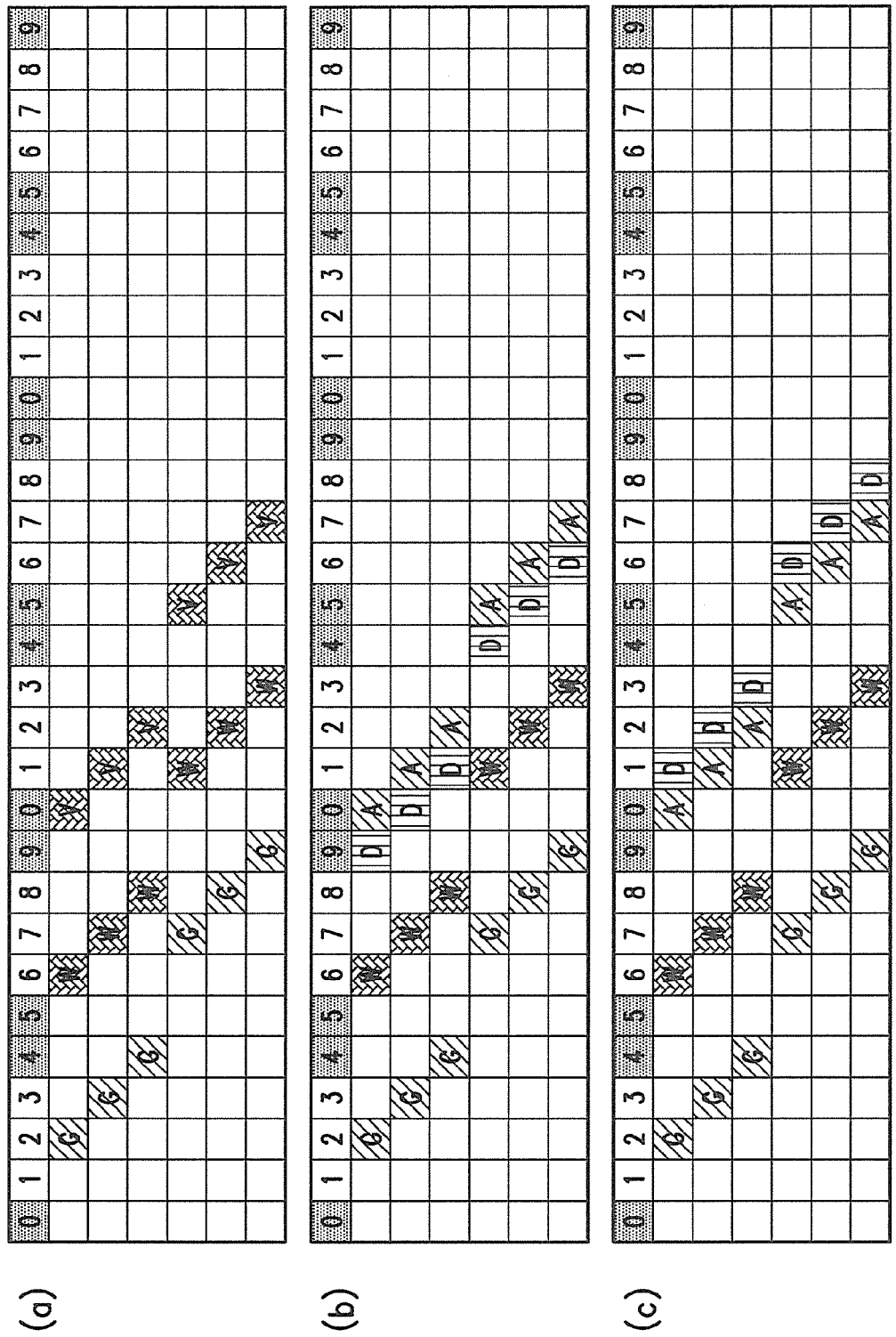

In FIG. 11I, Y=4, and the sub-diagrams (a), (b), (c) respectively correspond to Z=4, Z=3, Z=5. Each row in the sub-diagrams (a), (b), (c) of FIG. 11G respectively correspond to different configurations. The subframe labeled "V" in the sub-diagram (b) represents the subframe where the base station replies ACK/NACK signal to the mobile communication device, and the relay node can also forward the uplink data to the base station in the same subframe. The subframe labeled "V" in the sub-diagram (b) represents the subframe where the base station grants the uplink wireless resource to the relay node, and the mobile communication device can also transmit the uplink data to the relay node/the base station in the same subframe. Each row in the sub-diagrams (a), (b), (c) of FIG. 11I respectively correspond to different configurations.

FIG. 12A-FIG. 12F are schematic diagrams respectively illustrating associations of subframes in configuration 1 to configuration 6 according to FIG. 7A, and summarizing the downlink transmission process of the TDD mode. The sub-diagrams (a) of FIG. 12A-FIG. 12F respectively illustrate associations of subframes in configuration 1 to configuration 6. The sub-diagrams (b), (c) of FIG. 12A-FIG. 12F respectively correspond to configuration 1 to configuration 6 in the summarized downlink transmission processes of the TDD mode. Referring to FIG. 7B, the configuration is 0 in FIG. 7B, and the relay node can receive the downlink data in subframe 0, 1, 5 or 6, and the relay node can reply ACK/NACK signal in subframe 2, 3, 4, 7, 8, or 9 to the base station.

Figure 12A:
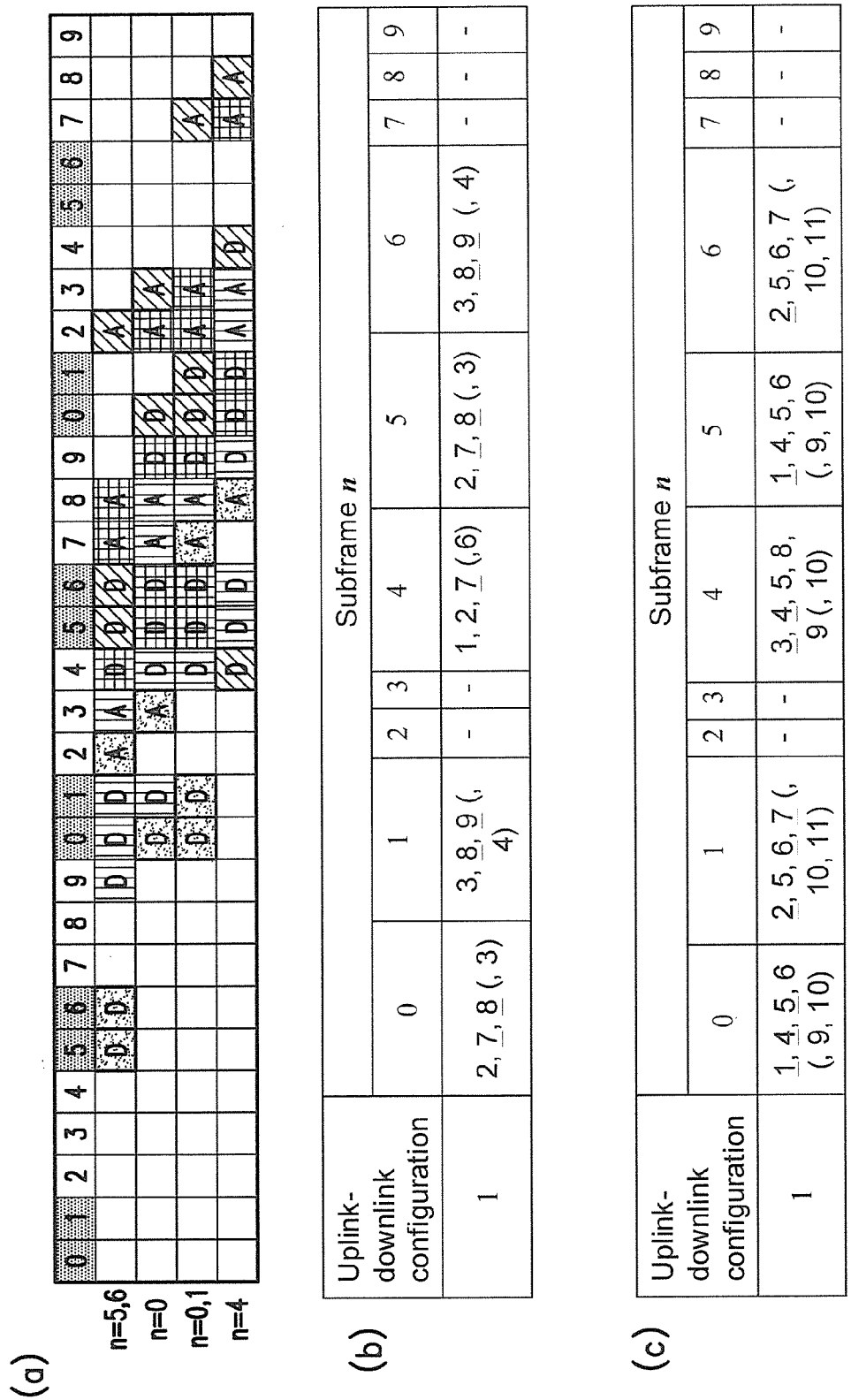

In FIG. 12A, the configuration is 1. Referring to the sub-diagram (a) of FIG. 12A, the relay node can receive the downlink data in subframe 0, 1, 4, 5, 6 or 9, and the relay node can reply ACK/NACK signal in subframe 2, 3, 7 or 8 to the base station. In the sub-diagrams (b), (c) of FIG. 12A, the figure underscored represents a late ACK situation, and the figure in a bracket represents a conflict situation.

Figure 12B:
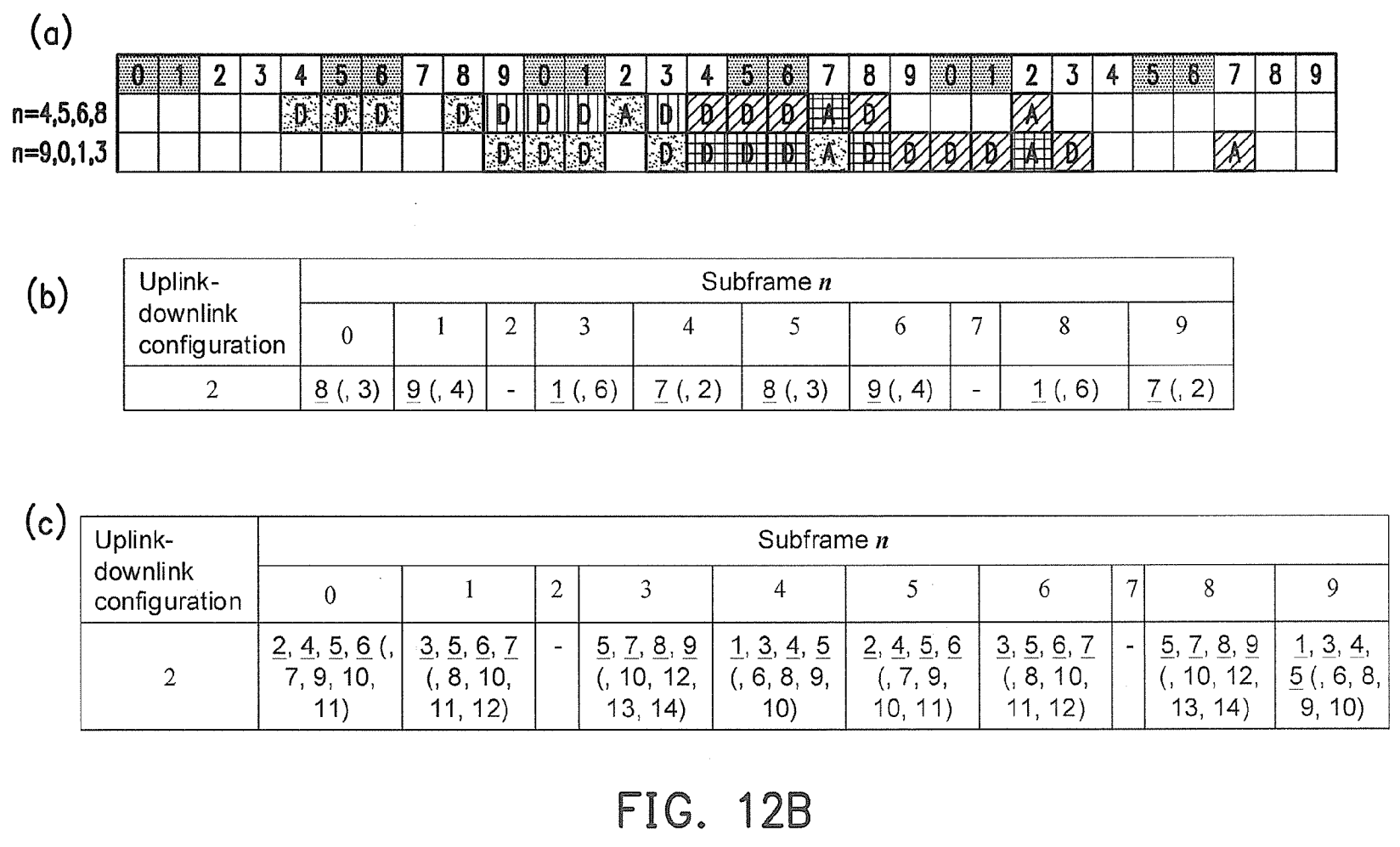

In FIG. 12B, the configuration is 2. Referring to the sub-diagram (a) of FIG. 12B, the relay node can receive the downlink data in subframe 0, 1, 3, 4, 5, 6, 8 or 9, and the relay node can reply ACK/NACK signal in subframe 2 or 7 to the base station. In the sub-diagrams (b), (c) of FIG. 12B, the figure underscored represents a late ACK situation, and the figure in a bracket represents a conflict situation.

Figure 12C:
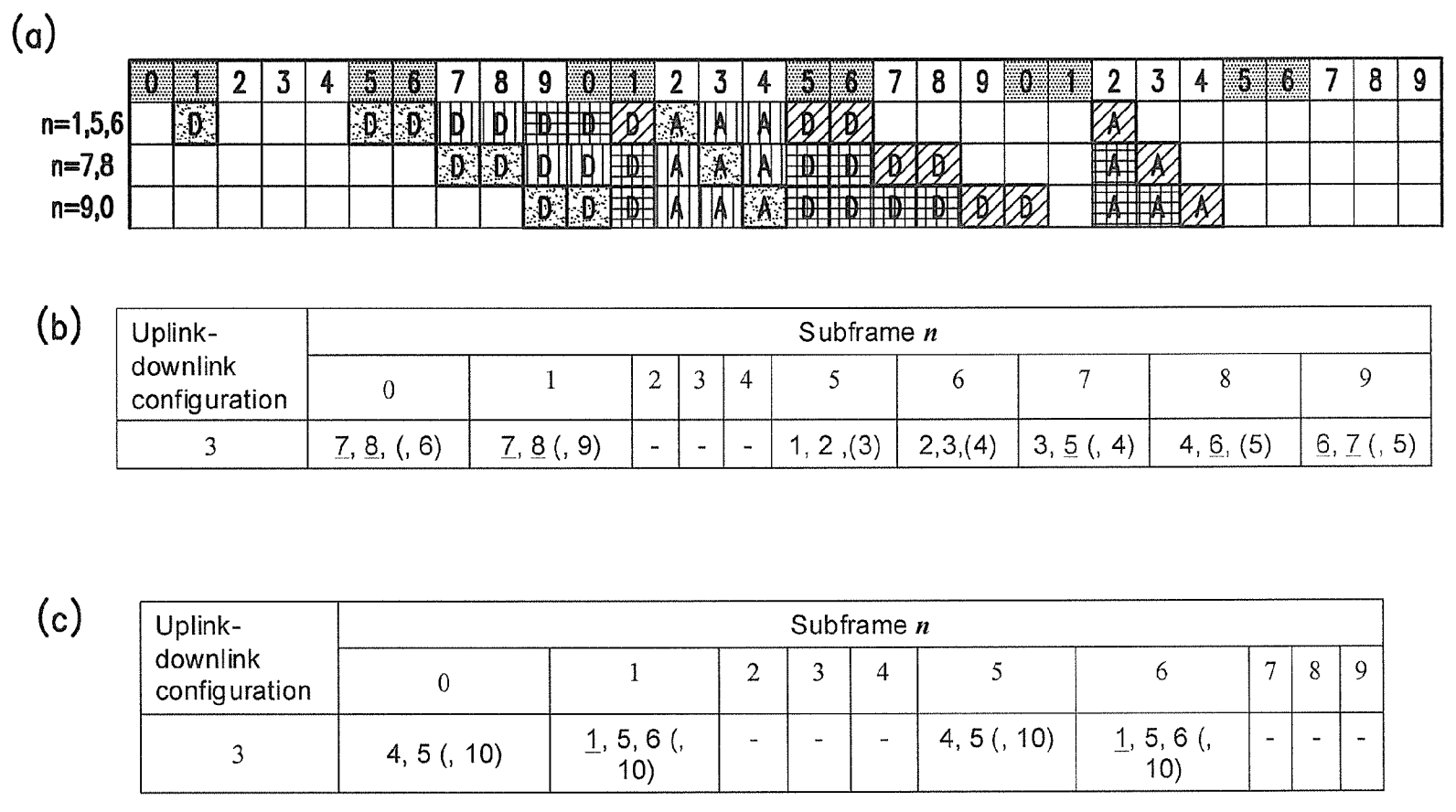

In FIG. 12C, the configuration is 3. Referring to the sub-diagram (a) of FIG. 12C, the relay node can receive the downlink data in subframe 0, 1, 5, 6, 7, 8 or 9, and the relay node can reply ACK/NACK signal in subframe 2, 3 or 4 to the base station. In the sub-diagrams (b), (c) of FIG. 12C, the figure underscored represents a late ACK situation, and the figure in a bracket represents a conflict situation.

In FIG. 12D, the configuration is 4. Referring to the sub-diagram (a) of FIG. 12D, the relay node can receive the downlink data in subframe 0, 1, 4, 5, 6, 7, 8 or 9, and the relay node can reply ACK/NACK signal in subframe 2 or 3 to the base station. In the sub-diagrams (b), (c) of FIG. 12D, the figure underscored represents a late ACK situation, and the figure in a bracket represents a conflict situation.

In FIG. 12E, the configuration is 5. Referring to the sub-diagram (a) of FIG. 12E, the relay node can receive the downlink data in subframe 0, 1, 3, 4, 5, 6, 7, 8 or 9, and the relay node can reply ACK/NACK signal in subframe 2 to the base station. In the sub-diagrams (b), (c) of FIG. 12E, the figure underscored represents a late ACK situation, and the figure in a bracket represents a conflict situation.

Figure 12F:
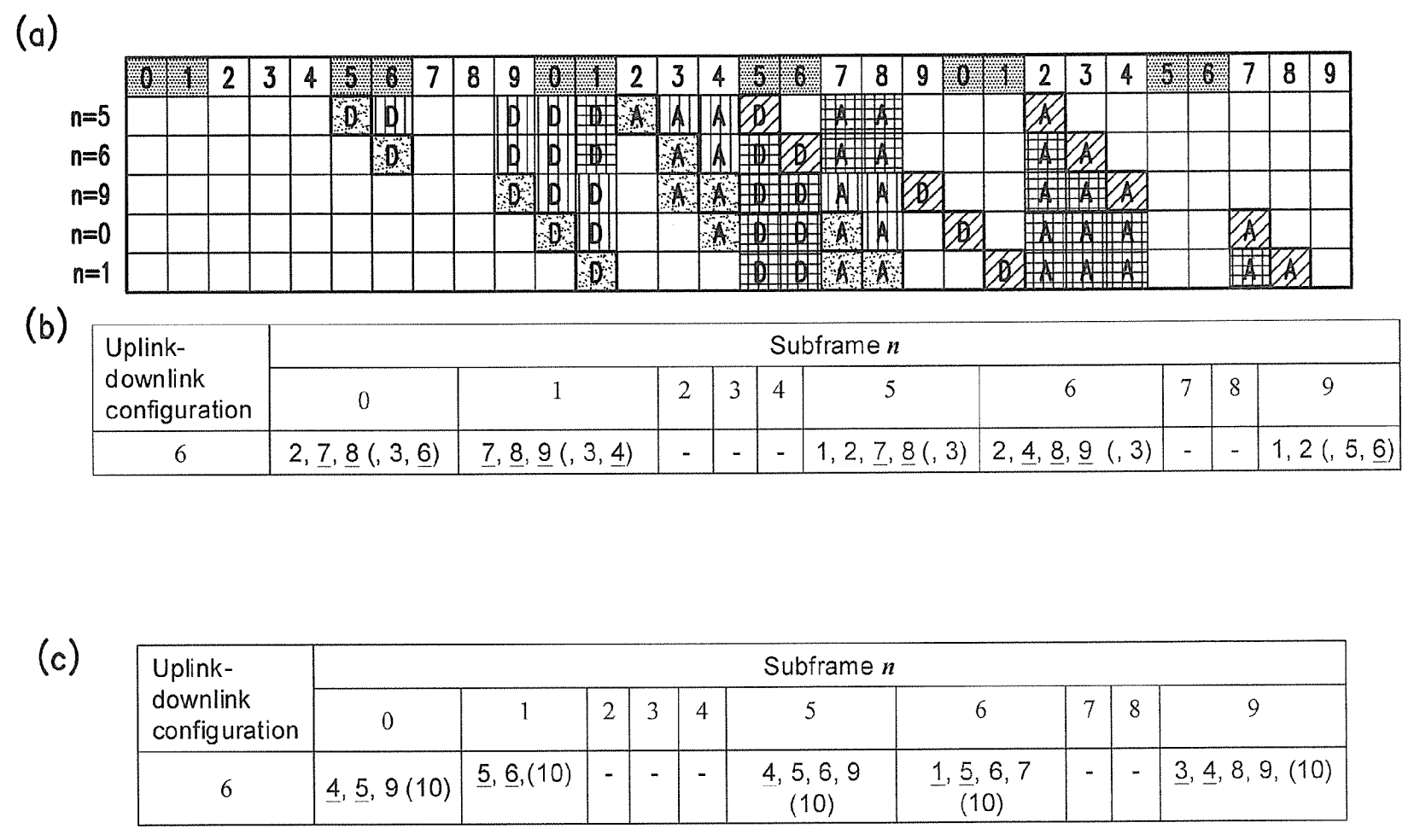

In FIG. 12F, the configuration is 6. Referring to the sub-diagram (a) of FIG. 12F, the relay node can receive the downlink data in subframe 0, 1, 5, 6 or 9, and the relay node can reply ACK/NACK signal in subframe 2, 3, 4, 7, or 8 to the base station. In the sub-diagrams (b), (c) of FIG. 12F, the figure underscored represents a late ACK situation, and the figure in a bracket represents a conflict situation.

FIG. 12G illustrates the subframe number where the relay node replies acknowledgement signal of every configuration in the downlink transmission process of the TDD mode according to FIG. 7A. In short, FIG. 12G integrates FIG. 7C and each sub-diagram (b) of FIG. 12A-FIG. 12F. FIG. 12H illustrates the subframe number where the relay node forwards the downlink data of every configuration in the downlink transmission process of the TDD mode according to FIG. 7A. FIG. 12H integrates FIG. 7D and each sub-diagram (c) of FIG. 12A-FIG. 12F. In FIG. 12G, the figure underscored represents a late ACK situation, and the figure in a bracket represents a conflict situation.

FIG. 13A-FIG. 13F are schematic diagrams respectively illustrating associations of subframes in configuration 1 to configuration 6 according to FIG. 8A, and summarizing the uplink transmission process of the TDD mode. To be illustrated more clearly, the sub-diagrams (a) of FIG. 13A-FIG. 13F respectively illustrate associations of subframes in configuration 1 to configuration 6, the sub-diagrams (b), (c) of FIG. 13A-FIG. 13F respectively corresponds to configuration 1 to configuration 6 in the summarized uplink transmission process of the TDD mode. In each sub-diagram (b), (c) of FIG. 13A-FIG. 13F, the figure underscored represents a late ACK situation or a late relay situation, and the figure in a bracket represents a conflict situation.

Figure 13A:
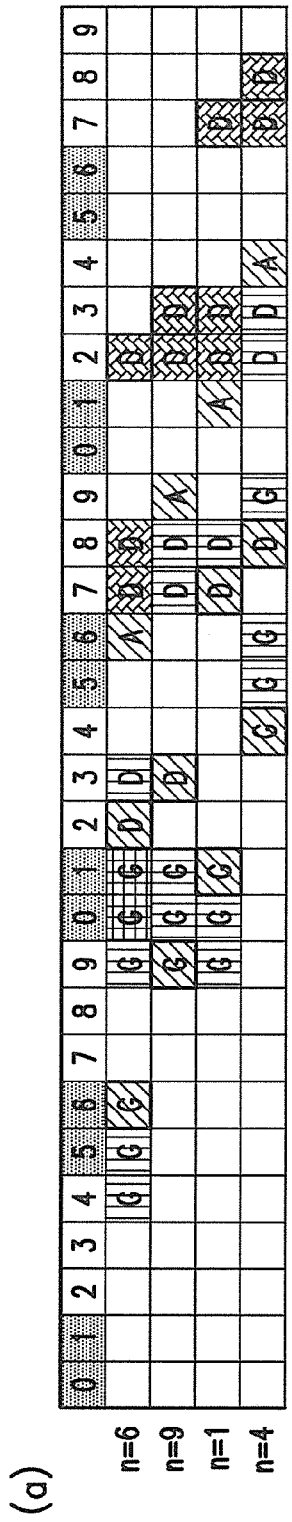
Figure 13B:
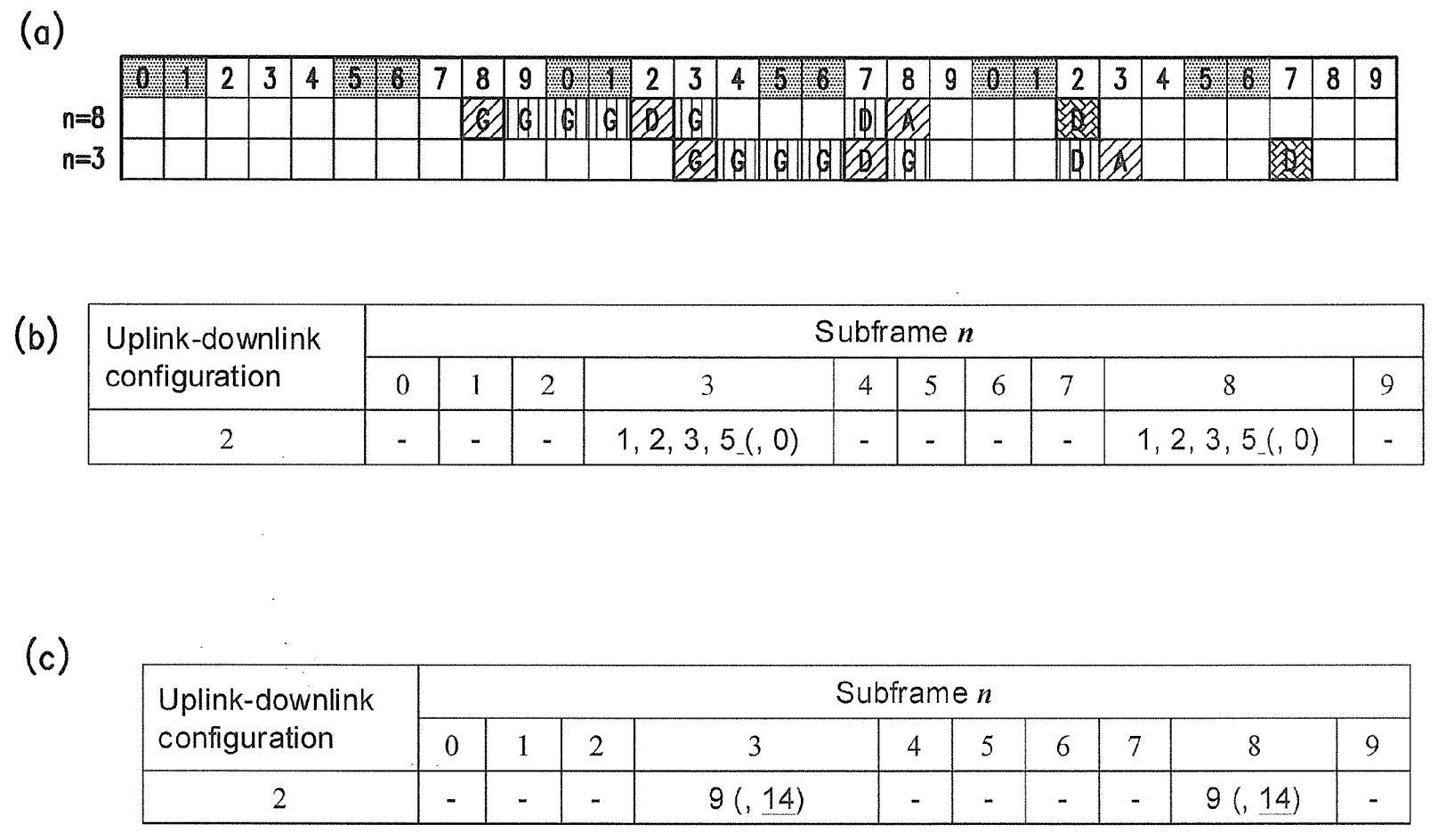
Figure 13D:
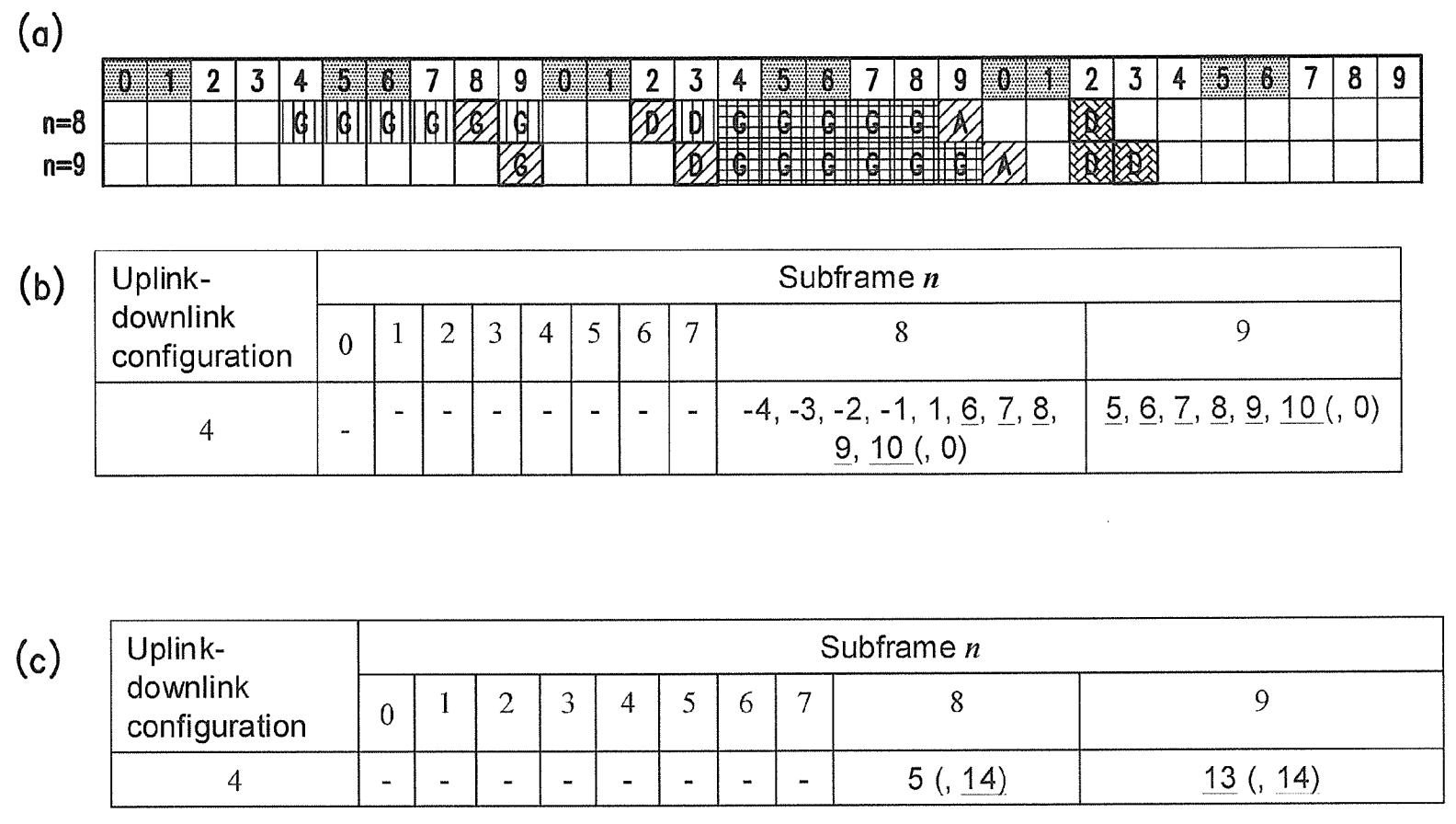
Figure 13E:
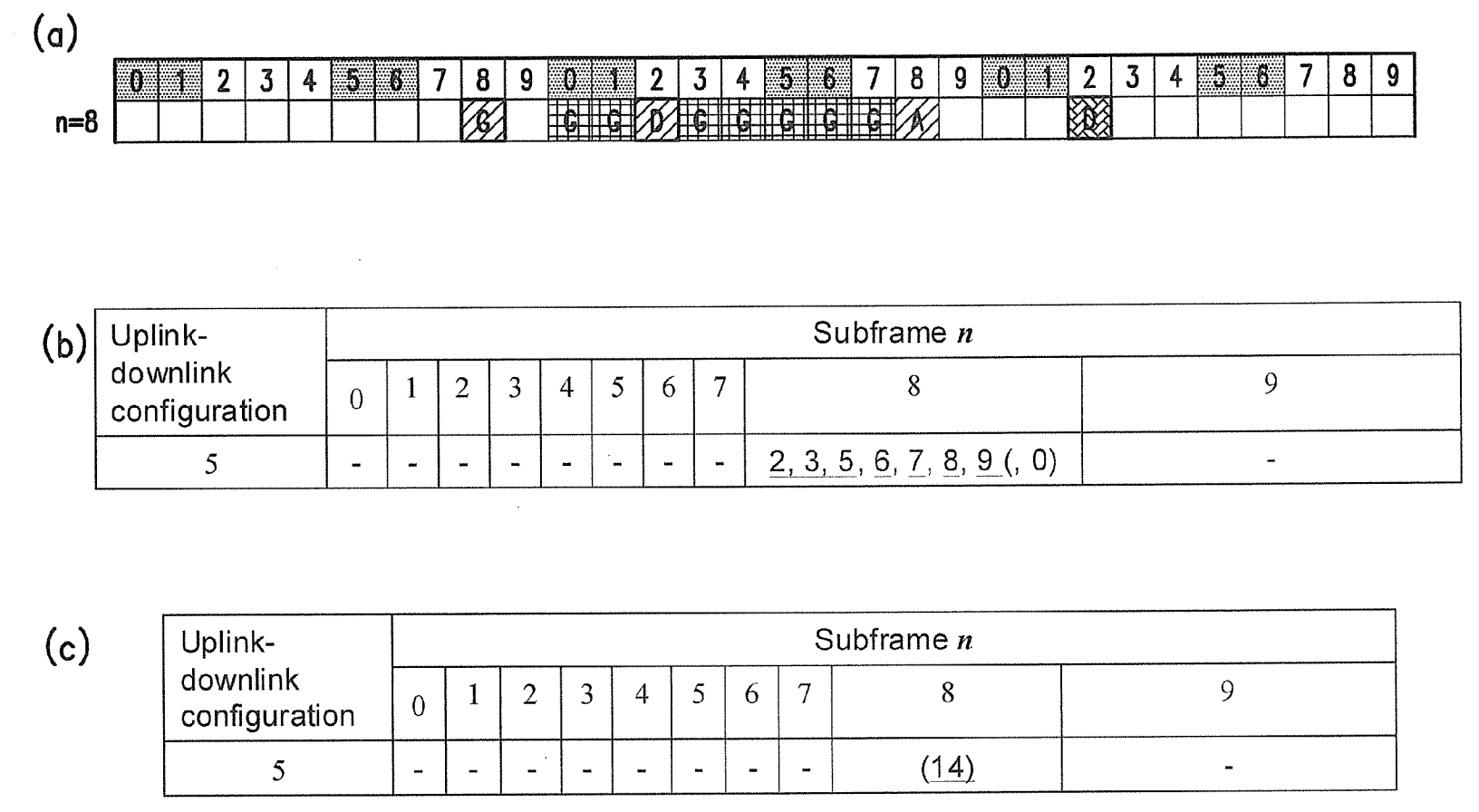

FIG. 13G illustrates the subframe number where the relay node is granted uplink wireless resource corresponding to every configuration of the TDD mode of the uplink transmission process according to FIG. 8A. In short, FIG. 13G integrates FIG. 8C and each sub-diagram (b) of FIG. 13A-FIG. 13F. FIG. 13H illustrates the subframe number where the relay node forwards the uplink data corresponding to every configuration of the TDD mode of the uplink transmission process according to FIG. 8A. In short, FIG. 13G integrates FIG. 8D and each sub-diagram (c) of FIG. 13A-FIG. 13F. In FIG. 13G and FIG. 13H, the figure underscored represents a late ACK situation or a late relay situation, and the figure in a bracket represents a conflict situation. In addition, the configuration may be reduced to a subset table due to some considerations, e.g. deployment, implementation, complexity, or resource utilization.

In summary, exemplary embodiments of the disclosure provide a transmission method for a wireless relay communication system and a relay station using the same method. The proposed transmission method includes HARQ process operating in TDD mode or in FDD mode of the wireless relay communication system. Situations of dynamically assigning indication signals can be effectively avoided through a base station, a relay node and a mobile communication device performing a grant signal transmission process, a data transmission process and a feedback signal transmission process with a configured timing association or a fixed timing association. Moreover, an uplink grant signal just appears in the uplink data transmission, but there could be no grant signal for the downlink data transmission. In addition, the proposed transmission method provides efficient transmission indication and efficient configuration schemes such that the wireless relay system is operated in a simpler manner, thereby greatly saving hardware complexity and overall cost of the base station, the relay node and the mobile communication device.

It will be apparent to those skilled in the art that various modifications and variation can be made to the structure of the disclosed embodiments without departing from the scope or spirit of the disclosure. In view of the foregoing, it is intended that the disclosure cover modifications and variation of this disclosure provided they fall within the scope of the following claims and their equivalents.

What is claimed is:

1. A transmission method for a wireless relay system, adapted for providing a relay of the wireless relay system, wherein the wireless relay system comprises at least a base station, at least a relay node and at least a mobile communication device, and the method comprises:
   the at least a base station provides a data transmission service to the at least a mobile communication device with facilitation of the at least a relay node, wherein there is configured timing association between at least a grant signal transmission process, at least a data transmission process and at least a feedback signal transmission process of the at least a base station, the at least a relay node and the at least a mobile communication device.

2. The method according to claim 1 further comprising:
   determining to be operating in a TDD mode or in a FDD mode, wherein the configured timing association includes a first time interval and a second time interval, wherein,
   if the wireless relay system is in a downlink transmission process, the first time interval represents a time interval from the timing point where the at least a relay node replies at least a feedback signal to the at least a base station to the timing point where the at least a mobile communication device is granted downlink resource, and the second time interval represents a time interval from the timing point where the at least a relay node is granted the downlink resource to the timing point where the at least a relay node replies at least a feedback signal to the at least a base station.

3. The method according to claim 2, wherein,
   if the wireless relay system is to be operated in the downlink transmission process, then when the at least a base station transmits downlink data in subframe n, the at least a relay node forwards the downlink data in a third time interval calculated from the first time interval and the second time interval.

4. The method according to claim 3, wherein,
   the at least a relay node successfully receives the downlink data from the at least a base station, and the at least a relay node replies an acknowledgment signal to the at least a base station before forwarding the downlink data to the at least a mobile communication device.

5. The method according to claim 3, wherein,
   the at least a base station transmits the downlink data to the at least a relay node and the at least a mobile communication device in the same subframe.

6. The method according to claim 3, wherein,
   the at least a relay node replies an acknowledgment signal to the at least a base station after forwarding the downlink data to the at least a mobile communication device.

7. The method according to claim 3, wherein,
   if the sum of the first time interval and the second time interval is greater than 0, then the at least a base station and the at least a relay node do not simultaneously transmit the downlink data to the at least a mobile communication device.

8. The method according to claim 3, wherein,
if the sum of the first time interval and the second time interval is equal to 0, then the at least a base station and the at least a relay node simultaneously transmit the downlink data to the at least a mobile communication device.

9. The method according to claim 3, wherein,
if the first time interval is less than 0, which represents a late ACK situation, and the at least a relay node replies the acknowledgement signal to the at least a base station after the at least a relay node forwards the downlink data to the at least a mobile communication device.

10. The method according to claim 1, wherein,
determining to be operating in a TDD mode or in a FDD mode, wherein the configured timing association includes a first time interval and a second time interval, wherein,
if the wireless relay system is in an uplink transmission process, the first time interval represents a time interval from the timing point where the at least a mobile communication device is granted uplink resource to the timing point where the at least a relay node is granted uplink resource, and the second time interval represents a time interval from the timing point where the at least a relay node is granted the uplink resource to the timing point where the at least a relay node forwards uplink data.

11. The method according to claim 10, wherein,
if the wireless relay system is to be operated in the uplink transmission process, then when the at least a base station grants uplink resource to the at least a mobile communication device in subframe n, the at least a relay node forwards the uplink data in a third time interval calculated from the first time interval and the second time interval.

12. The method according to claim 11, wherein,
the at least a relay node successfully receives the uplink data from the at least a mobile communication device, and the at least a base station forwards the uplink data to the at least a base station before the at least a relay node replies an acknowledgment signal to the at least a mobile communication device.

13. The method according to claim 11, wherein,
the at least a base station grants uplink resource to the at least a relay node and grants uplink resource to the at least a mobile communication device in the same subframe.

14. The method according to claim 11, wherein,
the at least a base station grants uplink resource to the at least a relay node after the at least relay node replies an acknowledgement signal to the at least a mobile communication device.

15. The method according to claim 11, wherein,
the at least a relay node transmits the uplink data to the at least a base station after the at least a relay node replies the acknowledgement signal to the at least a mobile communication device.

16. The method according to claim 11, wherein,
if the first time interval is less than 0, then the at least a base station arranges granting uplink resource to the at least a relay node earlier than the arrangement of granting uplink resource to the at least a mobile communication device.

17. The method according to claim 11, wherein,
if sum of the first time interval and the second time interval is less than and equal to 8 but greater than and equal to 4, then the at least a base station grants uplink resource to the at least a relay node before the at least a relay node receives the uplink data.

18. The method according to claim 11, wherein,
if sum of the first time interval and the second time interval is greater than and equal to 8, which represents that the at least a base station grants uplink resource to the at least a relay node after the at least a relay node receives the uplink data.

19. A transmission method for a wireless relay system, adapted for providing a relay of at least a base station and at least a mobile communication device, and the method comprises:
the at least a base station provides a data transmission service to the at least a mobile communication device with facilitation of at least a relay node; and
a FDD mode or a TDD mode being operated between the at least a base station, the at least a relay node and the at least a mobile communication device, wherein,
if the wireless relay system is operated in the FDD mode, then there is a configured timing association between at least a grant signal transmission process, at least a data transmission process and at least a feedback signal transmission process of the at least a base station, the at least a relay node and the at least a mobile communication device; and
if the wireless relay system is operated in the TDD mode, then the at least a grant signal, at least a data and at least a feedback signal are transmitted between the at least a base station, the at least a relay node and the at least a mobile communication device according to a configuration table.

20. The method according to claim 19, wherein the configured timing includes a first time interval and a second time interval, wherein,
if the wireless relay system is operated in a downlink transmission process, the first time interval represents the timing point where the at least a relay node replies at least a feedback signal to the at least a base station to the timing point where the at least a mobile communication device is granted downlink resource, and the second time interval represents the timing point where the at least a relay node is granted the downlink resource to the timing point where the at least a relay node replies at least a feedback signal to the at least a base station.

21. The method according to claim 20, wherein,
if the wireless relay system is operated in the downlink transmission process, then when the at least a base station transmits downlink data in subframe n, the at least a relay node forwards the downlink data in a third time interval calculated from the first time interval and the second time interval.

22. The method according to claim 19, wherein, the configured timing includes a first time interval and a second time interval, wherein,
if the wireless relay system is operated in an uplink transmission process, the first time interval represents the timing point where the at least a mobile communication device is granted uplink resource to the timing point where the at least a relay node is granted uplink resource, and the second time interval represents the timing point where the at least a relay node is granted the uplink resource to the timing point where the at least a relay node forwards uplink data.

23. The method according to claim 22, wherein,
if the wireless relay system is operated in the downlink transmission process, then when the at least a base station grants uplink resource to the at least a mobile communication device in subframe n, the at least a relay node forwards the uplink data in a third time interval calculated from the first time interval and the second time interval.

24. The method according to claim 19, wherein, the configuration table includes a first time interval X value representing the time interval from the time point where the at least a relay node replies at least a feedback signal to the timing point where the at least a mobile communication device is granted downlink resource, and the configuration table is established according the following situations:
the at least a relay node successfully receives the downlink data from the at least a base station, and replies an acknowledgement signal to the at least a base station before forwarding the downlink data to the at least a mobile communication device;
the at least a base station transmits the downlink data to the at least a relay node and the at least a mobile communication device in the same subframe; and
the at least a relay node replies an acknowledgement signal to the at least a base station after forwarding the downlink data to the at least a mobile communication device.

25. The method according to claim 24, wherein when a configuration of the configuration table is 0,
if a subframe number 12 is 0, then the first time interval is 0, 4 or 5 subframe interval;
if the subframe number n is 1, then the first time interval is 0, 1, 5 or 6 subframe interval;
if the subframe number n is 5, then the first time interval is 0, 4 or 5 subframe interval; and
if the subframe number n is 6, then the first time interval is 0, 1, 5 or 6 subframe interval.

26. The method according to claim 24, wherein when a configuration of the configuration table is 1,
if a subframe number n is 0, then the first time interval is 0, 1, 4, 5, 6 or 9 subframe interval;
if the subframe number n is 1, then the first time interval is 0, 1, 2, 5, 6 or 7 subframe interval;
if the subframe number n is 4, then the first time interval is 0, 3, 4, 5, 8 or 9 subframe interval;
if the subframe number n is 5, then the first time interval is 0, 1, 4, 5, 6, 9 or 10 subframe interval; and
if the subframe number n is 6, then the first time interval is 0, 1, 2, 5, 6 or 7 subframe interval.

27. The method according to claim 24, wherein when a configuration of the configuration table is 2,
if a subframe number n is 0, then the first time interval is 0, 1, 2, 4, 5, 6, 7 or 9 subframe interval;
if the subframe number n is 1, then the first time interval is 0, 1, 2, 3, 5, 6, 7 or 8 subframe interval;
if the subframe number n is 3, then the first time interval is 0, 2, 3, 4, 5, 7, 8 or 9 subframe interval;
if the subframe number n is 4, then the first time interval is 0, 1, 3, 4, 5, 6, 8 or 9 subframe interval;
if the subframe number n is 5, then the first time interval is 0, 1, 2, 4, 5, 6, 7 or 9 subframe interval;
if the subframe number n is 6, then the first time interval is 0, 1, 2, 3, 5, 6, 7 or 8 subframe interval;
if the subframe number n is 8, then the first time interval is 0, 2, 3, 4, 5, 7, 8 or 9 subframe interval; and
if the subframe number n is 9, then the first time interval is 0, 1, 3, 4, 5, 6, 8 or 9 subframe interval.

28. The method according to claim 24, wherein when a configuration of the configuration table is 3,
if a subframe number n is 0, then the first time interval is 0, 1, 2, 3, 4, 5 or 9 subframe interval;
if the subframe number n is 1, then the first time interval is 0, 1, 2, 3, 5, 6, 7 or 8 subframe interval;
if the subframe number n is 5, then the first time interval is 0, 4, 5, 6, 7, 8 or 9 subframe interval;
if the subframe number n is 6, then the first time interval is 0, 1, 5, 6, 7, 8 or 9 subframe interval;
if the subframe number n is 7, then the first time interval is 0, 1, 2, 6, 7, 8 or 9 subframe interval;
if the subframe number n is 8, then the first time interval is 0, 1, 2, 3, 7, 8 or 9 subframe interval; and
if the subframe number n is 9, then the first time interval is 0, 1, 2, 3, 4, 8 or 9 subframe interval.

29. The method according to claim 24, wherein when a configuration of the configuration table is 4,
if a subframe number n is 0, then the first time interval is 0, 1, 2, 3, 4, 5, 6 or 9 subframe interval;
if the subframe number n is 1, then the first time interval is 0, 1, 2, 3, 4, 5, 6 or 7 subframe interval;
if the subframe number n is 4, then the first time interval is 0, 5, 6, 7, 8 or 9 subframe interval;
if the subframe number n is 5, then the first time interval is 0, 1, 6, 7, 8 or 9 subframe interval;
if the subframe number n is 6, then the first time interval is 0, 1, 2, 5, 6, 7, 8 or 9 subframe interval;
if the subframe number n is 7, then the first time interval is 0, 1, 2, 3, 6, 7, 8 or 9 subframe interval;
if the subframe number n is 8, then the first time interval is 0, 1, 2, 3, 4, 7, 8 or 9 subframe interval; and
if the subframe number n is 9, then the first time interval is 0, 1, 2, 3, 4, 5, 8 or 9 subframe interval.

30. The method according to claim 24, wherein when a configuration of the configuration table is 5,
if a subframe number n is 0, then the first time interval is 0, 1, 2, 3, 4, 5, 6, 7 or 9 subframe interval;
if the subframe number n is 1, then the first time interval is 0, 1, 2, 3, 4, 5, 6, 7 or 8 subframe interval;
if the subframe number n is 3, then the first time interval is 0, 2, 3, 4, 5, 6, 7, 8 or 9 subframe interval;
if the subframe number n is 4, then the first time interval is 0, 1, 3, 4, 5, 6, 7, 8 or 9 subframe interval;
if the subframe number n is 5, then the first time interval is 0, 1, 2, 4, 5, 6, 7, 8 or 9 subframe interval;
if the subframe number n is 6, then the first time interval is 0, 1, 2, 3, 5, 6, 7, 8 or 9 subframe interval;
if the subframe number n is 7, then the first time interval is 0, 1, 2, 3, 4, 6, 7, 8 or 9 subframe interval;
if the subframe number n is 8, then the first time interval is 0, 1, 2, 3, 4, 5, 7, 8 or 9 subframe interval; and
if the subframe number n is 9, then the first time interval is 0, 1, 2, 3, 4, 5, 6, 8 or 9 subframe interval.

31. The method according to claim 24, wherein when a configuration of the configuration table is 6,
if a subframe number n is 0, then the first time interval is 0, 4, 5 or 9 subframe interval;
if the subframe number n is 1, then the first time interval is 0, 5 or 6 subframe interval;
if the subframe number n is 5, then the first time interval is 0, 4, 5, 6 or 9 subframe interval;
if the subframe number n is 6, then the first time interval is 0, 1, 5, 6 or 7 subframe interval; and
if the subframe number n is 9, then the first time interval is 0, 3, 4, 8 or 9 subframe interval.

32. The method according to claim 19, wherein, the configuration table includes a second time interval Y value representing the time interval from the time point where the at least a mobile communication device is granted uplink resource to the timing point where the at least a relay node is granted uplink resource, and the configuration table is established according the following situations:
  the at least a relay node successfully receives the uplink data from the at least a mobile communication device, and replies an acknowledgement signal to the at least a mobile communication device before forwarding the uplink data to the at least a base station;
  the at least a base station grants uplink resource to the at least a relay node and the at least a mobile communication device in the same subframe; and
  the at least a relay node forwards the uplink data to the at least a base station after the at least a base station replies an acknowledgement signal to the at least a mobile communication device.

33. The method according to claim 32, wherein when a configuration of the configuration table is 0,
  if a subframe number n is 0, then the second time interval is 0, 1, 5 or 6 subframe interval;
  if the subframe number n is 1, then the second time interval is 0, 4, 5 or 9 subframe interval;
  if the subframe number n is 5, then the second time interval is 0, 1, 5 or 6 subframe interval; and
  if the subframe number n is 6, then the second time interval is 0, 4, 5 or 9 subframe interval.

34. The method according to claim 32, wherein when a configuration of the configuration table is 1,
  if a subframe number n is 1, then the second time interval is 0, 8 or 9 subframe interval;
  if the subframe number n is 4, then the second time interval is 0, 1, 2 or 5 subframe interval;
  if the subframe number n is 6, then the second time interval is 0, 3, 4, 5, 8 or 9 subframe interval; and
  if the subframe number n is 9, then the second time interval is 0, 1 or 2 subframe interval.

35. The method according to claim 32, wherein when a configuration of the configuration table is 2,
  if the subframe number n is 3, then the second time interval is 0, 1, 2, 3 or 5 subframe interval; and
  if the subframe number n is 8, then the second time interval is 0, 1, 2, 3 or 5 subframe interval.

36. The method according to claim 32, wherein when a configuration of the configuration table is 3,
  if the subframe number n is 0, then the second time interval is 0, 1, 5, 6, 7 or 8 subframe interval;
  if the subframe number n is 8, then the second time interval is 0, 1, 2, 3, 7, 8 or 9 subframe interval; and
  if the subframe number n is 9, then the second time interval is 0, 1, 2, 6, 7, 8 or 9 subframe interval.

37. The method according to claim 32, wherein when a configuration of the configuration table is 4,
  if the subframe number n is 8, then the second time interval is 0, 1, 6, 7, 8 or 9 subframe interval; and
  if the subframe number n is 9, then the second time interval is 0, 5, 6, 7, 8 or 9 subframe interval.

38. The method according to claim 32, wherein when a configuration of the configuration table is 4,
  if the subframe number n is 8, then the second time interval is 0, 2, 3, 5, 6, 7, 8 or 9 subframe interval.

39. The method according to claim 32, wherein when a configuration of the configuration table is 6,
  if a subframe number n is 0, then the second time interval is 0, 1, 5, 6 or 9 subframe interval;
  if the subframe number n is 1, then the second time interval is 0, 4, 5, 8 or 9 subframe interval;
  if the subframe number n is 5, then the second time interval is 0, 1, 4, 5 or 6 subframe interval;
  if the subframe number n is 6, then the second time interval is 0, 3, 4, 5, 6, or 9 subframe interval; and
  if the subframe number n is 9, then the second time interval is 0, 1, 2, 6 or 7 subframe interval.

40. The method according to claim 19, wherein the configuration table includes a third time interval representing a time interval from the timing point where the at least a relay node is granted uplink resource to the timing point where the at least a relay node forwards the uplink data.

41. The method according to claim 40, wherein when a configuration of the configuration table is 0,
  if a subframe number n is 0, then the third time interval is 0, 2, 3, 4, 7, 8 or 9 subframe interval;
  if the subframe number n is 1, then the third time interval is 1, 2, 3, 6, 7 or 8 subframe interval;
  if the subframe number n is 5, then the third time interval is 2, 3, 4, 7, 8 or 9 subframe interval; and
  if the subframe number n is 6, then the third time interval is 1, 2, 3, 4, 6, 7 or 8 subframe interval.

42. The method according to claim 40, wherein when a configuration of the configuration table is 1,
  if a subframe number n is 1, then the third time interval is 1, 2, 6 or 7 subframe interval;
  if the subframe number n is 4, then the third time interval is 3, 4, 8 or 9 subframe interval;
  if the subframe number n is 6, then the third time interval is 1, 2, 6 or 7 subframe interval; and
  if the subframe number n is 9, then the third time interval is 3, 4, 8 or 9 subframe interval.

43. The method according to claim 30, wherein when a configuration of the configuration table is 2,
  if the subframe number n is 3, then the third time interval is 4 or 9 subframe interval; and
  if the subframe number n is 8, then the third time interval is 4 or 9 subframe interval.

44. The method according to claim 30, wherein when a configuration of the configuration table is 3,
  if the subframe number n is 0, then the third time interval is 2, 3 or 4 subframe interval;
  if the subframe number n is 8, then the third time interval is 4, 5 or 6 subframe interval; and
  if the subframe number n is 9, then the third time interval is 3, 4 or 5 subframe interval.

45. The method according to claim 40, wherein when a configuration of the configuration table is 4,
  if the subframe number n is 8, then the third time interval is 4 or 5 subframe interval; and
  if the subframe number n is 9, then the third time interval is 3, 4 or 5 subframe interval.

46. The method according to claim 40, wherein when a configuration of the configuration table is 5,
  if the subframe number n is 8, then the third time interval is 4 subframe interval.

47. The method according to claim 40, wherein when a configuration of the configuration table is 6,
  if the subframe number n is 0, then the third time interval is 2, 3, 4, 7 or 8 subframe interval;
  if the subframe number n is 1, then the third time interval is 1, 2, 3, 6 or 7 subframe interval;
  if the subframe number n is 5, then the third time interval is 2, 3, 7, 8 or 9 subframe interval;
  if the subframe number n is 6, then the third time interval is 1, 2, 6, 7 or 8 subframe interval; and
  if the subframe number n is 9, then the third time interval is 3, 4, 5, 8 or 9 subframe interval.

48. A transmission method for a wireless relay system, adapted for providing a relay of at least a base station and at least a mobile communication device, wherein the method comprises:
the at least a base station performs an uplink data transmission process and a downlink data transmission process with the at least a mobile communication device with facilitation of the at least a relay node, wherein there is configured timing association comprising a first time interval and a second time interval between at least a grant signal transmission process, at least a data transmission process and at least a feedback signal transmission process of the at least a base station, the at least a relay node and the at least a mobile communication device.

49. The method according to claim 48, wherein,
if the wireless relay system is in a downlink transmission process, the first time interval represents a time interval from the timing point where the at least a relay node replies at least a feedback signal to the at least a base station to the timing point where the at least a mobile communication device is granted downlink resource, and the second time interval represents a time interval from the timing point where the at least a relay node is granted the downlink resource to the timing point where the at least a relay node replies an acknowledgement signal to the at least a base station.

50. The method according to claim 49, wherein,
if the wireless relay system is to be operated in the downlink transmission process, then when the at least a base station transmits downlink data in subframe n, the at least a relay node forwards the downlink data in a third time interval calculated from the first time interval and the second time interval.

51. The method according to claim 50, wherein,
if the sum of the first time interval and the second time interval is greater than 0, then the at least a base station and the at least a relay node do not simultaneously transmit the downlink data to the at least a mobile communication device.

52. The method according to claim 50, wherein,
if the sum of the first time interval and the second time interval is equal to 0, then the at least a base station and the at least a relay node simultaneously transmit the downlink data to the at least a mobile communication device.

53. The method according to claim 50, wherein,
if the first time interval is less than 0, then the at least a relay node replies the acknowledgement signal to the at least a base station after the at least a relay node forwards the downlink data to the at least a mobile communication device.

54. The method according to claim 48, wherein,
if the wireless relay system is in an uplink transmission process, the first time interval represents a time interval from the timing point where the at least a mobile communication device is granted uplink resource to the timing point where the at least a relay node is granted uplink resource, and the second time interval represents a time interval from the timing point where the at least a relay node is granted the uplink resource to the timing point where the at least a relay node forwards uplink data.

55. The method according to claim 54, wherein,
if the wireless relay system is to be operated in the uplink transmission process, then when the at least a base station grants uplink resource to the at least a mobile communication device in subframe n, the at least a relay node forwards the uplink data in a third time interval calculated from the first time interval and the second time interval.

56. The method according to claim 55, wherein,
if the first time interval is less than 0, then the at least a base station arranges granting uplink resource to the at least a relay node earlier than the arrangement of granting uplink resource to the at least a mobile communication device.

57. The method according to claim 55, wherein,
if sum of the first time interval and the second time interval is less than and equal to 8 but greater than and equal to 4, then the at least a base station grants uplink resource to the at least a relay node before the at least a relay node receives the uplink data.

58. The method according to claim 55, wherein,
if sum of the first time interval and the second time interval is greater than and equal to 8, then the at least a base station grants uplink resource to the at least a relay node after the at least a relay node receives the uplink data.

59. A relay station, adapted for relaying at least a data between a base station and a mobile communication device, wherein,
the relay station transmits and receives the data with a configured timing association between at least a grant signal transmission process, at least a data transmission process and at least a feedback signal transmission process of the at least a base station, the at least a relay node and the at least a mobile communication device.

60. The relay station according to claim 59, wherein,
the data received by the relay station is a HARQ (hybrid automatic repeat request) data, and the data transmitted by the relay station is an acknowledgement signal for the HARQ data.

61. The relay station according to claim 60, wherein, if the relay station receives downlink data in subframe 3, 4 or 9, then the relay station transmits an acknowledgement signal of the downlink data in subframe 0, 3, 4, 5, 7, 8 or 9.

62. The relay station according to claim 61, wherein, if the relay station receives downlink data in subframe 3, then the relay station transmits an acknowledgement signal of the downlink data in subframe 4, 7 or 9.

63. The relay station according to claim 61, wherein, if the relay station receives downlink data in subframe 4, then the relay station transmits an acknowledgement signal of the downlink data in subframe 5, 8 or 0.

64. The relay station according to claim 61, wherein, if the relay station receives downlink data in subframe 9, then the relay station transmits an acknowledgement signal of the downlink data in subframe 0, 3 or 5.

65. The relay station according to claim 60, wherein,
if the relay station receives the down link data in subframe 0, 1, 5 or 6, then the relay station transmits an acknowledgement signal downlink data in subframe 2, 3, 4, 7, 8 or 9.

66. The relay station according to claim 60, wherein,
if the relay station receives the down link data in subframe 0, 1, 4, 5, 6 or 9, then the relay station transmits an acknowledgement signal for downlink data in subframe 2, 3, 7 or 8.

67. The relay station according to claim 60, wherein,
if the relay station receives the down link data in subframe 3, 4, 5, 6, 8 or 9, then the relay station transmits an acknowledgement signal for downlink data in subframe 2 or 7.

68. The relay station according to claim 60, wherein,
if the relay station receives the down link data in subframe 0, 1, 5, 6, 7, 8 or 9, then the relay station transmits an acknowledgement signal for downlink data in subframe 2, 3 or 4.

69. The method relay station according to claim 60, wherein,
if the relay station receives the down link data in subframe 0, 1, 4, 5, 6, 7, 8 or 9, then the relay station transmits an acknowledgement signal for downlink data in subframe 2 or 3.

70. The relay station according to claim 60, wherein,
if the relay station receives the down link data in subframe 0, 1, 3, 4, 5, 6, 7, 8 or 9, then the relay station transmits an acknowledgement signal for downlink data in subframe 2.

71. The relay station according to claim 60, wherein,
if the relay station receives the down link data in subframe 0, 1, 5, 6 or 9, then the relay station transmits an acknowledgement signal for downlink data in subframe 2, 3, 4, 7 or 8.

72. The relay station according to claim 59, wherein,
the data transmitted by the relay station is a HARQ (hybrid automatic repeat request) data, and the data received by the relay station is an acknowledgement signal for the HARQ data.

73. The relay station according to claim 59, wherein the data received by the relay station is a data grant signal for uplink HARQ (hybrid automatic repeat request) data, and the data transmitted by the relay station is the unlink HARQ data.

74. The relay station according to claim 73, wherein, if the relay station receives the data grant signal in subframe 3, 4, 8 or 9, then the relay station transmits the uplink HARQ data in subframe 2, 3, 7, 8 or 9.

75. The relay station according to claim 66, wherein, if the relay station receives the data grant signal in subframe 3 then the relay station transmits the uplink HARQ data in subframe 7 or 8.

76. The relay station according to claim 66, wherein, if the relay station receives the data grant signal in subframe 4, then the relay station transmits the uplink HARQ data in subframe 8 or 9.

77. The relay station according to claim 66, wherein, if the relay station receives the data grant signal in subframe 8, then the relay station transmits the uplink HARQ data in subframe 2 or 3.

78. The relay station according to claim 66, wherein, if the relay station receives the data grant signal in subframe 9, then the relay station transmits the uplink HARQ data in subframe 3.

* * * * *